United States Patent

Nakagawa et al.

[11] Patent Number: 5,517,410
[45] Date of Patent: May 14, 1996

[54] APPARATUS FOR CONTROLLING VEHICLE DRIVE FORCE DEPENDING UPON VEHICLE LOAD DETERMINED BY ENGINE LOAD AND VEHICLE SPEED

[75] Inventors: Norihisa Nakagawa, Numazu; Hiroki Matsuoka, Susono, both of Japan

[73] Assignee: Toyota Jidosha Kabushiki Kaisha, Toyota, Japan

[21] Appl. No.: 265,751

[22] Filed: Jun. 27, 1994

[30] Foreign Application Priority Data

Jul. 8, 1993 [JP] Japan .................. 5-169291
Aug. 20, 1993 [JP] Japan .................. 5-205945

[51] Int. Cl.⁶ ............................................ B60K 16/00
[52] U.S. Cl. ........................... 364/424.1; 364/431.07
[58] Field of Search .................... 364/424.1, 431.07; 477/65, 97, 129, 155

[56] References Cited

U.S. PATENT DOCUMENTS

| | | | |
|---|---|---|---|
| 4,502,354 | 3/1985 | Suzuki et al. | 477/155 |
| 4,733,580 | 3/1988 | Kubo et al. | 477/129 |
| 4,795,015 | 1/1989 | Hibino et al. | 477/65 |
| 5,172,609 | 12/1992 | Nitz et al. | 477/97 |
| 5,231,582 | 7/1993 | Takahashi et al. | |
| 5,341,295 | 8/1994 | Nakagawa et al. | 364/424.1 |

FOREIGN PATENT DOCUMENTS

| | | |
|---|---|---|
| 62-180153 | 8/1987 | Japan . |
| 23539 | 1/1990 | Japan . |
| 2236055 | 9/1990 | Japan . |
| 3140664 | 6/1991 | Japan . |
| 3189459 | 8/1991 | Japan . |
| 3206326 | 9/1991 | Japan . |
| 526338 | 2/1993 | Japan . |

*Primary Examiner*—Kevin J. Teska
*Assistant Examiner*—Dan Fiul
*Attorney, Agent, or Firm*—Oblon, Spivak, McClelland, Maier & Neustadt

[57] ABSTRACT

A vehicle drive force control apparatus including a relationship setting device for setting a standard relationship between a load acting on the engine and a running speed of the vehicle when the vehicle is running in a stable mode at a relatively constant speed on a generally flat road surface, a vehicle-load determining device for determining, from time to time, a running load acting on the vehicle as represented by the load acting on the engine and the running speed of the vehicle, on the basis of the standard relationship set by the relationship setting device, and a drive force control device for controlling the drive force on the basis of the running load acting on the vehicle determined by the vehicle-load determining device.

12 Claims, 29 Drawing Sheets

STANDARD LOADED-VEHICLE SPEED SPDs

VEHICLE SPEED SPD

FIG. 7

| XCLIMB | XCOAST | YIDL | XACC | RUNNING STATE | SMOOTHING AMOUNT |
|---|---|---|---|---|---|
| * | 0 | 1 | * | STOPPED | 1/128 |
| * | 1 | * | 0 | COASTING | 1/64 |
| 1 | 0 | 0 | * | POSITIVE LOAD RUN | 1/16 |
| 1 | 1 | * | 1 | LOAD CHANGED TO POSITIVE | 1/2 |
| 0 | 0 | 0 | * | NEGATIVE LOAD RUN | 1/2 |
| 0 | 1 | * | 1 | LOAD CHANGED TO NEGATIVE | 1/16 |

XCLIMB: SMOOTHED LOAD COEFFICIENT KFUKASM
 0 ..... SMALLER THAN 1.0
 1 ..... 1.0 OR LARGER

XCOAST: NON-SMOOTHED LOAD COEFFICIENT KFUKA
 0 ..... 1.0 OR LARGER
 1 ..... SMALLER THAN 1.0

YIDL : IDLING SWITCH STATE
 0 ..... OFF
 1 ..... ON

XACC : VEHICLE ACCELERATION/DECELERATION
 0 ..... DECELERATION
 1 ..... ACCELERATION

WHERE SMOOTHING INHIBIT STEPS SD17 AND SD18 ARE PROVIDED

WHERE STEPS SD17 AND SD18 ARE NOT PROVIDED

APPARATUS FOR CONTROLLING VEHICLE DRIVE FORCE DEPENDING UPON VEHICLE LOAD DETERMINED BY ENGINE LOAD AND VEHICLE SPEED

BACKGROUND OF THE INVENTION

1. Field of the Invention

The present invention relates in general to an apparatus for controlling a drive force to drive a motor vehicle, and more particularly, to techniques for improving the running stability and drivability of the vehicle, irrespective of a variation in the running load of the vehicle, over the entire ranges of the engine load and the vehicle speed.

2. Discussion of the Related Art

For controlling a drive force to drive a motor vehicle, there is known a drive force control apparatus adapted to change the vehicle drive force by adjusting the opening angle of a throttle valve of a vehicle engine or by controlling the speed ratio of an automatic transmission of the vehicle. For example, a motor vehicle equipped with an automatic transmission which is automatically shifted to change the speed ratio is provided with a shift control apparatus adapted to change the speed ratio of the transmission on the basis of the actually detected engine load and vehicle speed and according to a predetermined shift pattern. The shift pattern usually consists of shift-up and shift-down boundary lines each representing a predetermined relationship between the engine load and the vehicle speed. The appropriate shift-up or shift-down boundary line is selected depending upon the currently selected position of the transmission, and the transmission is shifted up or down according to the selected shift-up or shift-down boundary line depending upon the detected engine load and vehicle speed, whereby the vehicle drive force is suitably controlled. The shift-up and shift-down boundary lines used by such transmission shift control apparatus are generally formulated to achieve not only high running stability and drivability of the vehicle but also high fuel economy of the vehicle, when the vehicle is running on a generally level or flat road surface, since the vehicle usually runs on such flat road surface. Accordingly, the drive force tends to be insufficient for the intended drivability of the vehicle when the vehicle runs uphill.

In the light of the above-indicated insufficiency of the drive force during uphill running of the vehicle, a transmission shift control apparatus is proposed as disclosed in JP-A-62-180153 (published in 1987), wherein an uphill running of the vehicle is detected if the vehicle speed is lowered across the selected shift-up boundary line while the throttle opening angle is larger than a predetermined value. When the uphill running is detected by the shift control apparatus, a shift-up action of the automatic transmission is inhibited, and the transmission is held in the currently established gear position, whereby the vehicle is driven with a relatively large drive force for improved running stability and drivability during uphill running of the vehicle.

However, the known transmission shift control apparatus indicated above is adapted to detect the uphill running of the vehicle under a limited running condition of the vehicle, namely, only if the vehicle speed is lowered across the selected shift-down boundary line and if the throttle opening angle is larger than the predetermined lower limit. This arrangement does not provide an improvement in the control of the vehicle drive force depending upon a variation in the load acting on the vehicle, when the throttle opening angle is smaller than the predetermined lower limit. In other words, the known arrangement does not permit satisfactory running stability and drivability of the vehicle over the entire ranges of the engine load (throttle opening angle) and the vehicle speed.

There is also known a transmission shift control apparatus as disclosed in JP-A-3-206326 (published in 1991), in which a shift-down vehicle speed as obtained from a shift-down boundary line is adjusted on the basis of the operating speed of the accelerator pedal or a rate of change $\Delta TA$ of the opening angle TA of the throttle valve, so that the transmission is likely to be shifted down when the accelerator pedal is operated at a relatively high speed, that is, when the vehicle driver has a relatively strong desire to accelerate the vehicle. According to this arrangement, the shift-down vehicle speed as determined by the appropriate shift-down boundary line is suitably adjusted depending upon the desire of the vehicle driver to accelerate the vehicle, so that the transmission is more likely to be shifted down when the accelerator pedal is depressed relatively rapidly, than when the same is depressed relatively slowly. Thus, the vehicle driver's desire to accelerate the vehicle is reflected by the shifting actions of the automatic transmission, for improved drivability of the vehicle.

However, the adjustment of the shift-down vehicle speed in the shift control apparatus described just above results in reducing a difference between the shift-down vehicle speed and the shift-up vehicle speed. Although this does not cause a problem when the altitude of the vehicle is relatively low as in normal running of the vehicle, the reduced difference may cause frequent shift-down and shift-up actions of the transmission when the altitude of the vehicle is relatively high, because of lowered output of the engine at such high altitude. Described more specifically, such frequent shift-down and shift-up actions of the transmission would occur due to the behaviors of the vehicle driver and the known shift control apparatus during high-altitude running of the vehicle. That is, a shift-down action of the transmission causes an increase in the vehicle drive force and an increase in the vehicle speed, resulting in an automatic shift-up action of the transmission, which would motivate the vehicle driver to depress the accelerator pedal in an attempt to maintain the vehicle speed. Consequently, the transmission is shifted down again. Thus, the transmission tends to be shifted up and down frequently during running of the vehicle at a relatively high altitude, if the shift-down vehicle speed is adjusted as described above.

SUMMARY OF THE INVENTION

It is therefore a first object of the present invention to provide a vehicle drive force control apparatus that assures satisfactory running stability and drivability of the vehicle over the entire ranges of the engine load and the vehicle speed, irrespective of a variation in the running load acting on the vehicle.

It is a second object of the present invention to provide a vehicle drive force control apparatus or a shift control apparatus for a vehicle automatic transmission, which permits satisfactory running stability and drivability of the vehicle without frequent shift-down and shift-up actions of the vehicle even when the vehicle is running at a relatively high altitude.

The first object may be accomplished according to the principle of the present invention, which provides an apparatus for controlling a drive force for driving a motor vehicle having an engine and a drive wheel driven by the drive force based on an output of the engine, the apparatus comprising: relationship setting means for setting a standard relationship between a load acting on the engine and a running speed of the vehicle when the vehicle is running in a stable mode at a relatively constant speed on a generally flat road surface; vehicle-load determining means for determining, from time to time, a running load acting on the vehicle as represented by the load acting on the engine and the running speed of the vehicle, on the basis of the standard relationship set by the relationship setting means; and drive force control means for controlling the drive force on the basis of the running load acting on the vehicle determined by the vehicle-load determining means.

In the vehicle drive force control apparatus of the present invention constructed as described above, the standard relationship between the engine load and the vehicle running speed during running of the vehicle in the stable mode at a relatively constant speed on a generally flat road surface is determined, and the vehicle running load as represented by the engine load and the vehicle speed is determined from time to time on the basis of the standard relationship. The drive force for driving the vehicle is controlled or adjusted on the basis of the running load of the vehicle when the running load is determined from time to time. Thus, the vehicle drive force is suitably regulated depending upon the running load of the vehicle over the entire ranges of the engine load and the vehicle speed, so as to assure satisfactory running stability and drivability of the vehicle irrespective of a variation in the running load acting on the vehicle.

In one preferred form of the present invention, the vehicle-load determining means comprises means for determining a standard loaded-vehicle speed on the basis of the detected load acting on the engine and according to the standard relationship, and means for calculating from time to time a vehicle load coefficient as the running load of the vehicle, on the basis of the standard loaded-vehicle speed and the detected running speed of the vehicle. The standard loaded-vehicle speed may be replaced by a standard loaded-vehicle engine load in the form of the throttle opening angle. In this case, the vehicle load coefficient is calculated on the bases of the standard loaded-vehicle engine load (throttle opening angle) and the detected engine load (throttle opening angle). However, the engine load as represented by the throttle opening angle usually changes at a higher rate than the vehicle speed, and the determined standard loaded-vehicle engine load is greatly influenced by a change in the operating position of the accelerator pedal. In this respect, it is desirable to use the standard loaded-vehicle speed rather than the standard loaded-vehicle engine load which is relatively unstable. This arrangement using the standard loaded-vehicle speed assures stable control of the vehicle drive force without an influence of a rapid change in the throttle opening angle.

The above-indicated means for calculating the vehicle load coefficient may be adapted to select one of two different equations for calculating the vehicle load coefficient, depending upon whether the detected actual vehicle speed is lower or higher than the determined standard loaded-vehicle speed.

For instance, the vehicle load coefficient KFUKA is calculated according to an equation KFUKA=2−(b/a) when the detected vehicle speed "b" is lower than the standard loaded-vehicle speed "a", and according to an equation KFUFA=a/c when the detected vehicle speed "c" is higher than the standard value "a".

Preferably, the vehicle load coefficient calculating means includes smoothing means for smoothing the vehicle load coefficient KFUKA calculated from time to time, to obtain a smoothed vehicle load coefficient KFUKASM, which is used as the running load acting on the vehicle.

The smoothing means is preferably designed to change the smoothing amount to be applied to the non-smoothed vehicle load coefficient KFUKA, depending upon the running condition of the vehicle. Further, it is desirable not to substantially change or to maintain the smoothed vehicle load coefficient KFUKASM during a certain predetermined time duration after the starting of the vehicle.

The present invention is suitably applicable to a motor vehicle equipped with an automatic transmission which is automatically shifted by a transmission control unit, so as to change a speed ratio of the transmission, on the basis of the engine load and the vehicle running speed and according to a predetermined shift boundary line. In this case, the transmission control unit comprises the above-indicated relationship setting means, vehicle-load determining means and drive force control means, and the drive force control means includes adjusting means for adjusting the shift boundary line on the basis of the determined vehicle running load, to thereby change the speed ratio of the transmission for controlling the vehicle drive force. This form of the invention using the adjusting means assures not only high fuel economy of the vehicle but also high drivability of the vehicle.

If the smoothing means indicated above is provided in the above form of the invention, the adjusting means of the drive force control means adjusts the shift boundary line on the basis of the smoothed vehicle load coefficient KFUKASM.

According to a further preferred form of the invention, the adjusting means includes means for determining a shift-speed compensating coefficient on the basis of the smoothed vehicle load coefficient KFUKASM, and adjusts the shift boundary line on the basis of the determined shift-speed compensating coefficient. The shift-speed compensating coefficient is determined so that the shift boundary line is suitably adjusted depending upon a change in the gradient of the road surface, which causes a change in the running load acting on the vehicle.

Where the automatic transmission is controlled by the transmission controller such that the speed ratio of the transmission is changed by the drive force control means on the basis of the vehicle running load determined by the vehicle-load determining means, the transmission controller preferably further comprises shift-up inhibiting means for inhibiting a shift-up action of the automatic transmission when the determined running load of the vehicle exceeds a first threshold value. This arrangement is effective to avoid possible frequent shift-down and shift-up actions of the transmission which would otherwise occur due to the behaviors of the vehicle driver and the drive force control means during running of the vehicle in a high-load state. That is, an automatic shift-down action of the transmission causes an increase in the vehicle drive force, which would in turn motivate the vehicle driver to operate the accelerator pedal in the releasing direction in an attempt to reduce the vehicle drive force. A consequent reduction of the drive force would result in a shift-up action of the transmission, which causes a decrease in the vehicle drive force and would motivate the vehicle driver to depress the accelerator pedal in an attempt to increase the vehicle drive force, whereby the transmission would be shifted down again. The shift-up inhibiting means eliminates such alternate shift-down and shift-up actions of the transmission. Thus, the second object indicated above may be achieved according to this arrangement.

For instance, the shift-up inhibiting means inhibits the shift-up action of the transmission when the smoothed vehicle load coefficient KFUKASM as the vehicle running load exceeds the first threshold value. The shift-up inhibiting means is preferably adapted to inhibit a shift-up action to a highest-speed position of the transmission after the transmission is shifted from the highest-speed position down to a lower-speed position due to an increase in the throttle opening angle ( engine load) as a result of depression of the accelerator pedal.

In the above form of the invention in which the shift-up inhibiting means is provided, the transmission controller preferably further comprises cancelling means for cancelling the inhibition of the shift-up action of the transmission by the shift-up inhibiting means, when the running load acting on the vehicle is reduced below a second threshold value smaller than the first threshold value. Since there is a suitable amount of difference between the first and second threshold values, it is possible to prevent undesirable alternate inhibition of the shift-up action and cancellation of the inhibition due to a control hysteresis which would be caused if the same threshold values were used for the shift-up inhibiting means and the cancelling means.

The cancelling means is desirably adapted to determine whether a shift-up action of the transmission to the highest-speed position should be effected or not, each time a change of the running condition of the vehicle from a decelerating state to an accelerating state of the vehicle has been repeated a predetermined number of times while the shift-up action to the highest-speed position is inhibited by the shift-up inhibiting means. If the cancelling means determines that the shift-up action to the highest-speed position should be effected, the cancelling means cancels the inhibition of the shift-up action to the highest-speed position. The shift-up action to the highest-speed position of the transmission means a shifting of the transmission so as to reduce the vehicle drive force. In this sense, the cancellation of the inhibition of the shift-up action should be determined depending on the vehicle drive force required when the vehicle is accelerating. Since the determination as to whether the transmission should be shifted to the highest-speed position is effected when the vehicle is in an accelerating state, the transmission is allowed to be shifted up to the highest-speed position depending upon the vehicle drive force required during acceleration of the vehicle.

The cancelling means may comprise determining means for determining the second threshold value such that the second threshold value is smaller by a predetermined value than a value of the running load which is determined at one of the following two moments, whichever is later: the moment when the inhibition of the shift-up action is started by the shift-up inhibiting means; and the moment when the change of the vehicle running condition from the decelerating state to the accelerating state has been repeated the predetermined number of times. This arrangement advantageously shortens a delay in cancelling the inhibition of the shift-up action of the transmission. The running load value may be the smoothed vehicle load coefficient KFUKASM discussed above.

The drive force control means may be adapted to shift down the automatic transmission to a position for applying an engine brake to the vehicle, if the running load acting on the vehicle and the load acting on the engine are smaller than respective predetermined reference values, and if an acceleration value of the vehicle is larger than a predetermined reference value. This arrangement is effective to apply a suitable engine brake when needed.

In the above arrangement, the drive control means may comprise automatic shift-down means for shifting down the automatic transmission to the engine braking position if the smoothed vehicle load coefficient KFUKASM indicated above as the vehicle running load is smaller than a first reference value, if an opening angle of a throttle valve of the engine as the engine load is smaller than a reference value, and if the acceleration value of the vehicle is larger than the reference value.

In the above case, the drive force control means preferably further comprises means for disabling the automatic shift-down means if the smoothed vehicle load coefficient KFUKASM exceeds a second reference value larger than the first reference value.

The second object indicated above may also be achieved according to a further form of the invention, wherein a transmission controller is provided for controlling an automatic transmission of the motor vehicle, and wherein the transmission controller comprises the relationship setting means, the vehicle-load determining means and the drive force control means, and wherein the drive force control means comprises shift control means for selecting one of operating positions of the transmission, on the basis of the load acting on the engine and the running speed of the vehicle, and according to predetermined shift-up and shift-down boundary lines, the shift control means comprising: adjusting means for adjusting the shift-up and shift-down boundary lines on the basis of the running load acting on the vehicle; detecting means for detecting a rate of change of a desired amount of acceleration of the vehicle currently desired by a driver of the vehicle; first compensating means for adjusting the shift-down boundary line on the basis of the detected rate of change of the desired amount of acceleration of the vehicle, so that the automatic transmission is more likely to be shifted down as the detected rate of change of the desired amount of acceleration of the vehicle is increased; and second compensating means for adjusting the shift-up boundary line so that the transmission is less likely to be shifted up when the vehicle is running in an environment in which an output of the engine is lowered without a change of the desired amount of acceleration of the vehicle.

According to the above form of the invention, the shift-down vehicle speed is adjusted by the first compensating means so that the transmission is more likely to be shifted down as the operating speed of the accelerator pedal is increased, that is, as the vehicle driver's desire to accelerate the vehicle is increased. Further, when the vehicle is running in an environment in which the engine output is lowered, for instance, when the vehicle is running at a relatively high altitude, the shift-up vehicle speed is adjusted by the second compensating means so that the transmission is less likely to be shifted up.

Thus, the shift control means according to the above form of the invention permits the shift-down action of the transmission in response to the vehicle driver's desire to accelerate the vehicle as represented by the operating speed of the accelerator pedal, for example. Further, the shift control means assures stable running of the vehicle even when the engine output is lowered without a change in the operating position of the accelerator pedal (without a change in the driver's desire to accelerate the vehicle). The engine output may be lowered at a relatively high altitude, or when the valve timing changing device or the idling speed control valve of the engine is in the operated position. Explained in detail, the second compensating means operates to increase the shift-up vehicle speed in such operating environment or condition of the vehicle, so that the difference between the shift-down and shift-up vehicle speed values is increased so as to prevent frequent shift-down and shift-up actions of the transmission, which would otherwise occur during running of the vehicle at a high altitude, for example. That is, a shift-down action of the transmission causes an increase in the vehicle drive force and an increase in the vehicle speed, resulting in an automatic shift-up action of the transmission, which would motivate the vehicle driver to depress the accelerator pedal in an attempt to maintain the vehicle speed, which in turn causes the transmission to be shifted down again. The present drive force control apparatus including the shift control means comprising the first and second compensating means described above does not suffer from such busy or frequent shifting actions of the transmission.

The detecting means may be adapted to detect a rate of change of an opening angle of a throttle valve of the engine, as the rate of change of the desired amount of acceleration of the vehicle desired by the driver of the vehicle.

In one arrangement of the above form of the invention, each of the shift-up and shift-down boundary line represents a relationship between the desired amount of acceleration of the vehicle desired by the driver of the vehicle and the running speed of the vehicle, and the shift control means comprises shift-speed determining means for determining a shift-up vehicle speed and a shift-down vehicle speed on the basis of the detected desired amount of acceleration of the vehicle and according to the shift-up and shift-down boundary lines, so that the transmission is shifted up and down at the shift-up and shift-down vehicle speeds, respectively. In this case, the first compensating means increases the shift-down vehicle speed as determined by the shift-speed determining means, with an increase in the rate of change of the desired amount of acceleration of the vehicle, and the second compensating means increases the shift-up vehicle speed as determined by the shift-speed determining means, with an increase of a degree in which the output of the engine is lowered in the environment.

In the above arrangement, the vehicle-load determining means preferably comprises: means for determining a standard loaded-vehicle speed on the basis of the load acting on the engine and according to the standard relationship; and means for calculating from time to time a vehicle load coefficient as the running load acting on the vehicle, on the basis of the standard loaded-vehicle speed and the detected running speed of the vehicle. In this instance, the adjusting means for adjusting the shift-up and shift-down boundary lines on the basis of the running load acting on the vehicle adjusts the shift-up and shift-down vehicle speeds as determined by the shift-speed determining means, on the basis of the vehicle load coefficient, and the first and second compensating means adjust the shift-up and shift-down vehicle speeds as determined by the shift-speed determining means, on the basis of a shift-speed compensating value which increases with an increase in the rate of change of the desired amount of acceleration of the vehicle and with a decrease in a density of an intake air of the engine.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

FIG. 7 is a view indicating a relationship used in step SD19 of the routine of FIG. 2 to determine the amount of smoothing the vehicle load coefficient KFUKA to obtain a smoothed value KFUKASM, depending upon the non-smoothed value KFUKA;

DETAILED DESCRIPTION OF THE PREFERRED EMBODIMENTS

Figure 1:
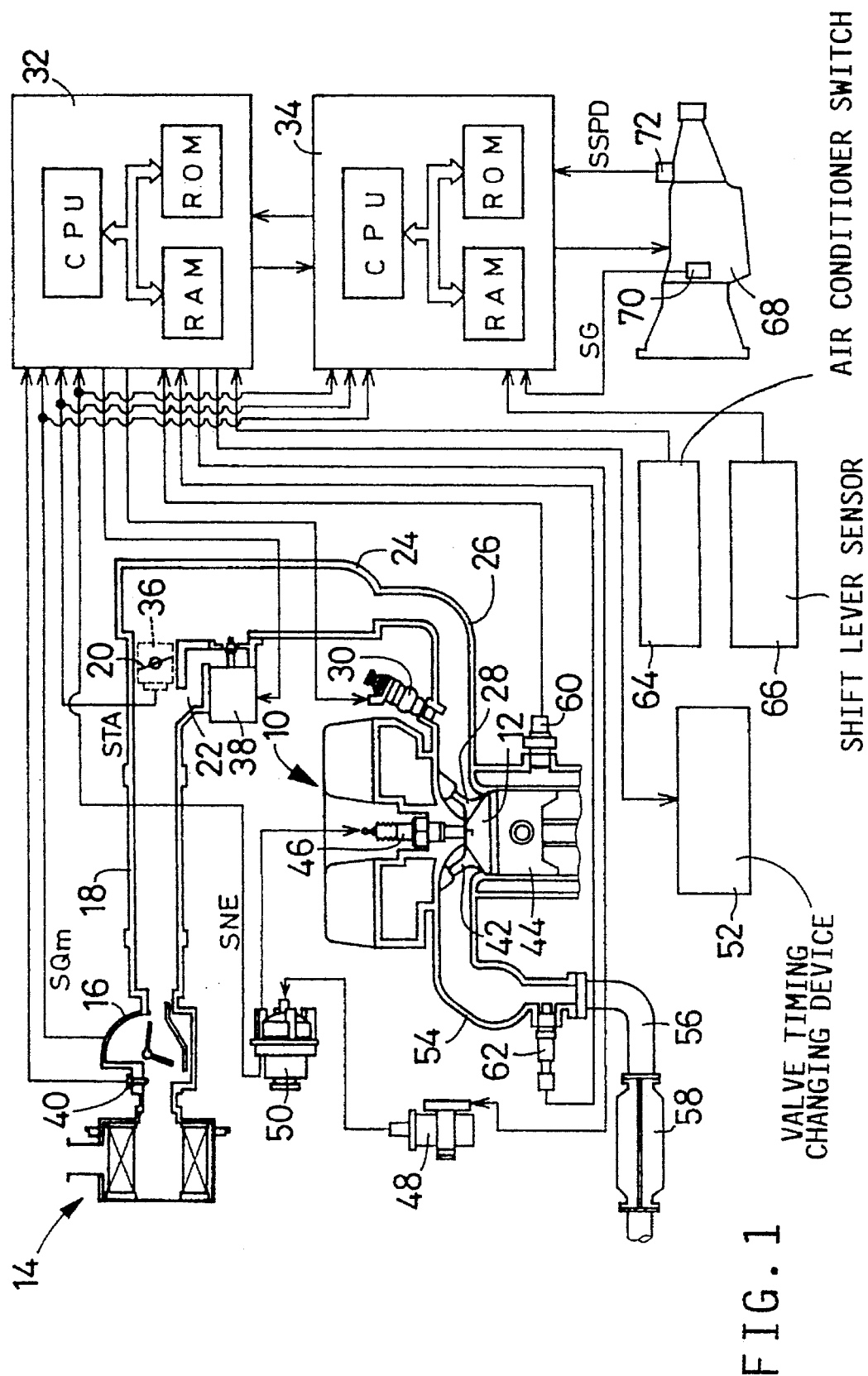
FIG. 1 is a schematic view showing an engine assembly and an automatic transmission of a motor vehicle, and a control system for controlling the engine and transmission, which control system incorporates a vehicle drive force control apparatus according to a first embodiment of the present invention.

Referring first to FIG. 1, the engine assembly of a motor vehicle includes a gasoline engine 10 having combustion chambers 12 (only one of which is shown in the figure). Air is introduced into each combustion chamber 12 through an air cleaner 14, an air flow meter 16, an intake pipe 18, a throttle valve 20, a by-pass passage 22, a surge tank 24, an intake manifold 26 and an intake valve 28. A fuel is injected by a fuel injector valve 30, into a stream of air flowing through the intake manifold 26 to which the fuel injector valve 30 is attached. Thus, each combustion chamber 12 is supplied with an air-fuel mixture for operating the engine 10.

The air flow meter 16 is a movable vane type meter, which functions to sense an actual intake air quantity Qm. This air flow meter 16 generates an INTAKE AIR QUANTITY signal SQm indicative of the actual intake air quantity Qm which flows through the intake pipe 18. The signal SQm is applied to an engine control unit 32 and a transmission control unit 34, which control the engine 10 and an automatic transmission 68, respectively.

The throttle valve 20 is mechanically linked with an accelerator pedal of the vehicle, as well known in the art, so that the angle of opening TA of the throttle valve 20 changes with the amount of operation of the accelerator pedal, whereby the intake air quantity Qm of the engine 10 can be continuously changed by the accelerator pedal through the throttle valve 20. The throttle valve 20 is provided with a throttle sensor 36 which has an idling position switch. The idling position switch detects the idling position of the throttle valve 20. A signal indicative of this idling position and a THROTTLE OPENING signal STA indicative of the opening angle TA of the throttle valve 20 (hereinafter referred to as "throttle opening angle TA") are applied to the engine control unit 32 and the transmission control unit 34.

The throttle valve 20 is disposed in parallel relationship with the by-pass passage 22, which permits a part of the air in the intake pipe 18 to by-pass the throttle valve 20. The by-pass passage 22 is provided with an idling control valve 38 whose opening is controlled by the engine control unit 32, to regulate the amount of the air which flows through the by-pass passage 22 or which by-passes the throttle valve 20, so that the idling speed of the engine 10 can be adjusted by the idling control valve 38.

The fuel injector valve 30 is also controlled by the engine control unit 32, so that the fuel injection timing and the amount of the fuel injected by the injector valve 30 are suitably controlled. An air temperature sensor 40 is disposed upstream of the air flow meter 16, for sensing the temperature of the air which is admitted into the intake pipe 18. An output signal of the temperature sensor 40 representative of the air temperature is also applied to the engine control unit 32.

The engine 10 has the intake valve 28, an exhaust valve 42, a piston 44 and a spark plug 46, for each of the combustion cheers 12. The spark plug 46 is activated to provide an ignition spark in the combustion chamber 12, by application of a high voltage supplied thereto through a distributor 50 from an ignitor 48 under the control of the engine control unit 32. As a result, the air-fuel mixture in the combustion cheer 12 is ignited by the ignition spark to effect a combustion and expansion stroke of the piston, whereby the piston 44 is reciprocated to rotate the crankshaft of the engine 10, as well known in the art.

The intake and exhaust valves 28, 42 are opened and closed by rotation of the camshaft of the engine 10, in synchronization with the crankshaft. A mechanism connecting the crankshaft and the camshaft is linked with a valve timing changing device 52, which is controlled by the engine control unit 32, so that the relative rotating phase of the crankshaft and camshaft is changed to adjust the timings at which the intake and exhaust valves 28, 42 are opened and closed. An exhaust gas produced as a result of combustion of the air-fuel mixture in the combustion chamber 12 is discharged into the atmosphere, through the exhaust valve 42, an exhaust manifold 54, an exhaust pipe 56 and a catalytic converter 58.

A water temperature sensor 60 is provided for sensing the temperature of a coolant which cools the engine 10. The temperature sensor 60 generates a WATER TEMP. signal indicative of the engine coolant temperature, which is applied to the engine control unit 32. The exhaust manifold 54 is provided with an oxygen sensor 62 for detecting an oxygen concentration of the exhaust gas flowing there-through. An output signal of the sensor 62 indicative of the oxygen concentration is also applied to the engine control unit 32.

The distributor 50 is provided with a speed sensor which generates a pulse signal SNE in synchronization with the rotation of the crankshaft of the engine 10. This pulse signal SNE (hereinafter referred to as the ENGINE SPEED signal SNE) represents a speed NE of the engine 10 and is applied to the engine control unit 32 and the transmission control unit 34.

Each of the engine control unit 32 and the transmission control unit 34 has a central processing unit (CPU), a random-access memory (RAM), a read-only memory (ROM), an input/output interface circuit, an analog/digital (A/D) converter, as provided in an electronic controller using a computer. The CPU operates to perform data processing operations according to various control programs stored in the ROM, while utilizing a temporary data storage function of the RAM. The engine control unit 32 is adapted to receive a signal from an air conditioner switch 64, as well as the signals SQm, STA and SNE and the output signals of the sensors 40, 60 and 62. The signal from the air conditioner switch 64 is indicative of ON and OFF states of an air conditioner provided on the vehicle.

The transmission control unit 34 is adapted to receive a signal from a shift lever sensor 66, a GEAR POSITION signal SG from a gear position sensor 70 and a VEHICLE SPEED signal SSPD from a vehicle speed sensor 72, as well as the signals SQm, STA and SNE. The shift lever sensor 66 is disposed adjacent to a shift lever provided in the driver's compartment of the vehicle, and the signal generated by this sensor 66 represents one of operating positions of the shift lever, which consist of: PARKING position P; NEUTRAL position N: DRIVE position D; FIRST position 1; SECOND position 2; and REVERSE position R. The gear position sensor 70 and the vehicle speed sensor 72 are provided on the automatic transmission 68, which has one rear drive position, and four forward drive positions, that is, 1st-speed position, 2nd-speed position, 3rd-speed position and 4th-speed position, for changing the speed NE of the engine 10 (hereinafter referred to as the engine speed NE). The GEAR POSITION signal SG represents the currently selected position G of the transmission 68. The VEHICLE SPEED signal SSPD represents the rotating speed of the output shaft of the transmission 68, which is used as a running speed SPD of the vehicle (hereinafter referred to as the vehicle speed SPD).

The automatic transmission 68 is a well known planetary gear type transmission having a plurality of hydraulically operated frictional coupling devices, which are suitably controlled by solenoid-operated valves in a hydraulic system, so as to selectively establish one of the forward and rear drive positions of the transmission 68.

In the present embodiment, the INTAKE AIR QUANTITY signal SQm, THROTTLE OPENING signal STA and ENGINE SPEED signal SNE are applied to both of the engine and transmission control units 32, 34. However, these signals may be applied to at least one of the control units 32, 34, since these control units 32, 34 are connected for interactive data communication. The engine control unit 32 and/or the transmission control unit 34 may be adapted to receive other signals representative of other operating parameters or running conditions of the vehicle, such as on-off states of a brake pedal, steering angle of a steering wheel, gradient of a road surface on which the vehicle runs, and temperature of the exhaust gas, for controlling the engine 10 and/or the transmission 68.

The engine control unit 32 operates to control the fuel injector valve 30, ignitor 48, idling control valve 38 and valve timing changing device 52, depending upon the INTAKE AIR QUANTITY signal SQm (intake air quantity Qm), THROTTLE OPENING signal STA (throttle opening angle TA), ENGINE SPEED signal SNE (engine speed NE), output signal of the sensor 60 (engine coolant temperature), output signal of the sensor 40 (intake air temperature), output signal of the sensor 62 (oxygen concentration of the exhaust gas), output signal of the switch 64 (on-off states of the air conditioner), etc., according to various predetermined arithmetic equations and relationships represented by respective data maps stored in the ROM, so as to regulate the amount and timing of the fuel injection by the fuel injector valve 30, timing of ignition by the spark plug 46, idling speed of the engine 10, and opening and closing timings of the intake and exhaust valves 28, 42, so that the engine 10 is controlled to provide a suitable output, with a minimum of fuel consumption and a reduced amount of harmful exhaust emissions.

The transmission control unit 34 operates to place the automatic transmission 68 in a suitably selected one of the operating positions, according to predetermined shift patterns, depending upon the INTAKE AIR QUANTITY signal SQm, THROTTLE OPENING signal STA, ENGINE SPEED signal SNE, VEHICLE SPEED signal SSPD, GEAR POSITION signal SG and output signal of the shift lever sensor 66.

Referring to the flow charts of FIGS. 2, 5, 13, 16 and 18, there will be described a basic shift control operation for controlling the automatic transmission 68 (with the four forward drive positions) when the vehicle is running with the shift lever placed in the DRIVE position D.

Figure 2A:
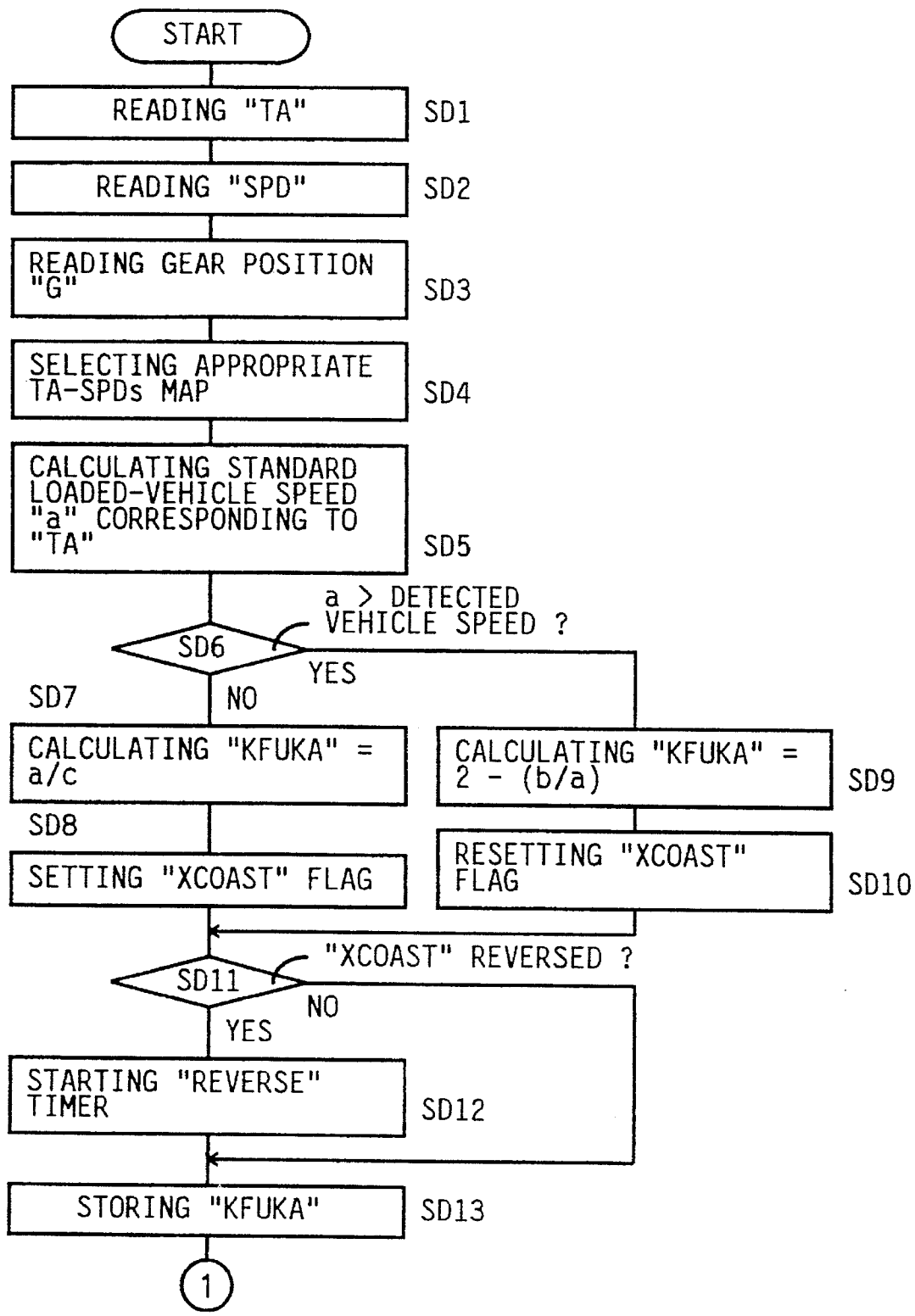
FIGS. 2A and 2B are flow charts illustrating a routine executed by a transmission control unit to detect a running load (coefficient KFUKA) of the vehicle.
Figure 2B:
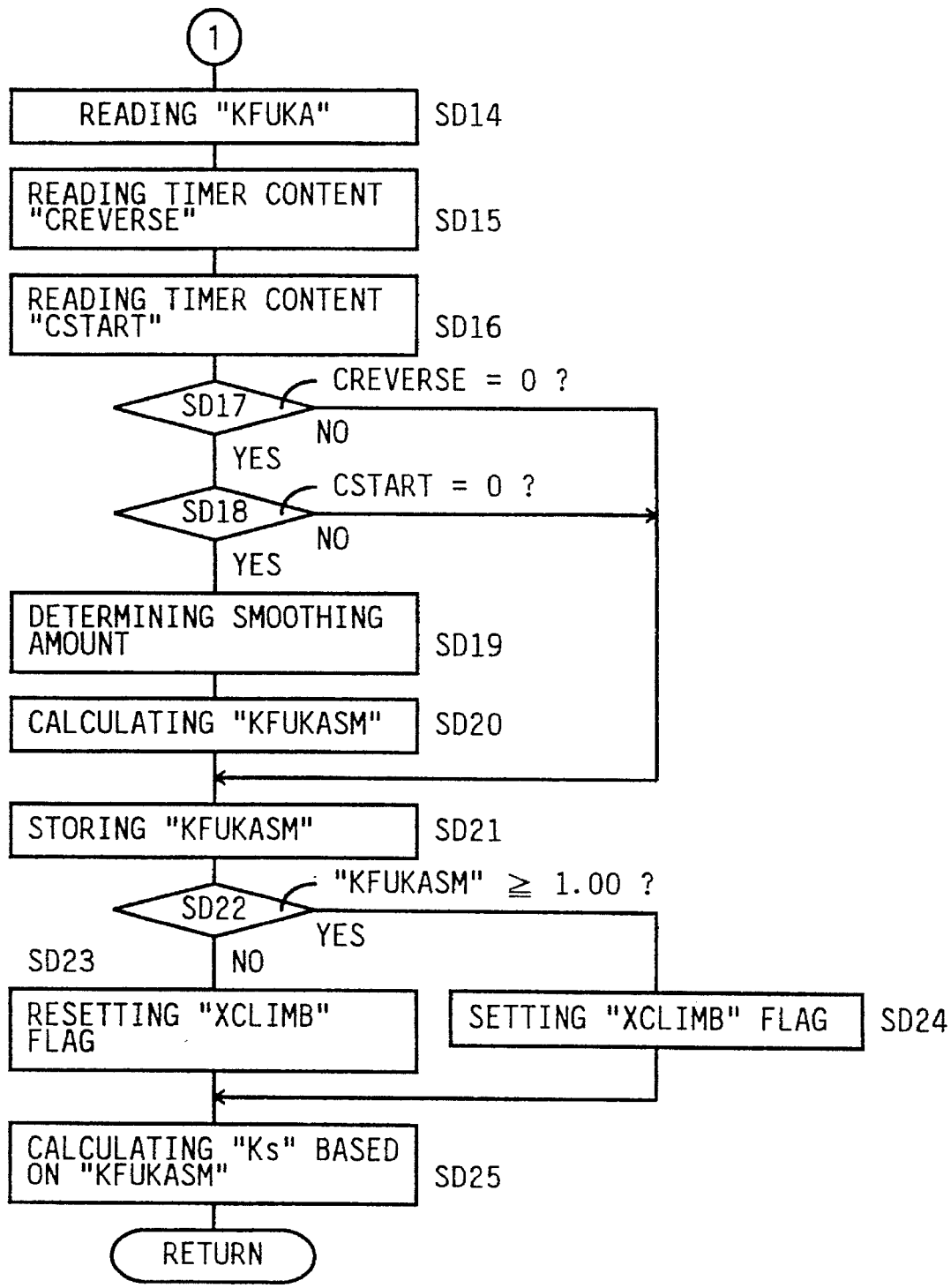
Figure 3:
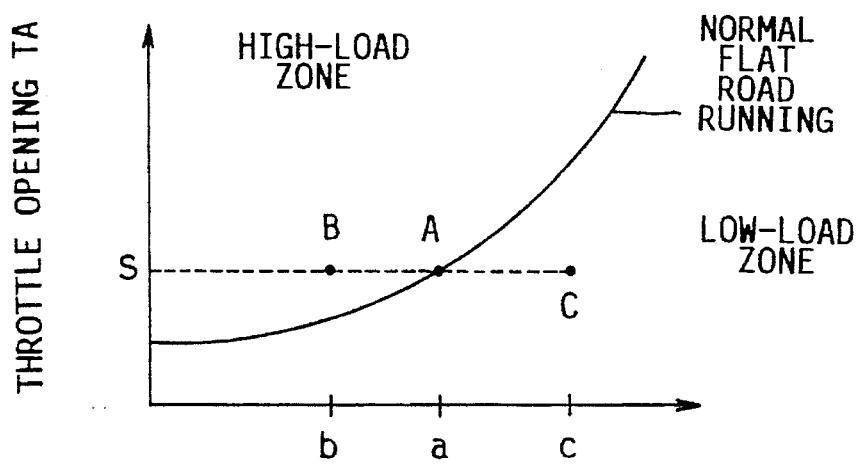
FIG. 3 is a graph indicating an example of a standard TA-SPDs curve selected in step SD4 of the routine of FIGS. 2A and 2B to calculate the vehicle load coefficient KFUKA.

The flow charts of FIGS. 2A and 2B show a routine for detecting a load currently acting on the vehicle. This routine is repeatedly executed with a predetermined cycle time, for example, 32 ms. The routine is initiated with steps SD1, SD2 and SD3 (FIG. 2A) to read the throttle opening angle TA, the vehicle speed SPD and the currently selected position G of the transmission 68, on the basis of the received signals STA, SSPD and SG. Then, the control flow goes to step SD4 which corresponds to means for setting a standard relationship between a load acting on the engine 10 and a running speed of the vehicle. Described more specifically, step SD4 is implemented to select one of TA-SPDs maps which corresponds to the currently selected position G of the transmission 68. The TA-SPDs maps are stored in the ROM of the transmission control unit 34 and represent respective standard TA-SPDs curves representative of respective standard TA-SPDs relationships between the throttle opening angle TA and a standard loaded-vehicle speed SPDs when the vehicle is running in a stable state, namely, at a relatively constant speed on a flat road surface. One of those TA-SPDs curves is indicated in FIG. 3.

The control flow then goes to steps SD5 through SD20 which correspond to vehicle-load determining means for determining a running load acting on the vehicle as represented by the engine load and the vehicle speed. That is, steps SD5–SD20 are implemented to calculate a vehicle load coefficient KFUKA, and a smoothed vehicle load coefficient KFUKASM which is obtained by smoothing the calculated vehicle load coefficient KFUKA. The coefficient KFUKA is indicative of the running load of the vehicle, namely, the load actually acting on the running vehicle, as compared with a standard load which acts on the vehicle while the vehicle is running in a stable mode, that is, at a relatively constant speed on a generally flat road surface.

Described in detail, SD5 is implemented to calculate the standard loaded-vehicle speed SPDs corresponding to the actually detected throttle opening angle TA, according to the standard TA-SPDs map or relationship which was selected in step SD4. If the detected throttle opening angle TA is equal to a value indicated at S in FIG. 3, for example, a vehicle speed "a" corresponding to a point "A" on the TA-SPDs curve is determined as the standard loaded-vehicle speed SPDs. Step SD5 is followed by step SD6 to determine whether the value "a" of the standard loaded-vehicle speed SPDs calculated in step SD4 is higher than the actual vehicle speed SPD which is influenced by or reflects the load actually acting on the vehicle.

If a negative decision (NO) is obtained in step SD6, this means that the vehicle is running with a relatively low load at a speed higher than the standard loaded-vehicle speed SPDs. For instance, if the vehicle is running with the throttle opening angle TA and the speed SPD as indicated at a point "C" in FIG. 3, the standard loaded-vehicle speed "a" is lower than the actual vehicle speed "c", whereby step SD7 is implemented to calculate the vehicle load coefficient KFUKA according to a predetermined equation, KFUKA= a/c. Step SD7 is followed by step SD8 to set a XCOAST flag to "1". If an affirmative decision (YES) is obtained in step SD6, on the other hand, this means that the vehicle is running with a relatively high load at a speed lower than the standard loaded-vehicle speed SPDs. For example, if the vehicle is running in a state indicated at a point "B" in FIG. 3, the standard loaded-vehicle speed "a" is higher than the actual vehicle speed "b", whereby step SD9 is implemented to calculate the vehicle load coefficient KFUKA according to a predetermined equation, KFUKA=2−(b/a). Step SD9 is followed by step SD10 to reset the XCOAST flag to "0". When the XCOAST flag is set at "0", it means that the non-smoothed coefficient KFUKA (before its smoothing) has been calculated or determined while the vehicle is running in a high-load state. When the flag is set at "1", it means that the non-smoothed coefficient KFUKA has been determined while the vehicle is running in a low-load state. It will be understood from the graph of FIG. 4 that the vehicle load coefficient KFUKA is equal or close to "1" when the vehicle is running in a stable state on a flat road surface, and that the coefficient KFUKA is smaller and higher than "1" when the vehicle is running in the low-load and high-load states, respectively. The vehicle is considered to be running in the low-load state when the vehicle is running downhill, and in the high-load state when the vehicle is running uphill.

Figure 4:
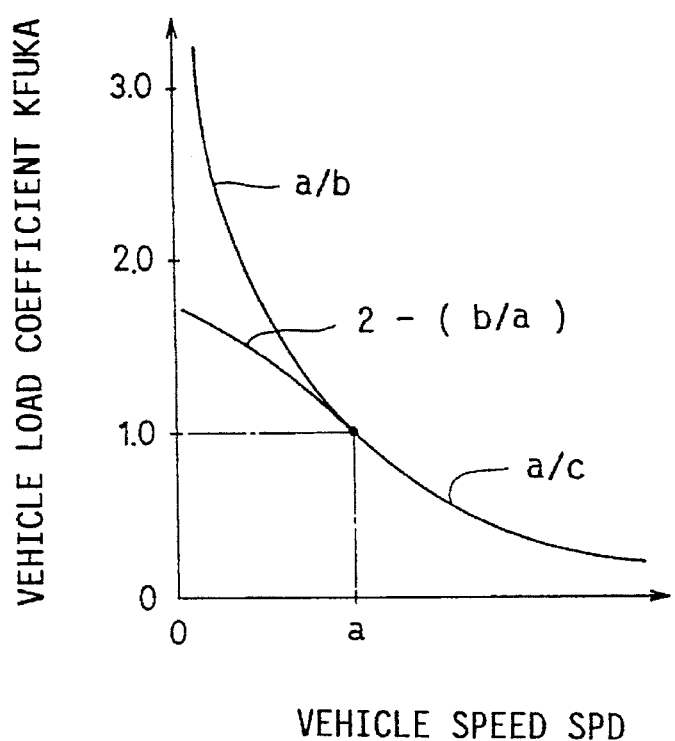
FIG. 4 is a graph indicating a change of the vehicle load coefficient KFUKA calculated in a routine of FIGS. 2A and 2B, according to predetermined equations during vehicle running in low-load and high-load states.

If the vehicle load coefficient KFUKA during running of the vehicle in the high-load state was calculated according to an equation KFUKA=a/b (corresponding to the equation KFUKA=a/c used to calculate the coefficient KFUKA during the vehicle running in the low-load state), the calculated coefficient KFUKA=a/b would increase at an extremely high rate with an increase in the vehicle load (a decrease in the vehicle speed SPD) as indicated in FIG. 4. This excessive increase rate of the coefficient KFUKA (a/b) causes an undesirably large influence on the smoothed coefficient KFUKASM obtained by a subsequent smoothing operation described below. In view of this drawback, the equation KFUKA=2−(b/a) is used to calculate the coefficient KFUKA when the vehicle is running in the high-load state, so that the rate of change of the coefficient KFUKA with the vehicle speed SPD during the vehicle running in the high-load state is almost the same as that in the low-load state, so that the smoothed coefficient KFUKASM is obtained without a considerable influence by the vehicle load.

Steps SD8 and SD10 are followed by step SD11 to determine whether the value of the XCOAST flag has been changed from "1" to "0" or vice versa, namely, whether the running state of the vehicle has been changed from the low-load running state to the high-load running state or vice versa. If an affirmative decision (YES) is obtained in step SD11, step SD12 is implemented to start a REVERSE timer for measuring a time after the reversal of the XCOAST flag. Step SD12 is followed by step SD13 to store the calculated vehicle load coefficient KFUKA in the RAM of the transmission control unit 34. If a negative decision (NO) is obtained in step SD11, step SD12 is skipped and step SD11 is followed by step SD13.

Then, steps SD14, SD15 and SD16 (FIG. 2B) are sequentially implemented to read the coefficient KFUKA, a content CREVERSE of the REVERSE timer and a content CSTART of a START timer. The REVERSE timer and the START timer are controlled by a routine of FIGS. 5A and 5B to detect starting and acceleration/deceleration of the vehicle. This routine of FIGS. 5A and 5B is executed with a cycle time (e.g., 128 ms) longer than the cycle time of the vehicle load detecting routine of FIGS. 2A and 2B.

Figure 5A:
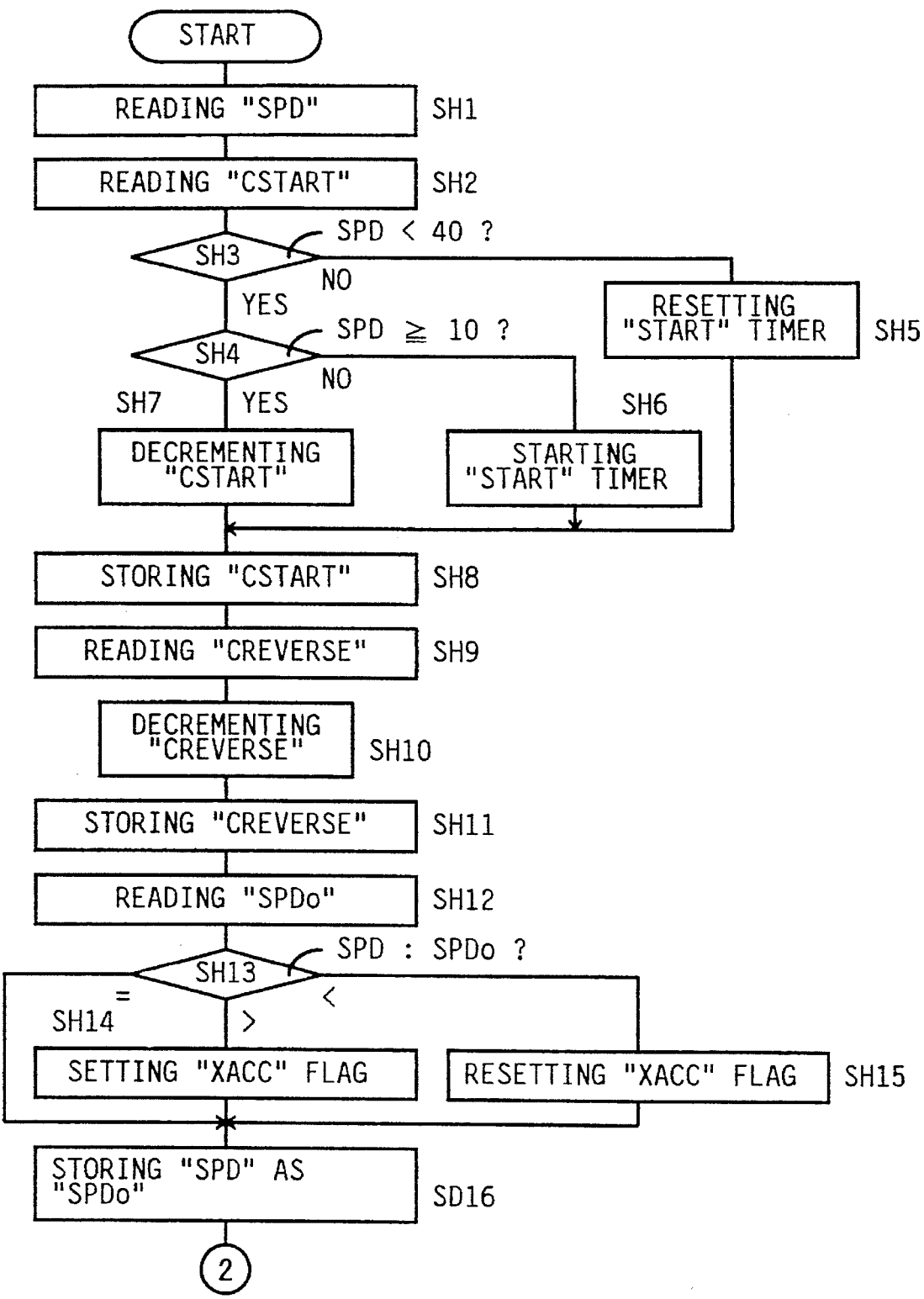
FIGS. 5A and 5B are flow charts illustrating a routine executed by the transmission control unit to measure an after-start time of the vehicle and acceleration/deceleration of the vehicle.
Figure 5B:
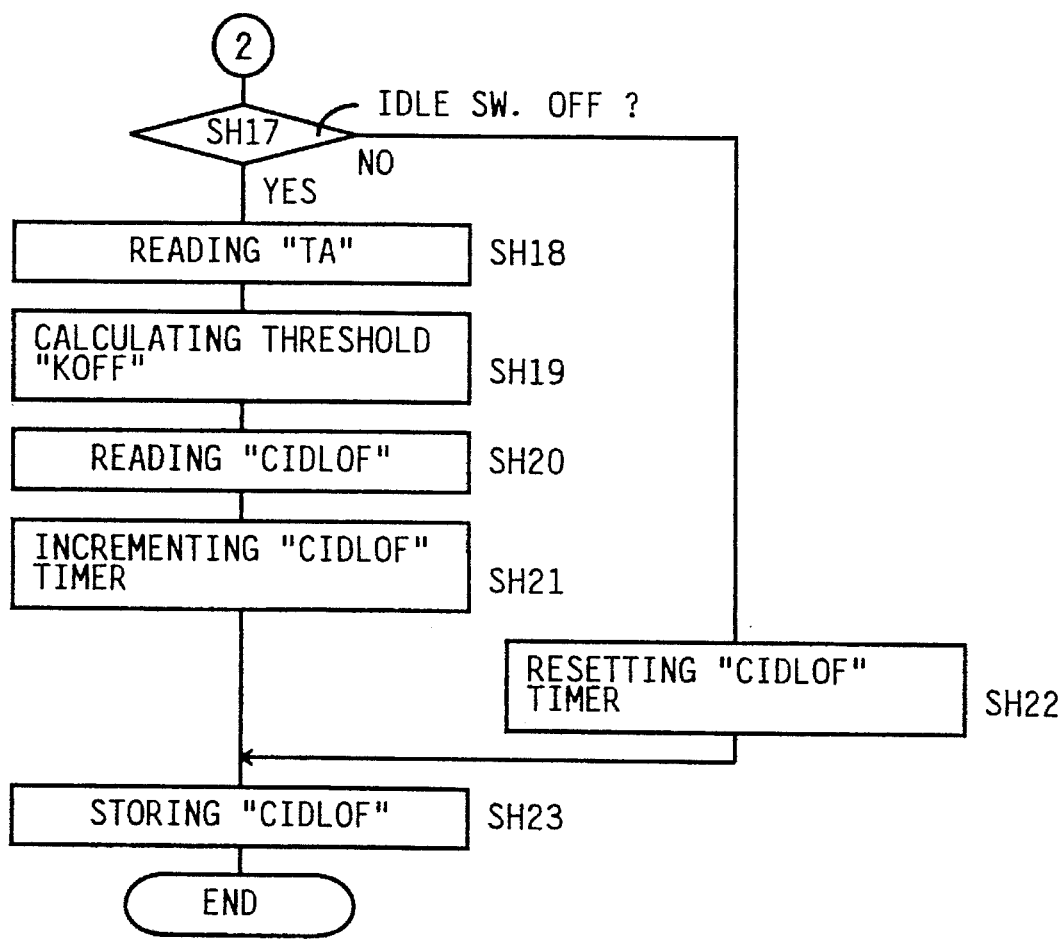

The routine of FIGS. 5A and 5B is initiated with step SH1 to read the vehicle speed SPD. Step SH1 is followed by step SH2 to read the content CSTART of the START timer. The control flow then goes to step SH3 and SH4 to check if the vehicle speed is lower than a predetermined upper limit of 40 km/h and equal to or higher than a predetermined lower limit of 10 km/h. If a negative decision (NO) is obtained in step SH3, the START timer is reset to a predetermined initial value in step SH5. If a negative decision (NO) is obtained in step SH4, the START timer is started in step SH6. If an affirmative decision (YES) is obtained in step SH4, step SH7 is implemented to decrement the content CSTART of the START timer. Thus, the START timer is controlled to measure a time lapse after the vehicle has been started. When the vehicle speed exceeds the upper limit of 40 km/h, the START timer is reset to the initial value.

Steps SH5, SH6 and SH7 are followed by step SH8 to store the content CSTART of the START timer. Step SH9 is then implemented to read the content CREVERSE of the REVERSE timer. Step SH9 is followed by step SH10 to decrement the content CREVERSE, and step SH11 to store the content CREVERSE. The START timer and the REVERSE timer are decrement timers whose contents CSTART, CREVERSE are decremented from the predetermined initial values. The content CSTART is decremented after the vehicle speed SPD exceeds the lower limit of 10 km/h, while the content CREVERSE is decremented after the XCOAST flag has been reversed (after the affirmative decision is obtained in step SD11). For instance, the START timer and the REVERSE timers are initially set to respective initial values of 6.0 sec and 1.2 sec. These initial values correspond to time durations during which the smoothing of the vehicle load coefficient KFUKA is inhibited, as described later.

The control flow then goes to step SH12 to read the previous vehicle speed SPDo read in step SH1 in the last cycle of execution of the routine. Step SH13 is then implemented to compare the current vehicle speed SPD (read in the present cycle of execution of the routine) with the previous vehicle speed SPDo read in step SH13 (read in the last cycle of execution), to determine whether the vehicle is accelerating, decelerating or running at a constant speed. That is, if the current vehicle speed SPD is higher than the previous vehicle speed SPDo, step SH14 is implemented to set a XACC flag to "1". If the current vehicle speed SPD is lower than the previous vehicle speed SPDo, step SH15 is implemented to reset the XACC flag. Steps SH14 and SH15 are followed by step SH16 in which the current vehicle speed SPD is stored as the previous vehicle speed SPDo. If the current vehicle speed SPD is the same as the previous vehicle speed SPDo, step SH13 is followed by step SH16. It will be understood that the content "1" of the XACC flag indicates the accelerating state of the vehicle, while the content "0" of the same indicates the decelerating state.

Figure 6:
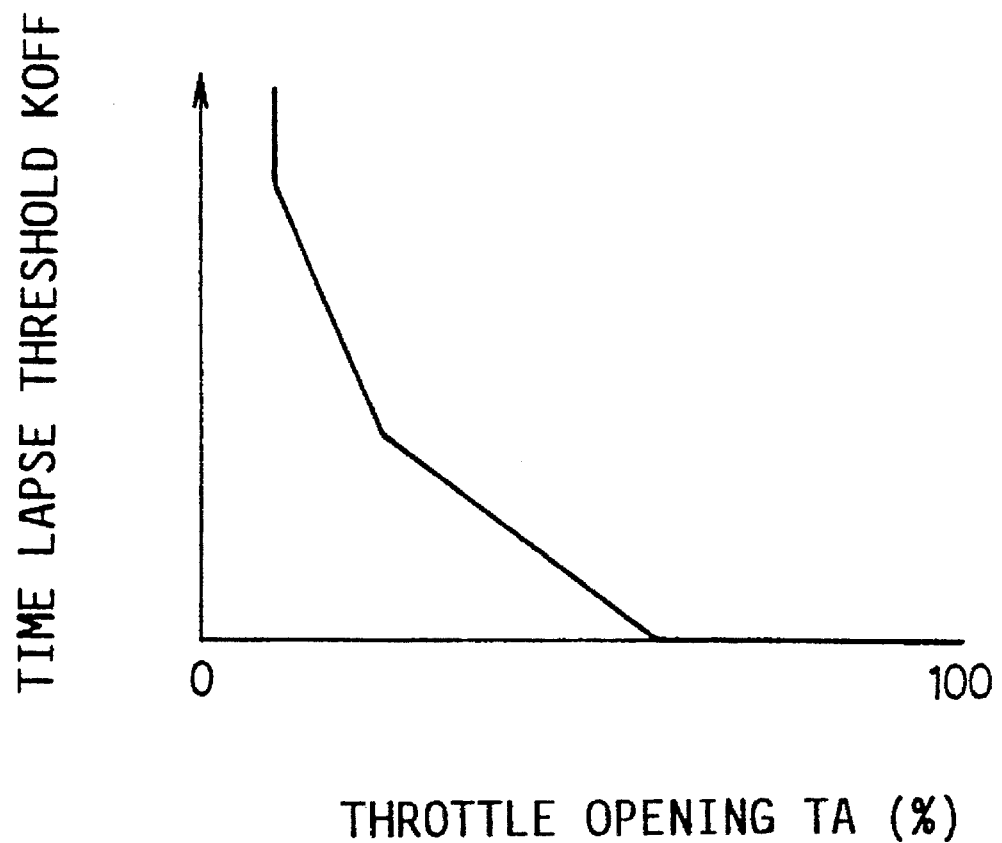
FIG. 6 is a graph indicating a KOFF-TA relationship used in step SH19 of the routine of FIG. 5 to calculate a delay time KOFF by which the cancellation of inhibition of transmission shift-up to the 3rd-speed position is delayed.

Then, the control flow goes to step SH17 (FIG. 5B) to determine whether the idling position switch of the throttle sensor 36 is in the off state or not. If a negative decision (NO) is obtained in step SH17, step SH22 is implemented to reset a content CIDLOF of a IDLOF timer. If an affirmative decision (YES) is obtained in step SH17, step SH18 is implemented to read the current throttle opening angle TA. Step SH18 is followed by step SH19 to calculate a time lapse threshold KOFF, on the basis of the throttle opening angle TA, and according to a predetermined relationship between TA and KOFF as indicated in FIG. 6 by way of example. Then, steps SH20 and SH21 are implemented to read the content CIDLOF of the IDLOF timer, and increment the content CIDLOF. Step SH21 and SH22 are followed by step SH23 in which the current content CIDLOF is stored in the RAM of the transmission control unit 34. The IDLOF timer is provided to measure a time lapse after the accelerator pedal has been depressed, namely, after the idling position switch has been turned off. The time lapse threshold KOFF is used as a threshold for resetting a X3RDD flag for inhibiting an automatic shift-down action of the transmission 68 from the 4th-speed position to the 3rd-speed position as described below by reference to the flow charts of FIGS. 13A and 13B.

Referring back to the flow chart of FIG. 2B, step SD16 is followed by step SD17 to determine whether the content CREVERSE of the REVERSE timer is zero or not. If an affirmative decision (YES) is obtained in step SD17, step SD18 is implemented to determine whether the content CSTART of the START timer is zero or not. If a negative decision (NO) is obtained in step SD17 or SD18, steps SD19 and SD20 for smoothing the vehicle load coefficient KFUKA are skipped, so that the smoothing operation to obtain the smoothed vehicle load coefficient KFUKASM is inhibited during respective predetermined time lengths corresponding to the initial contents of the REVERSE and START timers. If an affirmative decision (YES) is obtained in both steps SH17 and SH18, the control flow goes to step SH19 to determine an amount of smoothing of the non-smoothed vehicle load coefficient KFUKA (to obtain the smoothed coefficient KFUKASM), according to a data table as illustrated in FIG. 7. Described more specifically, the smoothing amount is selected within a range between 1/128 and 1/16, depending upon the specific condition of the vehicle, more specifically, depending upon a specific combination of the values of flags XCLIMB, XCOAST, YIDL and XACC and the running state of the vehicle, as shown in FIG. 7. The XCOAST flag indicates a change of the non-smoothed vehicle load coefficient KFUKA, namely, a change of the load state of the vehicle, while the XCLIMB flag indicates a change of the smoothed vehicle load coefficient KFUKASM. The YIDL flag indicates an operating state of the idling position switch of the throttle sensor 36, which is turned ON when the throttle valve 20 is set at the idling position. The XACC flag indicates the accelerating and decelerating condition of the vehicle. In the table of FIG. 7, "*" mark indicates that the appropriate state or value of the flags do not influence the smoothing amount. That is, the smoothing amount is determined by the parameters other than those indicated by the "*" mark.

Then, the control flow goes to step SD20 in which the smoothed vehicle load coefficient KFUKASM is calculated according to the following equation:

$$KFUKASM = KFUKASMo + n \cdot (KFUKA - KFUKASMo)$$

where, KFUKASMo: KFUKASM calculated in step SD20 in the last cycle of execution of the routine
n: smoothing amount determined in step SD19

Step SD20 is followed by step SD21 in which the calculated smoothed vehicle load coefficient KFUKASM is stored in the RAM of the transmission control unit 34. The smoothed coefficient KFUKASM thus obtained is sufficiently smoothed as compared with the non-smoothed coefficient value KFUKA, as shown in FIG. 8.

Figure 8:
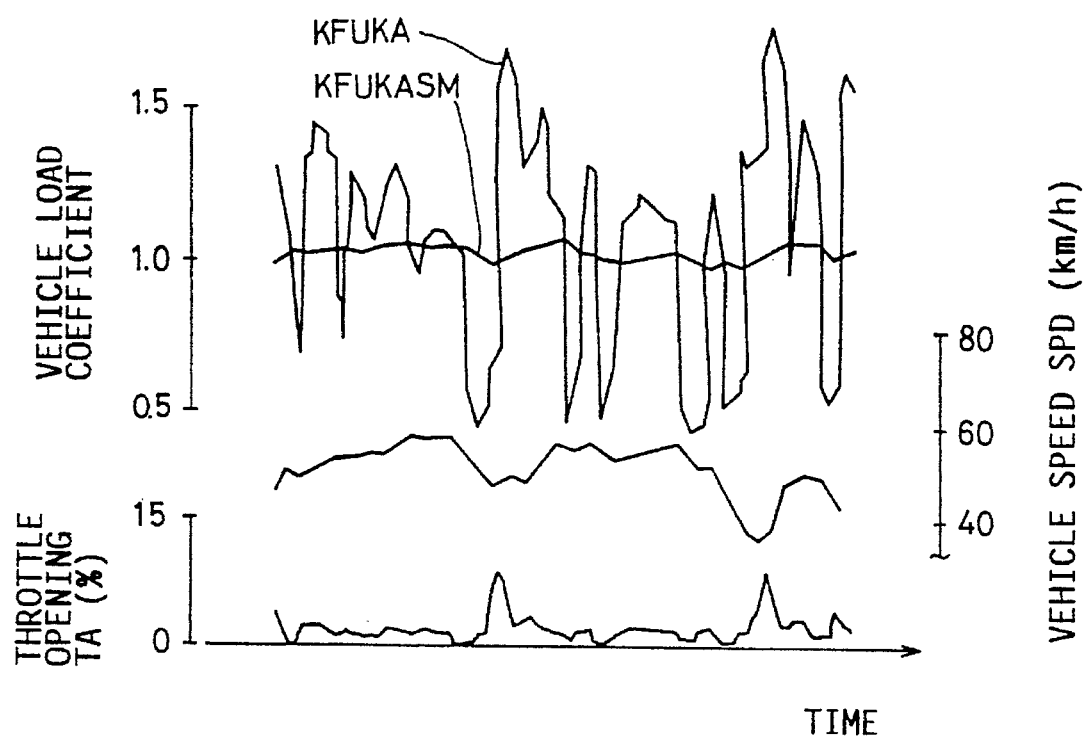
FIG. 8 is a view depicting a waveform of the smoothed vehicle load coefficient KFUKASM obtained in step SD20 of the routine of FIG. 2, in comparison with a waveform of the non-smoothed value KFUKA.

It is noted that the smoothed vehicle load coefficient KFUKASM as indicated in FIG. 8 is not adversely influenced by acceleration of the vehicle during starting of the vehicle, because steps SD19 and SD20 are skipped until the affirmative decision (YES) is obtained in step SD18, that is, until a predetermined time corresponding to the content CSTART of the START timer has passed after the vehicle start. While the vehicle is starting, the smoothed vehicle load coefficient KFUKASM if obtained during this period tends to be excessively large. Therefore, the operation to obtain the smoothed value KFUKASM is inhibited during a given period following the starting of the vehicle.

It is also noted that the smoothed value KFUKASM is not adversely influenced by the reversal of the load state of the vehicle, from the low-load state to the high-load state or vice versa, because steps SD19 and SD20 are skipped until the affirmative decision (YES) is obtained in step SD17, that is, until a predetermined time measured by the REVERSE timer has passed after the value of the XCOAST flag is reversed. Although the XACC flag is used as one of the parameters for determining the smoothing amount, the XACC flag is not sufficiently responsive to the change of the vehicle load condition. Accordingly, the XCOAST flag is used to inhibit the implementation of steps SD19 and SD20 to obtain the smoothed vehicle load coefficient KFUKASM during a predetermined inhibit time corresponding to the content CREVERSE of the REVERSE timer.

Figure 9:
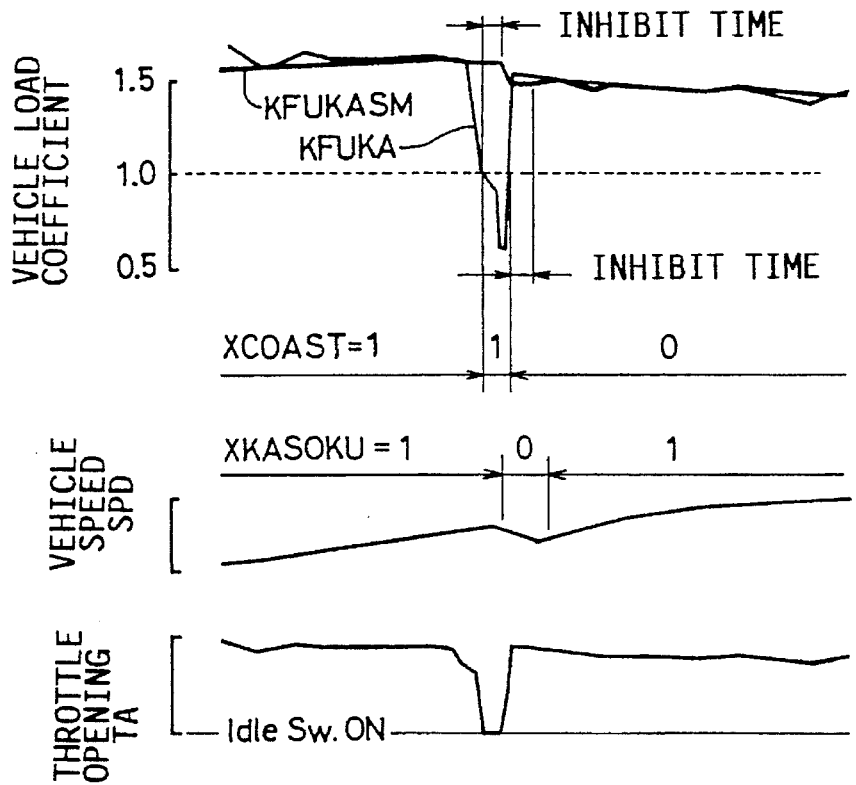
FIG. 9 is a view for explaining an effect obtained by inhibiting the smoothing in step SD20 of the vehicle load coefficient KFUKA for a predetermined delay time following a change of the value KFUKA across the level of 1.
Figure 10:
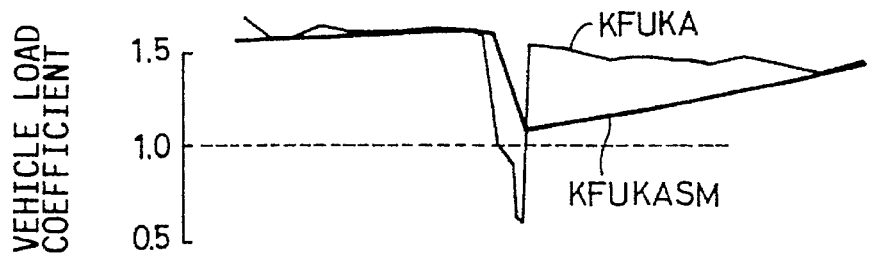
FIG. 10 is a graph corresponding to the top graph of FIG. 9, in the case where the smoothing of the vehicle load coefficient KFUKA for the delay time is not inhibited.

According to the above arrangements for inhibiting the smoothed vehicle load coefficient KFUKASM from being updated under the particular conditions indicated above, the smoothed vehicle load coefficient KFUKASM is sufficiently smoothly changed, even if the non-smoothed value KFUKA is excessively lowered due to the reversal of the XCOAST flag, for example, as indicated in FIG. 9. If the above arrangements were not provided, the smoothed value KFUKASM is excessively lowered together with the non-smoothed value KFUKA, due to a change of the load condition of the vehicle.

Figure 11:
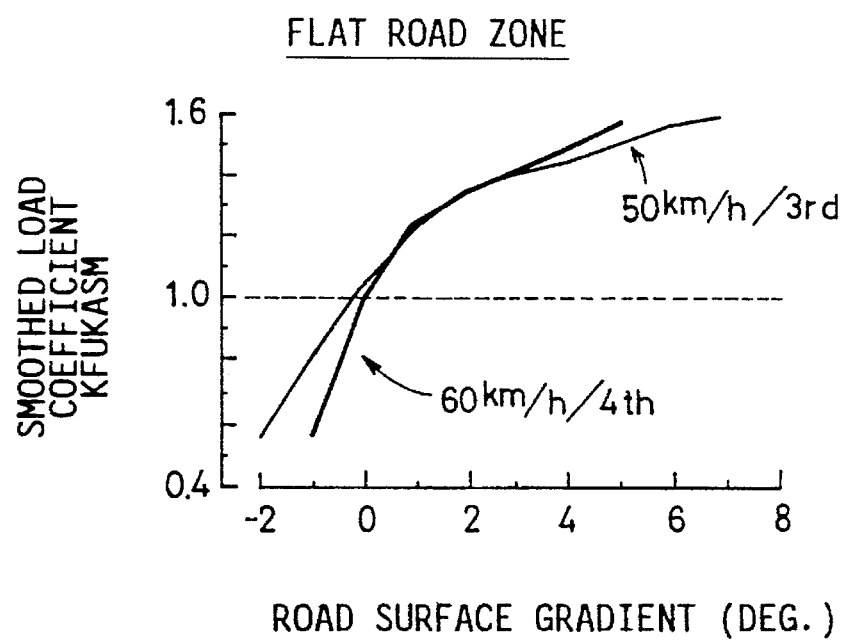
FIG. 11 is a graph for explaining a change in the smoothed vehicle load coefficient KFUKASM (obtained by the routine of FIG. 2) in relation to the gradient of the road surface on which the vehicle runs.

The smoothed vehicle load coefficient KFUKASM as calculated in step SD20 varies with the load acting on the vehicle, as indicated in FIG. 11, that is, varies with a change of the road surface gradient. It will be understood that the vehicle load changes with the road surface gradient. The KFUKASM-gradient curves shown in FIG. 11, which are generally upwardly convex, cause the value KFUKASM to change with a higher response to the road surface gradient (vehicle load) when the vehicle is running on a flat road surface (road surface gradient near 0 degree), than when the vehicle is running uphill or downhill. In other words, the response of the calculated smoothed vehicle load coefficient KFUKASM increases as the road surface gradient (vehicle load) decreases.

Figure 12:
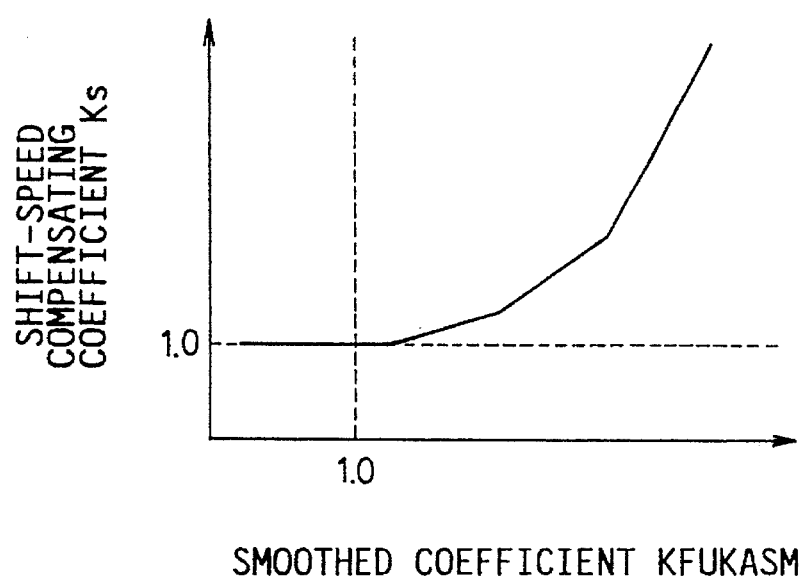
FIG. 12 is a graph indicating a relationship used in step SD25 of the routine of FIG. 2 to calculate a shift-speed compensating coefficient Ks on the basis of the smoothed vehicle load coefficient KFUKASM.

Step SD21 is followed by step SD22 to determine whether the smoothed vehicle load coefficient KFUKASM is equal to or larger than 1.00, or not. If a negative decision (NO) is obtained in step SD22, step SD23 is implemented to reset the XCLIMB flag. If an affirmative decision (YES) is obtained in step SD22, namely, if the value KFUKASM has increased to 1.00 or higher, step SD24 is implemented to set the XCLIMB flag. Steps SD23 and SD24 are followed by step SD25 in which a shift-speed compensating coefficient Ks for adjusting a shift speed of the vehicle (which will be described) is calculated on the basis of the smoothed vehicle load coefficient KFUKASM and according to a predetermined relationship as represented by a KFUKASM-Ks curve as indicated in FIG. 12. This curve is generally downwardly convex, so that the rate of linear increase of the compensating coefficient Ks increases as the smoothed vehicle load coefficient KFUKASM increases. The shift-speed compensating coefficient Ks is used to adjust the shift speed which is determined by a predetermined shift pattern and at which the transmission 68 is shifted from one position to another. More specifically, the determined shift speed is multiplied by the shift-speed compensating coefficient Ks, so that the transmission 68 is shifted according to not only the predetermined shift pattern but also the load acting on the vehicle (e.g., a load due to the road surface gradient).

Referring next to the flow charts of FIGS. 13A and 13B, there will be described a shift-down flag control routine for controlling a X2NDD flag and a X3RDD flag for regulating automatic shift-down actions of the transmission 68 from the 4th-speed position to the 2nd-speed position and the 3rd-speed position, restrictively, so as to apply an effective engine brake to the vehicle while the vehicle is running downhill. This shift-down flag control routine is executed with the same cycle time as a main shift-control routine of FIGS. 18A and 18B (which will be described).

The shift-down flag control routine is initiated with step SA1 (FIG. 13A) to determine whether the smoothed vehicle load coefficient KFUKASM is smaller than a predetermined lower limit of 0.95, or not. The coefficient KFUKASM not larger than 0.95 is one of the conditions that should be satisfied to automatically shift down the transmission 68 from the 4th-speed position to the 3rd-speed or 2nd-speed position. If the coefficient KFUKASM is 0.95 or smaller, it means that the vehicle is running downhill. If a negative decision (NO) is obtained in step SA1, steps SA5 and SA6 are implemented to reset the X3RDD and X2NDD flags to "0", and one cycle of execution of the present routine is terminated. If an affirmative decision (YES) is obtained in step SA1, the control flow goes to step SA2 to determine whether the non-smoothed vehicle load coefficient KFUKA is smaller than a predetermined upper limit of 1.05.

If a negative decision (NO) is obtained in step SA2, steps SA5 and SA6 described above are implemented to inhibit the automatic shift-down actions of the transmission 68. If an affirmative decision (YES) is obtained in step SA2, the control flow goes to step SA3 to determine whether the idling position switch of the throttle sensor 36 is in the OFF state or not. The ON state of the idling position switch is another condition that should be satisfied to effect the automatic shift-down actions of the transmission 68. If an affirmative decision (YES) is obtained in step SA3, it means that the accelerator pedal is depressed. In this case, step SA3 is followed by step SA4 to determine whether the content CIDLOF of the IDLOF timer is smaller than the time lapse threshold KOFF calculated in step SH19 of the routine of FIGS. 5A and 5B. Namely, step SA4 is implemented to determine whether the time after the accelerator pedal has been depressed is shorter than the predetermined threshold KOFF. If an affirmative decision (YES) is obtained in step SA4, step SA6 is implemented to reset the X2NDD flag. If a negative decision (NO) is obtained in step SA4, both steps SA5 and SA6 are implemented to reset both of the X3RDD and X2NDD flags.

Figure 14:
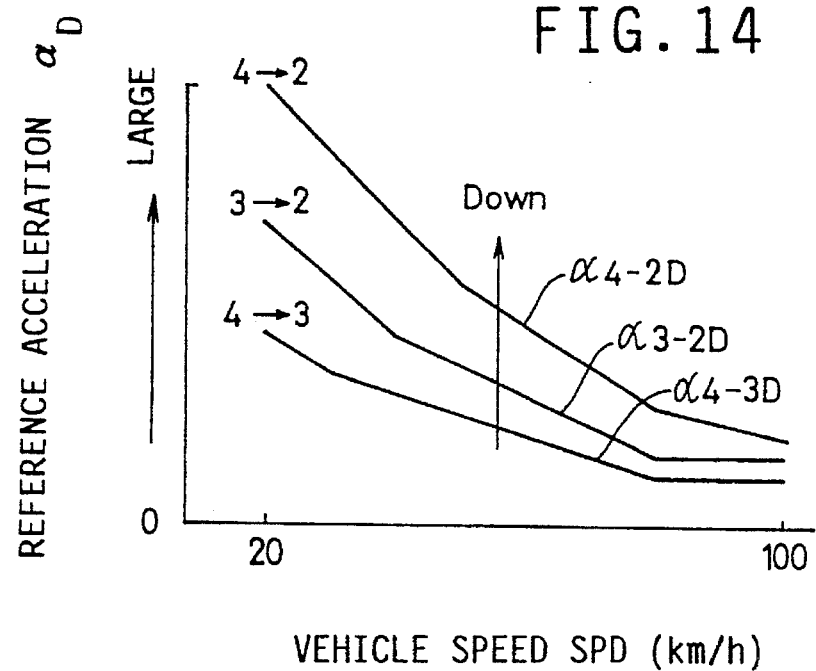
FIG. 14 is a graph indicating relationships used in steps SA8, SA10 and SA14 of the routine of FIGS. 13A and 13B to calculate reference acceleration values $\alpha_{4\text{-}2D}$, $\alpha_{4\text{-}3D}$ and $\alpha_{3\text{-}2D}$.

If a negative decision (NO) is obtained in step SA3, it means that the accelerator pedal is not depressed. In this instance, the control flow goes to step SA7 to determine whether the X3RDD flag is set at "0" or not. Initially, an affirmative decision (YES) is obtained in step SA7, and step SA8 is implemented to calculate a reference acceleration value $\alpha_{4-2D}$ on the basis of the vehicle speed SPD and according to a predetermined relationship between SPD and $\alpha_{4-2D}$ as indicated in FIG. 14. The reference acceleration value $\alpha_{4-2D}$ is used to determine whether the X2NDD flag should be set to "1" or not. Step SA8 is followed by step SA9 to determine whether an actual acceleration $\alpha$ of the vehicle is higher than the calculated reference value $\alpha_{4-2D}$. If an affirmative decision (YES) is obtained in step SA9, the control flow goes to step SA16 to set the X2NDD flag to "1", and step SA12 to set the X3RDD flag to "1", and one cycle of execution of the routine is terminated.

If a negative decision (NO) is obtained in step SA9, step SA10 is implemented to calculate a reference acceleration value $\alpha_{4-3D}$ on the basis of the vehicle speed SPD and according to a predetermined relationship between SPD and $\alpha_{4-3D}$ as indicated in FIG. 14. The reference acceleration value $\alpha_{4-3D}$ is used to determine whether the X3RDD flag should be set to "1" or not. Step SA10 is followed by step SA11 to determine whether the actual acceleration $\alpha$ of the vehicle is higher than the calculated reference value $\alpha_{4-3D}$. If an affirmative decision (YES) is obtained in step SA11, the control flow goes to step SA12 to set the X3RDD flag to "1", and one cycle of execution of the routine is terminated. If a negative decision (NO) is obtained in step SA11, one cycle of the routine is immediately terminated.

If the X3RDD flag is set to "1" as described above, a negative decision (NO) is obtained in step SA7 in the next cycle of execution of the routine, and the control flow goes to step SA13 (FIG. 13B) to determine whether the X2NDD flag is set at "0" or not. If an affirmative decision (YES) is obtained in step SA13, step SA14 is implemented to calculate a reference acceleration value $\alpha_{3-2D}$ on the basis of the vehicle speed SPD and according to a predetermined relationship between SPD and $\alpha_{3-2D}$ as indicated in FIG. 14. This reference acceleration value $\alpha_{3-2D}$ is used to determine whether the X2NDD flag should be set to "1" or not. Step SA14 is followed by step SA15 to determine whether the actual acceleration $\alpha$ of the vehicle is higher than the calculated reference value $\alpha_{3-2D}$. If an affirmative decision (YES) is obtained in step SA15, the control flow goes to steps SA16 and SA12 to set the X2NDD flag and the X3RDD flag to "1". If a negative decision (NO) is obtained in step SA15, one cycle of the routine is immediately terminated.

Figure 15:
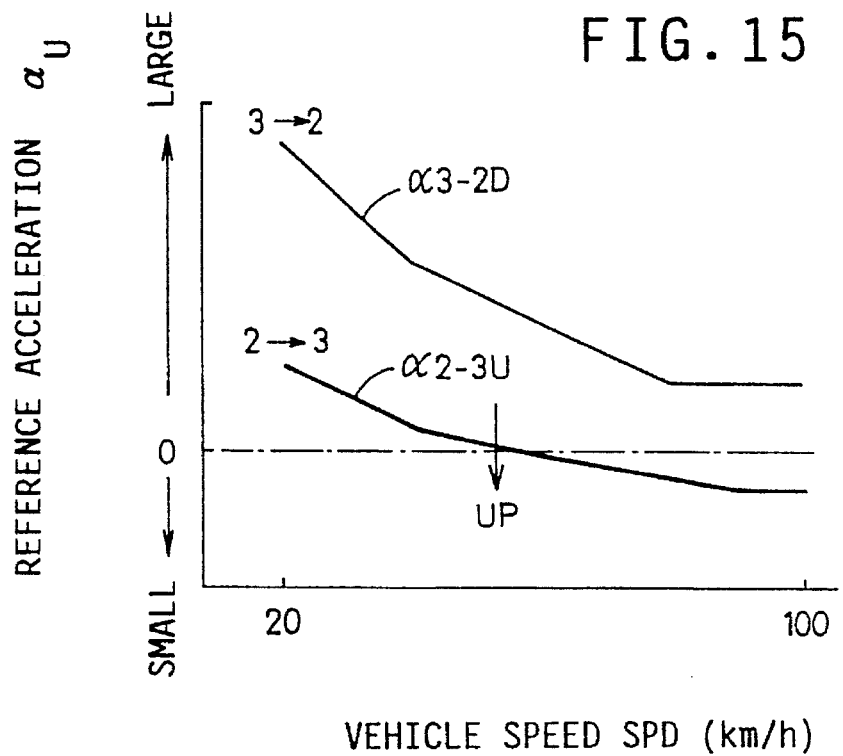
FIG. 15 is a graph indicating relationships used in step SA17 of the routine of FIG. 13B to calculate a reference acceleration $\alpha_{2\text{-}3U}$.

If a negative decision (NO) is obtained in step SA13, step SA17 is implemented to calculate a reference acceleration value $\alpha_{2-3U}$ on the basis of the vehicle speed SPD and according to a predetermined relationship between SPD and $\alpha_{2-3U}$ as indicated in FIG. 15. This reference acceleration value $\alpha_{2-3U}$ is used to determine whether the X2NDD flag should be reset to "0" or not. Step SA17 is followed by step SA18 to determine whether the actual acceleration $\alpha$ of the vehicle is lower than the calculated reference value $\alpha_{2-3U}$. If an affirmative decision (YES) is obtained in step SA18, the control flow goes to steps SA19 to reset the X2NDD flag to "0". If a negative decision (NO) is obtained in step SA18, one cycle of the routine is immediately terminated.

Figure 13A:
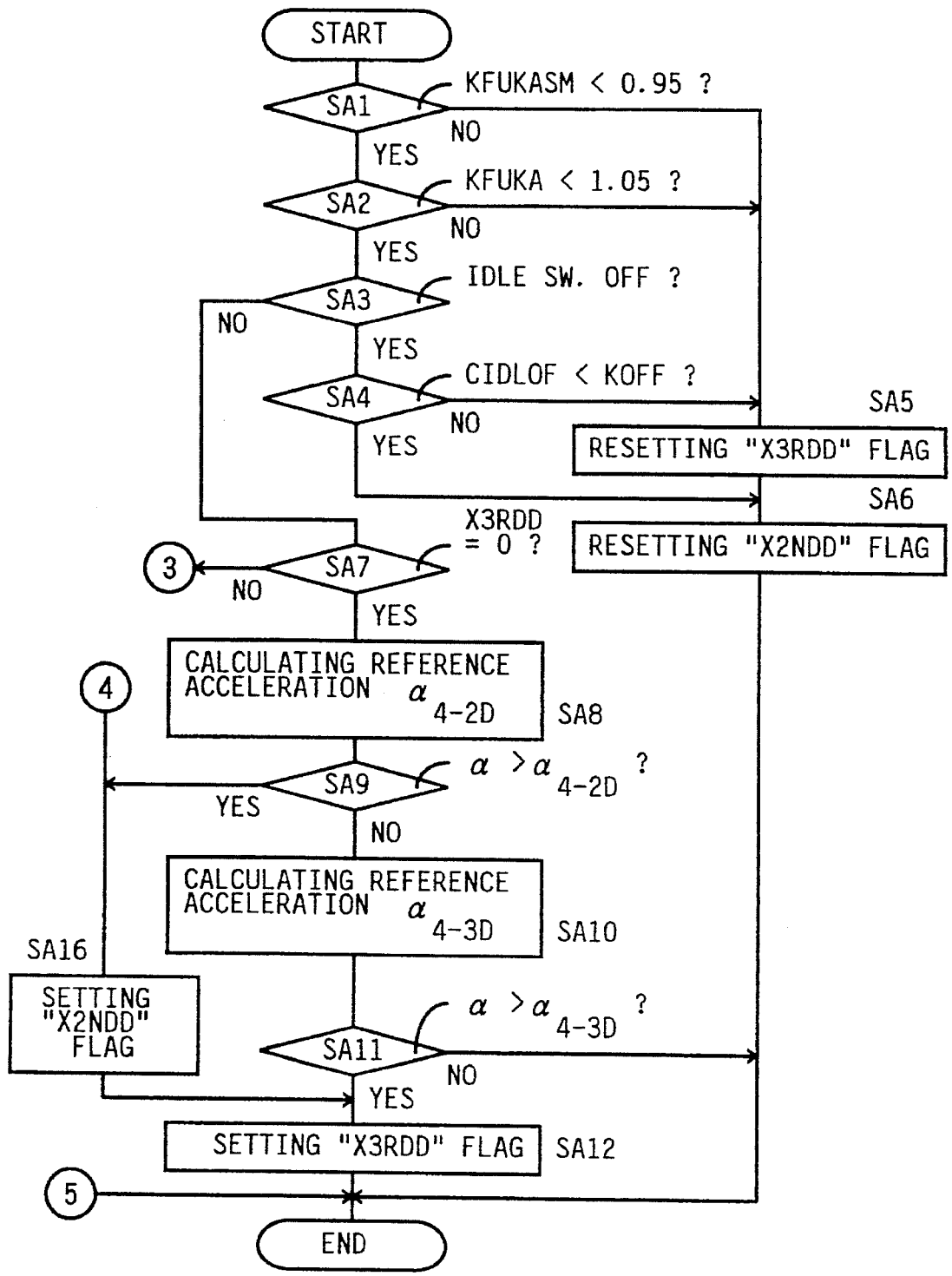
FIGS. 13A and 13B are flow charts illustrating a shift-down flag control routine executed by the transmission control unit to control shift-down flags for regulating automatic shift-down actions of the transmission so as to provide an adequate engine-braking effect.
Figure 13B:
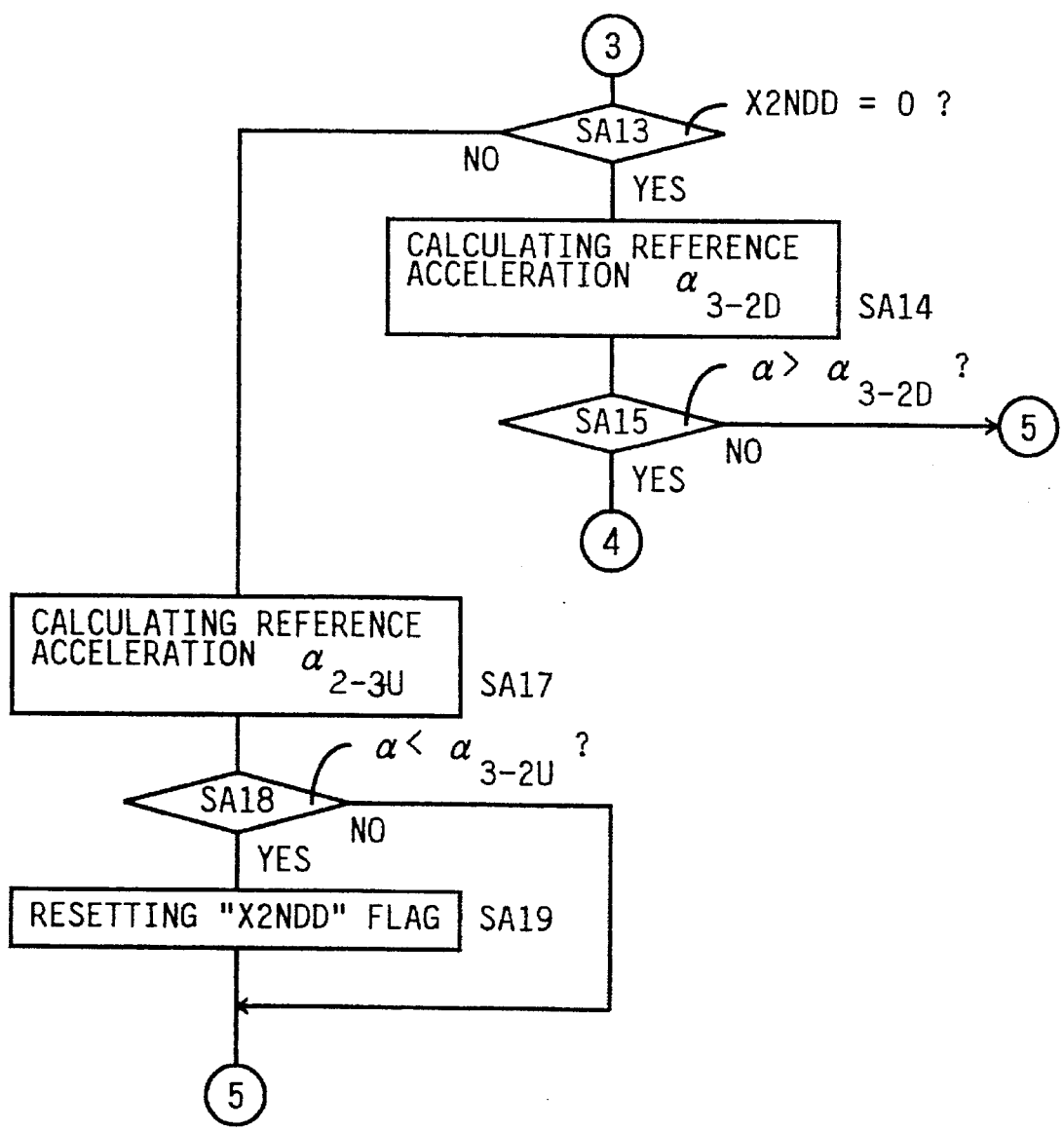

It will be understood that the routine of FIGS. 13A and 13B is formulated so that the transmission 68 is automatically shifted down from the 4th-speed position to the 2nd-speed or 3rd-speed position, or from the 3rd-speed position to the 2nd-speed position, depending upon the detected acceleration $\alpha$ of the vehicle, so as to apply a suitable engine brake to the vehicle when the vehicle is running downhill without the accelerator pedal being depressed, and with the smoothed vehicle load coefficient KFUKASM being 0.95 or smaller. Further, the present routine is adapted to inhibit the automatic shift-down action of the transmission 68 to the 2nd-speed position when the accelerator pedal is depressed or when the acceleration $\alpha$ becomes lower than the reference acceleration value $\alpha_{2-3U}$. The routine is also adapted to inhibit the shift-down action of the transmission 68 to the 3rd-speed position when the non-smoothed vehicle load coefficient KFUKA has increased to 1.05 or larger, or when the time lapse after the depression of the accelerator pedal has reached the threshold KOFF determined by the KOFF-TA relationship of FIG. 6.

Referring next to the flow charts of FIGS. 16A and 16B, there will be described a routine for inhibiting a shift-up action of the transmission 68 to the 4th-speed position. This routine, which is executed with the same cycle time as the main routine of FIGS. 18A and 18B, uses a X3RDH flag for provisionally cancelling the inhibition of the shift-up action to the 4th-speed position, and a X3HOLD flag for inhibiting the shift-up action to the 4th-speed position. These X3RDH and X3HOLD flags are set to "1" when the load acting on the vehicle is relatively large, for example, when the vehicle is running uphill. When the vehicle load is lowered below a given limit, the X3HOLD flag is reset to "0", whereby the inhibition of the shift-up action to the 4th-speed position is cancelled.

The routine is initiated with step SE1 (FIG. 16A) to determine whether a X43DWN flag is set at "1". This X43DWN flag is set to "1" in step SS22 of the main routine of FIGS. 18A and 18B when the transmission 68 has been shifted down to the 3rd-speed position with the idling position switch of the throttle sensor 36 being OFF, that is, with the accelerator pedal being depressed. For example the X43DWN flag is set to "1" when the vehicle speed is lowered with the accelerator pedal being depressed during uphill running. If a negative decision (NO) is obtained in step SE1, the control flow goes to step SE6 to reset the X3RDH to "0", and step SE7 to reset a C3RDH counter, and one cycle of execution of the routine is terminated.

If an affirmative decision (YES) is obtained in step SE1, the control flow goes to step SE2 to determine whether the X3RDH flag is set at "1". Initially, this X3RDH flag is set at "0", and step SE3 (FIG. 16B) is implemented to determine whether the smoothed vehicle load coefficient KFUKASM is equal to or larger than a threshold value of 1.20, or not. This threshold value is determined to check if the shift-down action of the transmission 68 to the 3rd-speed position with the accelerator pedal being depressed occurred during uphill running of the vehicle or not. That is, if the coefficient KFUKASM is 1.20 or larger, it means that the vehicle was running uphill when the transmission 68 was shifted down to the 3rd-speed position even with the accelerator pedal being depressed.

If a negative decision (NO) is obtained in step SE3, it means that the load acting on the vehicle is not so large. In this case, steps SE4 and SE5 are implemented to reset the X3HOLD flag and the X43DWN flag to "0". Step SE5 is followed by steps SE6 and SE7 to reset the X3RDH flag and the C3RDH counter.

If an affirmative decision (YES) is obtained in step SE3, it means a situation in which the vehicle driver is likely to further depress the accelerator pedal due to shortage of the vehicle drive force if the transmission 68 is shifted back up to the 4th-speed position. In this case, steps SE8 and SE9 are implemented to set the X3RDH flag and the X3HOLD flag to "1". Then, the control flow goes to step SE10 to calculate a reference value K3HOLD used to determine whether the inhibition of the shift-up action to the 4th-speed position should be cancelled or not. The reference value K3HOLD is obtained by subtracting a predetermined value $\beta$ from the smoothed vehicle load coefficient KFUKASM when the X3RDH and X3HOLD flags were set.

With the X3RDH and X3HOLD flags being set to "1" as described above, an affirmative decision (YES) is obtained in step SE2 in the next cycle of execution of the routine, and step SE11 is implemented to determine whether the smoothed vehicle load coefficient KFUKASM is equal to or larger than the reference value K3HOLD determined in step SE10. If the coefficient KFUKASM is equal to or larger than the reference value K3HOLD, it means that the vehicle load is still relatively large. In this case, the control flow goes to step SE12 to read the content of the C3RDH counter, and steps SE13 through SE18 to increment the C3RDH counter depending upon the accelerating or decelerating condition of the vehicle.

Described in detail, the content of the C3RDH counter changes sequentially from "0" to "3" each time the counter is incremented. If the counter is incremented when its content is "3", the content changes back to "0". If the content is "0" or "2", it means the deceleration of the vehicle. If the content is "1" or "3", it means the acceleration of the vehicle. If an affirmative decision (YES) is obtained in step SE14, for example, it means that the vehicle was accelerating. In this case, step SE15 is implemented to determine whether the vehicle is now decelerating or not. If an affirmative decision (YES) is obtained in step SE15, namely, if the vehicle is now decelerating, the control flow goes to step SE18 to increment the C3RDH counter to "2" so that the content indicates the decelerating state of the vehicle. If the content of the C3RDH counter is found to be "0" or "2" in step SE13 or SE16, step SE17 is implemented to determine whether the vehicle is now accelerating or not. If an affirmative decision (YES) is obtained in step SE17, the control flow goes to step SE18 to increment the C3RDH counter so that the content indicates the accelerating state of the vehicle.

Step SE18 is followed by step SE19 to determine whether the content of the C3RDH counter has increased to "3" or not. This step SE19 is also implemented if a negative decision (NO) is obtained in step SE16 or SE17. Initially, a negative decision (NO) is obtained in step SE19, and one cycle of execution of the routine is terminated. When the C3RDH counter is incremented to "3", step SE19 is followed by steps SE6 and SE7 to reset the X3RDH flag and the C3RDH counter to "0". It will be understood that steps SE13 through SE19 are formulated to detect two changes of the vehicle running condition from the decelerating state to the accelerating state while the transmission 68 is in the 3rd-speed position with the X3HOLD flag set at "1" to inhibit the shift-up action to the 4th-speed position. If the change from the decelerating state to the accelerating state is detected two times (with an affirmative decision obtained in step SE19), the flag X3RDH is reset in step SE6 to provisionally cancel the inhibition of the shift-up action to the 4th-speed position. This causes the negative decision (NO) to be obtained in step SE2 in the next cycle of execution of the routine, whereby the control flow goes to step SE3. If the negative decision (NO) is obtained in step SE3, that is, if the vehicle load is not so large, the X3HOLD flag for inhibiting the shift-up action is reset, whereby the inhibition of the shift-up action is cancelled.

If the vehicle load is reduced to the extent that the negative decision (NO) is obtained in step SE11, steps SE4, SE5, SE6 and SE7 are implemented to reset the X3HOLD, X43DWN and X3RDH flags and the C3RDH counter, so as to cancel the inhibition of the shift-up action of the transmission 68 to the 4th-speed position.

Figure 16A:
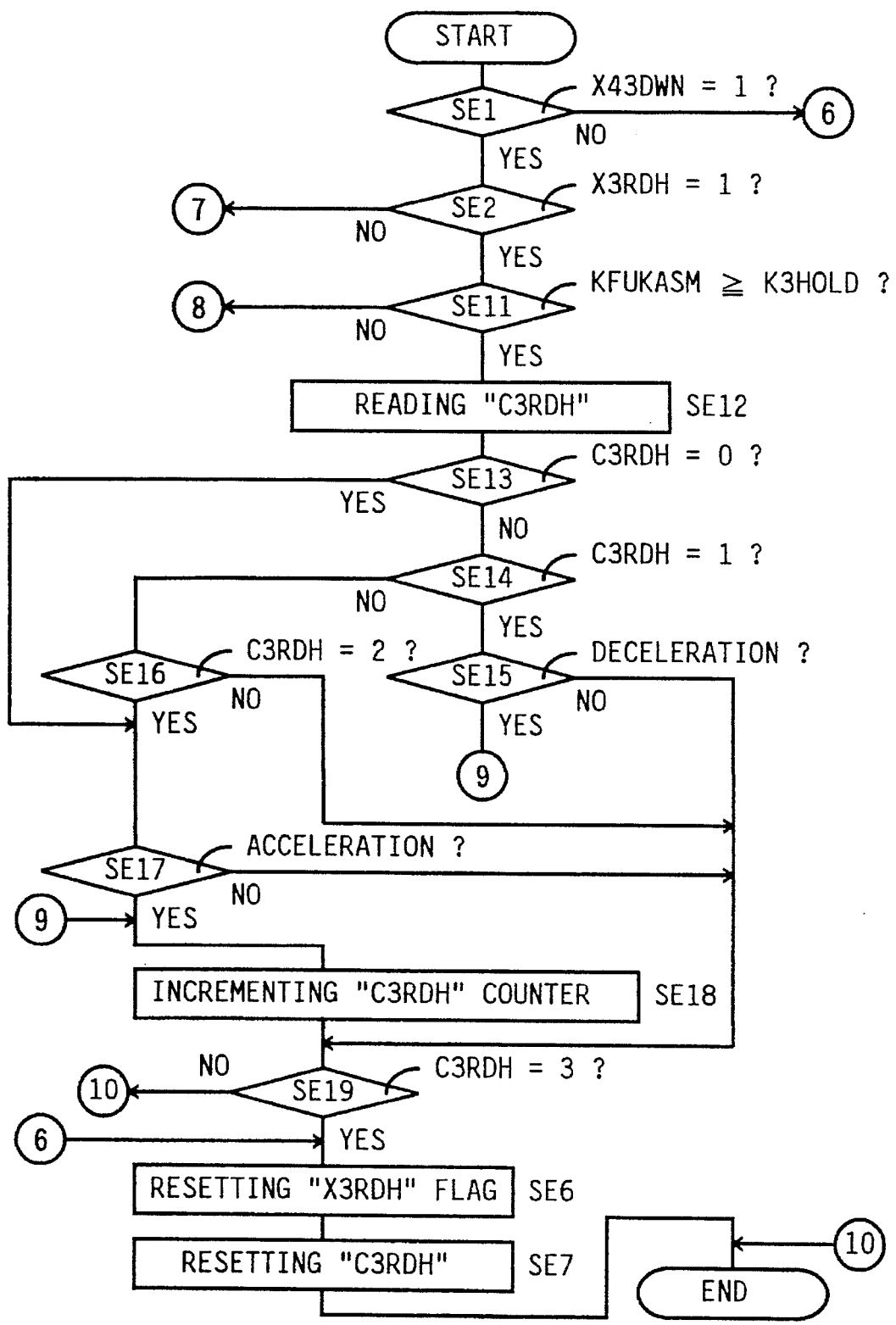
FIGS. 16A and 16B are flow charts illustrating a routine executed by the transmission control unit to inhibit a shift-up action of the transmission to the 4th-speed position, for avoiding frequent shifting actions of the transmission.
Figure 16B:
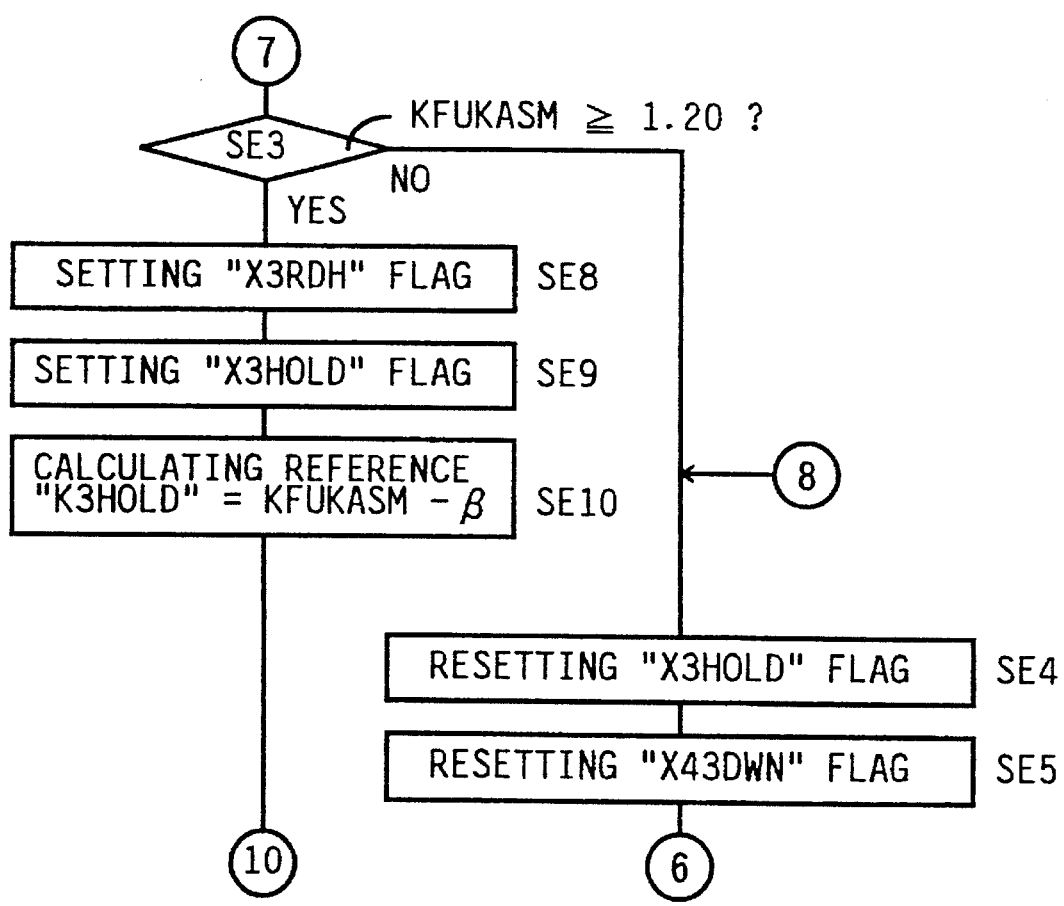
Figure 17:
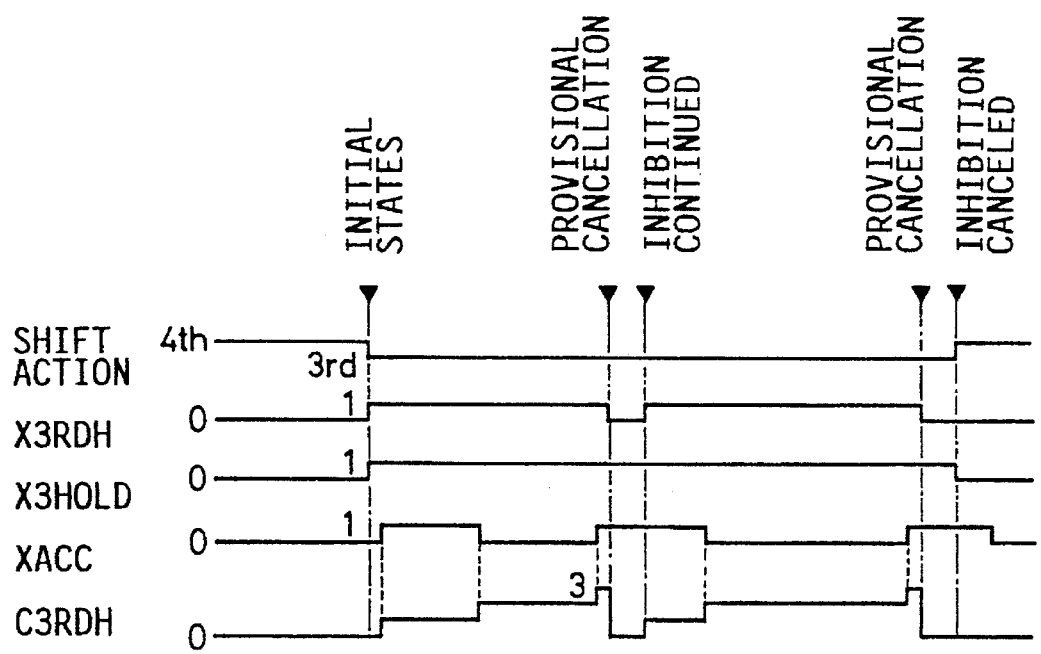
FIG. 17 is a time chart illustrating varying states of flags and a counter used in the routine of FIGS. 16A and 16B.

It will be understood that the routine of FIGS. 16A and 16B is formulated so as to inhibit the shift-up action of the transmission 68 to the 4th-speed position and thereby avoid frequent shifting actions of the transmission 68 between the 3rd-speed and 4th-speed positions, after the transmission 68 has been shifted down with the accelerator pedal being depressed and the smoothed vehicle load coefficient KFUKASM has increased to 1.20. The routine is also formulated so that the inhibition of the shift-up action of the transmission 68 to the 4th-speed position is cancelled when the smoothed vehicle load coefficient KFUKASM has been reduced to the reference value K3HOLD (which is smaller by the predetermined value β than the coefficient KFUKASM when the X3HOLD flag was set), or when the coefficient KFUKASM has been reduced below 1.20 (when the negative decision is obtained in step SE3) after the two times of changes from the decelerating state to the accelerating state of the vehicle are detected in step SE19. An example of varying states of the flags and counter used in the routine of FIGS. 16A and 16B is illustrated in the time chart of FIG. 17.

Referring to the flow charts of FIGS. 18A and 18B, there will be described the main shift control routine, which corresponds to drive force control means for controlling the vehicle drive force by automatically shifting the transmission 68 depending upon the smoothed vehicle load coefficient KFUKASM which has been described above. The present main routine is initiated with step SS1 to read the currently selected position G of the transmission 68, on the basis of the GEAR POSITION signal SG received from the gear position sensor 70. Step SS1 is followed by step SS2 to determine whether the currently selected position G is the 4th-speed position or not. If an affirmative decision (YES) is obtained in step SS2, it means that the transmission 68 will not be shifted up. In this case, step SS15 and the subsequent steps are implemented to control a shift-down action of the transmission 68. If a negative decision (NO) is obtained in step SS2, step SS3 and the subsequent steps are implemented to control a shift-up action of the transmission.

Figures 19A, 19B, 19C:
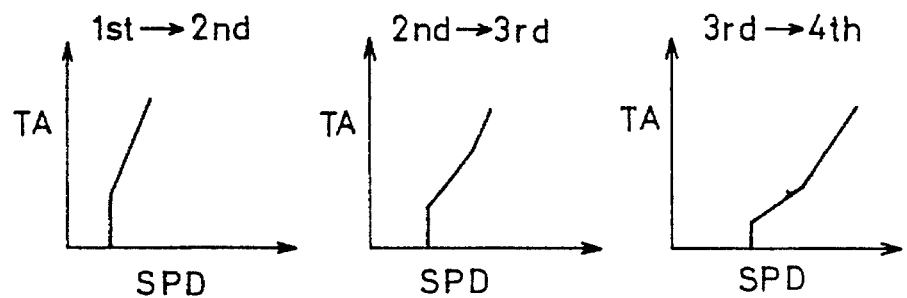
FIGS. 19(a), 19(b) and 19(c) are graphs indicating shift-up boundary lines for shifting up the transmission from the 1st-speed position to the 2nd-speed position, from the 2nd-speed position to the 3rd-speed position, and from the 3rd-speed position to the 4th-speed position, respectively.

The operation to control the shift-up action of the transmission 68 will be first explained. Step SS3 is initially implemented to determine whether the currently selected position G of the transmission 68 is the 3rd-speed position or not. If a negative decision (NO) is obtained in step SS3, it means that the currently selected position G is the 2nd-speed or 1st-speed position. In this instance, step SS7 is implemented to calculate a basic shift-up speed SPDu of the vehicle on the basis of the throttle opening angle TA and according to a selected shift-up boundary line. FIGS. 19(a), 19(b) and 19(c) indicate shift-up boundary lines for shifting up the transmission 68 from the 1st-speed position to the 2nd-speed position, from the 2nd-speed position to the 3rd-speed position, and from the 3rd-speed position to the 4th-speed position, respectively, for illustrative purpose only. Each of these shift-up boundary lines represents a relationship between the throttle opening angle TA and the shift-up speed SPDu of the vehicle at which the transmission 68 is shifted up. When the currently selected position G of the transmission 68 is the 2nd-speed position, the shift-up boundary line as indicated in FIG. 19(b) is selected in step SS7, and the basic shift-up speed SPDu of the vehicle is calculated on the basis of the currently detected throttle opening angle TA and according to the selected shift-up boundary line of FIG. 19(b).

If an affirmative decision (YES) is obtained in step SS3, step SS4 is implemented to determine whether the X2NDD flag is set at "0" or not. If a negative decision (NO) is obtained in step SS4, that is, if the X2NDD flag was set to "1" in step SA16 of the routine of FIGS. 13A and 13B to shift down the transmission 68, the control flow goes to step SS23 to shift down the transmission 68. If an affirmative decision (YES) is obtained in step SS4, that is, if the X2NDD flag was not set to "1" in step SA16, step SS5 is implemented to determine whether the X3RDH flag is set at "0" or not. The X3RDH flag set at "0" means the provisional cancellation of the inhibition of the shift-up action to the 4th-speed position as described above.

If a negative decision (NO) is obtained in step SS5, that is, if the provisional cancellation of the inhibition of the shift-up action to the 4th-speed position is not effected, the control flow goes to step SS17 and the subsequent steps to control the shift-down action. If an affirmative decision (YES) is obtained in step SS5, that is, if the inhibition of the shift-up action to the 4th-speed position has been cancelled, step SS6 is implemented to determine whether the X3HOLD flag is set at "1" or not. This X3HOLD flag set at "1" means the holding of the transmission 68 in the 3rd-speed position, namely, the inhibition of the shift-up action to the 4th-speed position.

Figure 20:
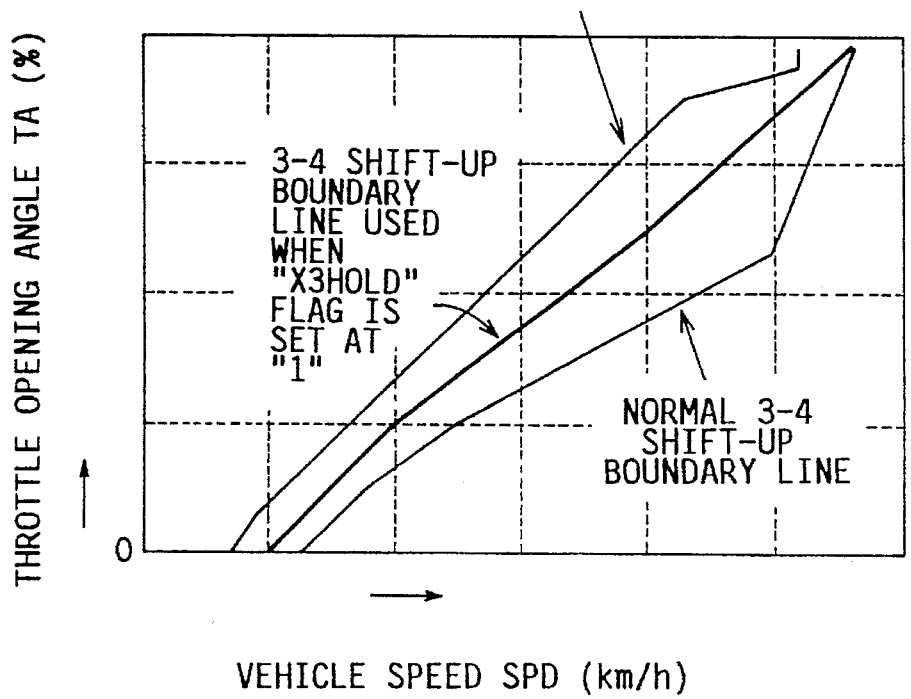
FIG. 20 is a graph indicating shift boundary lines including a shift-up boundary line used in step SS8 of the routine of FIG. 18 to calculate a shift-up vehicle speed for shifting up the transmission from the 3rd-speed position to the 4th-speed position after the inhibition of this shift-up action.

If a negative decision (NO) is obtained in step SS6, that is, if the shift-up action to the 4th-speed position is not inhibited, step SS7 is implemented to calculate the shift-up speed SPDu of the vehicle as described above. If an affirmative decision (YES) is obtained in step SS6, that is, if the shift-up action to the 4th-speed position is inhibited, step SS8 is implemented to calculate the shift-up speed SPDu of the vehicle on the basis of the throttle opening angle TA and according to a 3–4 shift-up boundary line as shown in FIG. 20, which boundary line is exclusively used when the shift-up action to the 4th-speed position is inhibited.

Steps SS7 and SS8 in which the shift-up vehicle speed SPDu is calculated are followed by step SS9 to adjust the calculated shift-up vehicle speed SPDu by multiplying the value SPDu by the shift-speed compensating coefficient Ks calculated in step SD25 of the vehicle load detecting routine of FIGS. 2A and 2B.

Step SS9 is followed by step SS10 to determine whether the actual vehicle speed SPD is higher than the adjusted shift-up vehicle speed SPDu or not, that is, whether the transmission 68 should be shifted up. If a negative decision (NO) is obtained in step SS10, the control flow goes to step SS17. If an affirmative decision (YES) is obtained in step SS10, the control flow goes to step SS11 to determine whether the transmission 68 is shifted up to the 4th-speed position or not. If an affirmative decision (YES) is obtained in step SS11, steps SS12 and SS13 are implemented to reset the X3HOLD flag and the X43DWN flag to "0". Step SS13 is followed by step SS14 in which the transmission 68 is shifted up to the 4th-speed position. If a negative decision (NO) is obtained in step SS11, steps SS12 and SS13 are skipped, and step SS11 is directly followed by step SS14 in which the transmission is shifted up to the 2nd-speed or 3rd-speed position.

If an affirmative decision (YES) is obtained in step SS2, that is, if the transmission 68 is now placed in the 4th-speed position, step SS15 is implemented to determine whether the X3RDD flag is set at "0" or not. If a negative decision (NO) is obtained in step SS15, that is, if the X3RDD flag is set at "1" to shift down the transmission 68 to the 3rd-speed position, step SS15 is followed directly by step SS23 in which the transmission 68 is shifted down to the 3rd-speed position. If an affirmative decision (YES) is obtained in step SS15, the control flow goes to step SS16 to determine whether the X3RDH flag is set at "0" or not. If an affirmative decision (YES) is obtained in step SS16, it means that the inhibition of the shift-up action to the 4th-speed position is provisionally cancelled. In this case, the control flow goes to step SS23 to shift down the transmission 68 to the 3rd-speed position, even if the X3RDD flag is set at "0".

Step SS17 is implemented to determine whether the currently selected position G of the transmission 68 is the 1st-speed position or not. If an affirmative decision (YES) is obtained in step SS17, one cycle of execution of the present routine is terminated since the transmission 68 can not be or will not be shifted down. If a negative decision (NO) is obtained in step SS17, step SS18 is implemented to calculate a shift-down vehicle speed SPDd on the basis of the throttle opening angle TA, and according to a selected shift-down boundary line corresponding to the currently selected position G. FIGS. 21(*a*), 21(*b*) and 21(*c*) illustrate the shift-down boundary lines used for shifting down the transmission 68 from the 2nd-speed position to the 1st-speed position, from the 3rd-speed position to the 2nd-speed position, and from the 4th-speed position to the 3rd-speed position, respectively. Each of these shift-down boundary lines represents a relationship between the throttle opening angle TA and the shift-down speed SPDd of the vehicle at which the transmission 68 is shifted down. When the currently selected position G of the transmission 68 is the 3rd-speed position, the shift-down boundary line as indicated in FIG. 21(*b*) is selected in step SS18, and the basic shift-down speed SPDd of the vehicle is calculated on the basis of the currently detected throttle opening angle TA and according to the selected shift-down boundary line of FIG. 21(*b*).

Step SS18 is followed by step SS19 in which the calculated shift-down vehicle speed SPDd is adjusted by multiplying it by the shift-speed compensating coefficient Ks calculated in step SD25 of the vehicle load detecting routine of FIGS. 2A and 2B.

Then, the control flow goes to step SS20 to determine whether the transmission 68 is shifted down. Described more specifically, the transmission 68 should be shifted down if the currently detected vehicle speed SPD is equal to or lower than the adjusted shift-down vehicle speed SPDd. If so, step SS21 is implemented to determine whether the transmission 68 has been shifted down to the 3rd-speed position with the accelerator pedal being depressed. If a negative decision (NO) is obtained in step SS21, step SS23 is implemented to shift down the transmission 68. If an affirmative decision (YES) is obtained in step SS21, the X43DWN flag is set to "1", and then step SS23 is implemented to shift down the transmission. If a negative decision (NO) is obtained in step SS20, that is, if the actual vehicle speed SPD is higher than the adjusted shift-down vehicle speed SPDd, one cycle of execution of the present routine is terminated.

Where the shift-speed compensating coefficient Ks is larger than 1.0, the adjusted shift-up and shift-down vehicle speeds SPDu and SPDd are increased, whereby the transmission 68 is more likely to be shifted down. Accordingly, the adjustment in steps SS9 and SS19 of the shift-up and shift-down vehicle speeds SPDu, SPDd by the compensating coefficient Ks leads to an increase in the vehicle drive force. Where the compensating coefficient Ks is smaller than 1.0, on the other hand, the adjusted shift-up and shift-down vehicle speeds SPDu, SPDd are lowered, whereby the transmission 68 is more likely to be shifted up.

Figure 22:
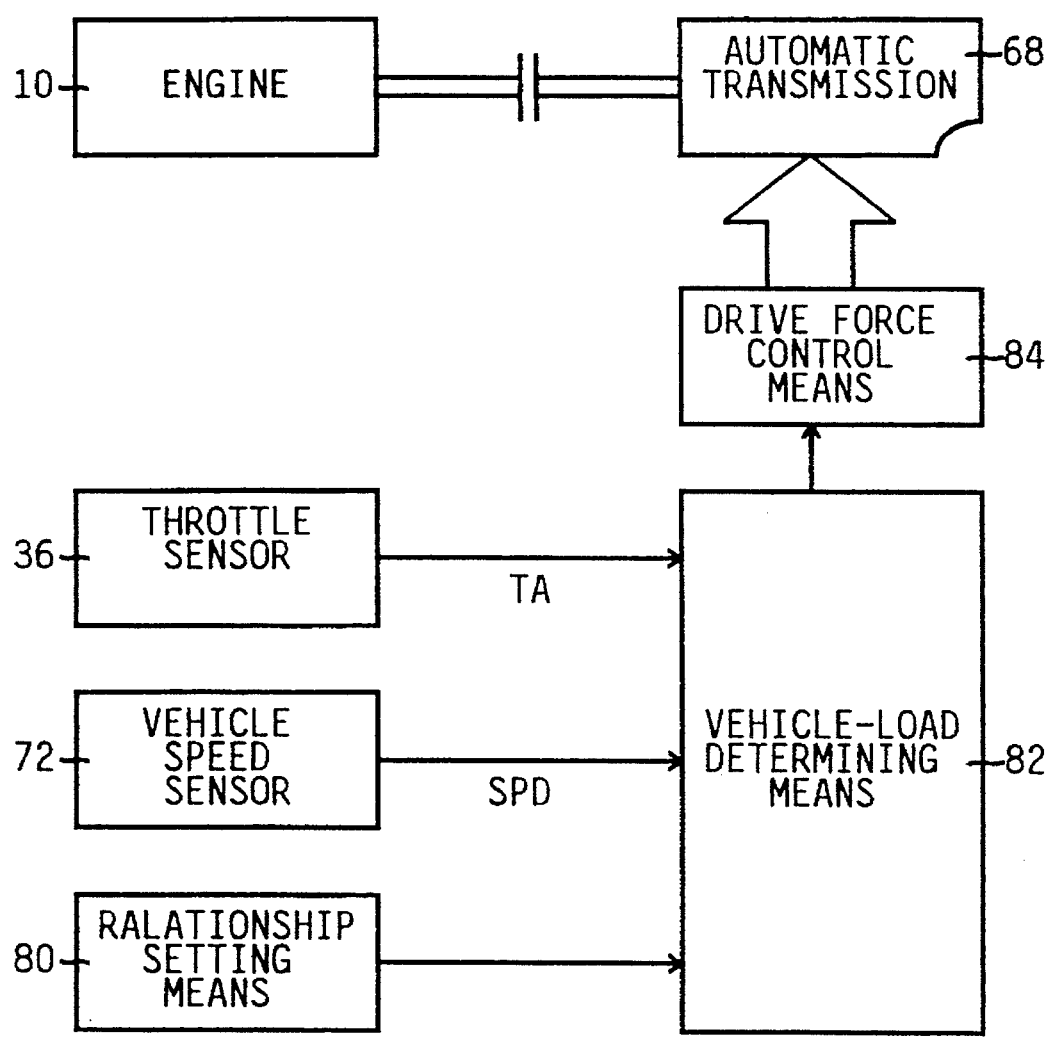
FIG. 22 is a block diagram illustrating major functional components of the vehicle drive force control apparatus according to the first embodiment of the invention.

Referring to the block diagram of FIG. 22, there is illustrated a major portion of the transmission control unit 34 for controlling the automatic transmission 68, which includes relationship setting means 80, vehicle-load determining means 82 and drive force control means 84. These setting, determining and control means 80, 82, 84 cooperate with the throttle sensor 36 and the vehicle speed sensor 72 to constitute a vehicle drive force control apparatus constructed according to the principle of the present invention.

The relationship setting means 80 is constituted by a portion of the transmission control unit 34 which is assigned to implement step SD4, and functions to set a standard relationship between a load acting on the engine 10 and the vehicle speed SPD when the vehicle is running in a stable mode, namely, at a relatively constant speed on a generally flat road surface. The load acting on the engine 10 may be represented by the currently required output of the engine, for example, the throttle opening angle TA. The standard relationship between TA and SPD is represented by a curve as indicated in FIG. 3, which has been described above.

The vehicle-load determining means 82 is constituted by a portion of the transmission control unit 34 which is assigned to execute steps SD5 through SD20. This determining means 82 functions to determine, from time to time, a running load acting on the vehicle as represented by the engine load (throttle opening angle TA) and the vehicle speed SPD, on the basis of the standard relationship (TA-SPD relationship as indicated in FIG. 3). The running load may be represented by the non-smoothed vehicle load coefficient KFUKA or the smoothed vehicle load coefficient KFUKASM.

Figure 18A:
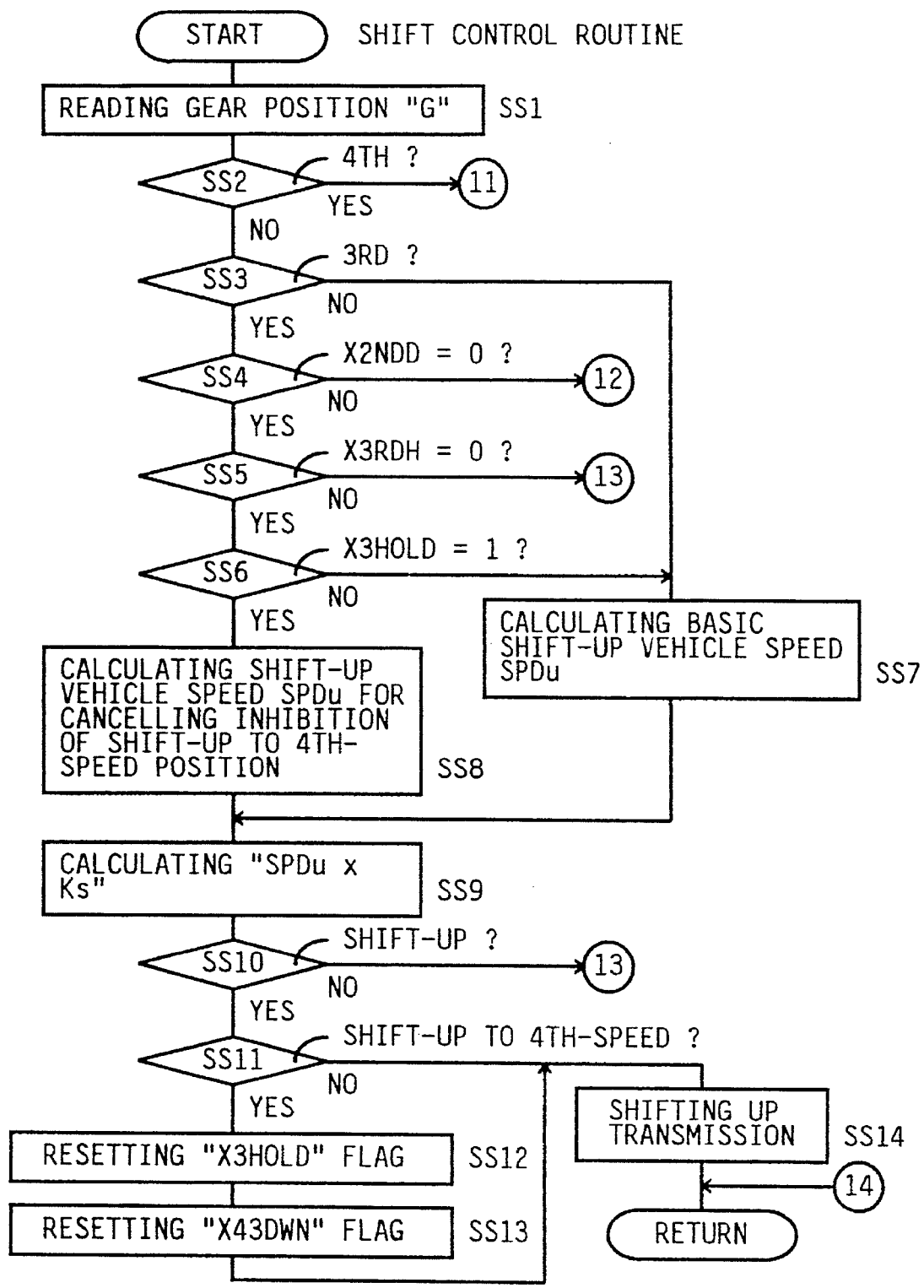
FIGS. 18A and 18B are flow charts illustrating a main shift control routine executed by the transmission control unit to control shifting actions of the transmission.
Figure 18B:
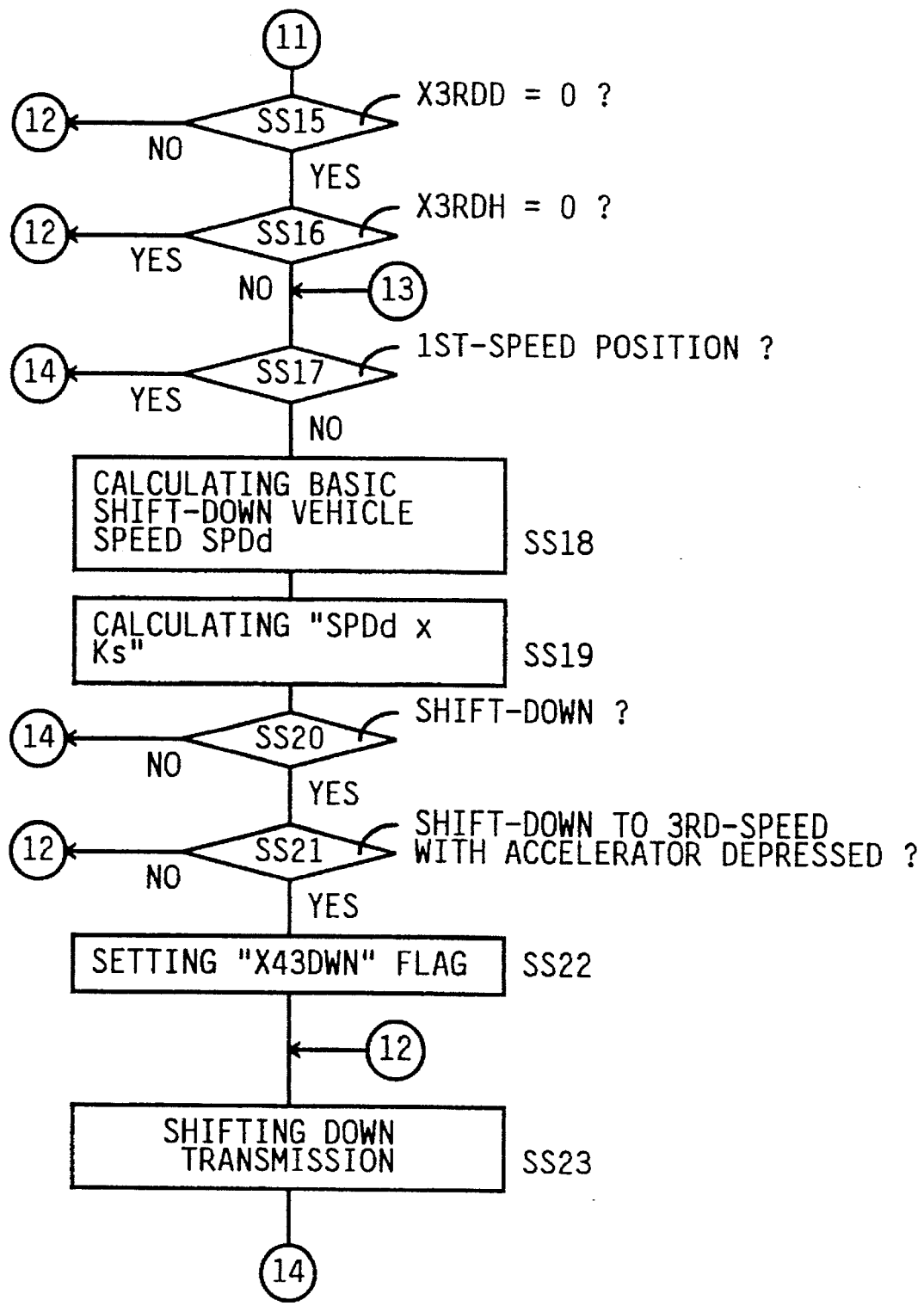

The drive force control means 84 is constituted by a portion of the transmission control unit 34 which is assigned to execute the main shift control routine (steps SS1 through SS23) illustrated in FIGS. 18A and 18B. The drive force control means 84 functions to control the vehicle drive force by suitably selecting the position G of the transmission 68, that is, by suitably shifting the transmission 68, on the basis of the periodically determined values of the running load of the vehicle, in particular, the smoothed vehicle load coefficient KFUKASM. In the illustrated embodiment, the coefficient values KFUKASM are used to determine the compensating coefficient Ks which is used to adjust the shift-up and shift-down vehicle speeds SPDu, SPDd at which the transmission 68 is shifted up or down.

The vehicle drive force control apparatus according to the illustrated embodiment is capable of suitably regulating the vehicle drive force on the basis of the actual running load acting on the vehicle, so as to assure excellent running stability and drivability of the vehicle over the entire ranges of the engine load (throttle opening angle) and the vehicle speed, irrespective of a variation in the vehicle running load, which may occur due to a change in the gradient of the road surface.

In the present embodiment, the vehicle-load determining means 82 is adapted to implement step SD5 for determining the standard load-vehicle speed SPDs ("a" in FIG. 3) on the basis of the throttle opening angle TA and according to the TA-SPDs relationship as indicated in FIG. 3, and step SD7 or SD9 for calculating a vehicle load coefficient KFUKA (=a/c, or 2−b/a) on the basis of the actually detected vehicle speed "c" or "b" and the determined standard loaded-vehicle speed. The calculated vehicle load coefficient KFUKA represents the running load of the vehicle used to control the vehicle drive force, i.e., determine the position of the transmission 68. The standard loaded-vehicle speed SPDs ("a") and the detected vehicle speed SPD ("b" or "c") may be replaced by a standard loaded-vehicle throttle opening angle and the detected throttle opening angle. In this case, the vehicle load coefficient KFUKA is calculated on the basis of the standard loaded-vehicle throttle opening angle and the detected throttle opening angle. However, the throttle opening angle usually changes at a higher rate than the vehicle speed, and the determined standard loaded-vehicle throttle opening angle is greatly influenced by a change in the operating position of the accelerator pedal. In this respect, it is desirable to use the standard loaded-vehicle speed SPDs ("a") and the detected vehicle speed SPD ("b" or "c") rather than the standard loaded-vehicle throttle opening angle and the detected throttle opening angle which are relatively unstable. This arrangement assures stable control of the vehicle drive force without an influence of a rapid change in the throttle opening angle TA. It will be understood that step SD5 corresponds to the means for determining the standard loaded-vehicle speed SPDs, while steps SD7 and SD9 correspond to load coefficient calculating means for calculating the vehicle load coefficient KFUKA.

The illustrated embodiment is also characterized by step SD6 which compares the detected actual vehicle speed SPD with the determined standard loaded-vehicle speed SPDs, to select one of two different methods of calculating the vehicle load coefficient KFUKA. Described more specifically, step SD9 is selected to calculate the vehicle load coefficient KFUKA according to the equation KFUKA=2−(b/a), when the detected actual vehicle speed "b" is lower than the standard loaded-vehicle speed "a", and step SD7 is selected to calculate the coefficient KFUKA according to the equation KFUKA=a/c when the detected actual vehicle speed "c" is higher than the standard loaded-vehicle speed "a". The lower actual vehicle speed "b" indicates a relatively high load acting on the vehicle, while the higher actual vehicle speed "c" indicates a relatively low load acting on the vehicle. The selective use of these two different equations causes the calculated vehicle load coefficient KFUKA to linearly change with a change of the vehicle speed SPD at least over a range of the coefficient KFUKA close to 1.0, provided the throttle opening angle TA is constant. This arrangement is advantageous for substantially uniform degree of smoothing of the calculated coefficient value KFUKA according to the relationship as represented by the table of FIG. 7. Step SD6 corresponds to means for selecting the equations for calculating the vehicle load coefficient KFUKA, which means is included in the above-indicated means for calculating the vehicle load coefficient KFUKA.

Further, the illustrated embodiment is adapted such that the vehicle load coefficient KFUKA calculated from time to time is subjected to a smoothing operation in step SD20, to obtain the smoothed vehicle load coefficient KFUKASM which is used as the vehicle running load for adjusting the shift-up and shift-down vehicle speeds SPDu, SPDd. In this respect, it is noted that the non-smoothed vehicle load KFUKA tends to change abruptly if the accelerator pedal is frequently operated in the opposite directions to change the throttle opening angle, as indicated in the graph of FIG. 8.

However, the smoothed vehicle load coefficient KFUKASM is stabilized under such condition. Step SD20 corresponds to means for smoothing the vehicle load coefficient as calculated from time to time, which means is also included in the load coefficient calculating means.

In the illustrated embodiment, step SD20 for smoothing the non-smoothed vehicle load KFUKA is preceded by step SD19 in which the smoothing amount is determined or changed depending upon the running conditions of the vehicle, such as those represented by the XCLIMB, XCOAST, YIDL and XACC flags. This manner of determination of the smoothing amount accurately reflects the actual running condition of the vehicle in smoothing the non-smoothed vehicle load coefficient KFUKA to obtain the smoothed vehicle load coefficient KFUKASM. Steps SD19 cooperates with step SD20 to provide the smoothing means.

Further, the illustrated embodiment is adapted to implement step SD17 to skip steps SD19 and SD20 to thereby inhibit the smoothing operation and substantially maintain the last obtained value of the smoothed vehicle load coefficient KFUKASM, for a predetermined period (set in the REVERSE timer) after the value of the XCOAST flag is switched from "0" to "1" or vice versa, namely, after the non-smoothed vehicle load coefficient KFUKA is changed from a value equal to or larger than 1.0 to a value smaller than 1.0, or vice versa. In this respect, it is noted that the XACC flag is used to determine the smoothing amount as indicated in the table of FIG. 7. Since the state of this XACC flag is determined by the running speed SPD of the vehicle (steps SH13–SH15), the XACC flag is less responsive to a change in the actual running conditions of the vehicle, than those of the flags (XCLIMB, XCOAST and YIDL). Therefore, if the smoothed coefficient KFUKASM were updated immediately after it is changed across the value of 1.0, a change in the updated value KFUKASM would be delayed with respect to a change in the actual running conditions of the vehicle. To avoid this drawback, the coefficient KFUKASM is not updated or the last value of this coefficient is maintained for the above-indicated period of time. Step SD17 corresponds to means for temporarily inhibiting the operation of the smoothing means, which is also included in the load calculating means.

The illustrated embodiment is further adapted to implement step SD18 to skip steps SD19 and SD20 to thereby inhibit the smoothing operation and substantially maintain the last obtained value of the smoothed vehicle load coefficient KFUKASM, for a predetermined period (set in the START timer) after the vehicle has started. In this respect, it is noted that the smoothed vehicle load value KFUKASM is greatly influenced by the state of the XACC flag during a period following the starting of the vehicle. Namely, the coefficient KFUKASM would be excessively reduced toward the high-load side. To avoid this drawback, the coefficient KFUKASM is not updated for the above-indicated period of time after the starting of the vehicle. Step SD18 also corresponds to means for temporarily inhibiting the operation of the smoothing means, which is also included in the load calculating means.

The drive force control means 84 is adapted to implement steps SS9 and SS19 to adjust the nominal shift boundary lines on the basis of the determined running load of the vehicle, more specifically, on the basis of the calculated smoothed vehicle load coefficient KFUKASM, so that the transmission 68 is shifted up and down depending upon a change in the load acting on the vehicle, so as to assure not only high fuel economy of the vehicle but also high drivability of the vehicle over the entire ranges of the engine load (throttle opening angle) and the vehicle speed. Steps SS9 and SS19 correspond to means for adjusting the nominal shift boundary lines.

Described more particularly, step SD25 is implemented to calculate the shift-speed compensating coefficient Ks on the basis of the smoothed vehicle load coefficient KFUKASM and according to the predetermined relationship as indicated in FIG. 12. This compensating coefficient Ks is used to adjust the shift-up and shift-down vehicle speeds SPDu, SPDd at which the transmission 68 is shifted up and down. Accordingly, the shift-up and shift-down vehicle speeds are suitably adjusted depending upon the actual vehicle load (gradient of the road surface), so as to assure sufficient drivability of the vehicle irrespective of a change in the road surface gradient.

In the illustrated embodiment, steps SE3, SE8 and SE9 are provided to inhibit a shift-up action of the automatic transmission 68 when the smoothed vehicle load coefficient KFUKASM exceeds the first threshold value of 1.20. This arrangement is effective to avoid possible frequent alternate shift-down and shift-up actions of the transmission which would occur due to the behaviors of the vehicle driver and the transmission control unit 34 during running of the vehicle in a high-load state. Described in detail, an automatic shift-down action of the transmission by the transmission control unit 34 causes an increase in the vehicle drive force, which would in turn motivate the vehicle driver to operate the accelerator pedal in the releasing direction in an attempt to reduce the vehicle drive force. A consequent reduction of the drive force would result in a shift-up action of the transmission, which then causes a decrease in the vehicle drive force and would motivate the vehicle driver to depress the accelerator pedal in an attempt to increase the vehicle drive force, whereby the transmission would be shifted down again. The present arrangement for inhibiting the shift-up action of the transmission eliminates such alternate shift-down and shift-up actions of the transmission. Thus, steps SE3, SE8 and SE9 correspond to shift-up inhibiting means for inhibiting a shift-up action of the transmission when the smoothed coefficient KFUKASM exceeds 1.20.

The illustrated embodiment is adapted such that steps SE3, SE8 and SE9 indicated above are implemented when an affirmative decision (YES) is obtained in step SE1, namely, immediately after the transmission 68 has been shifted down from the highest-speed, i.e., 4th-speed position to the lower-speed position, i.e., 3rd-speed position, as a result of depression of the accelerator pedal and a consequent increase in the throttle opening angle TA. Therefore, the shift-up inhibiting means prevents alternate shifting actions of the transmission between the 4th-speed and 3rd-speed positions.

It is also noted that steps SE11, SE4 and SE5 are provided to cancel the inhibition of the shift-up action of the transmission when the smoothed vehicle load coefficient KFUKASM is reduced below the second threshold value K3HOLD which is smaller than the first threshold value. More specifically described, the second threshold value K3HOLD is smaller by the predetermined value β than the smoothed coefficient KFUKASM when it exceeds the first threshold value of 1.20 (when the affirmative decision is obtained in step SE3). Since there is a suitable amount of difference between the first and second threshold values, it is possible to prevent undesirable alternate inhibition of the shift-up action and cancellation of the inhibition due to a hysteresis which would be caused if the same threshold value was used for inhibiting the shift-up action and cancelling the inhibition. Steps SE11, SE4 and SE5 correspond to cancelling means for cancelling the inhibition of the shift-up action when the smoothed coefficient KFUKASM is lowered below the second threshold value.

The cancelling means cancels the inhibition of the shift-up action of the transmission under another situation. That is, steps SE12 through SE19 are provided to determine whether a change of the running condition of the vehicle from a decelerating state to an accelerating state has been repeated a predetermined number of times (i.e., twice) while the shift-up action to the 4th-speed position is being inhibited by the shift-up inhibiting means, that is, while the X3RDH flag is set at "1". When the change from the decelerating state to the accelerating state has been repeated the predetermined number of times, namely, when the affirmative decision (YES) is obtained in step SE19, the X3RDH flag is reset to "0". In the next cycle of execution of the routine of FIGS. 16A and 16B, step SE2 is followed by step SE3. Therefore, if the smoothed vehicle load coefficient KFUKASM is lowered below the threshold value of 1.20, then the inhibition of the shift-up action to the 4th-speed position is cancelled, with the X3HOLD flag reset to "0" in step SE4. In other words, steps SE12 through SE19 and step SE6 are provided to provisionally cancel the inhibition of the shift-up action to the 4th-speed position, if the change of the vehicle from the decelerating state to the accelerating state has been repeated the predetermined number of times. Steps SE2 and SE3 function to determine whether the transmission 68 should be shifted up to the 4th-speed position or not, each time the above-indicated change has been repeated the predetermined number of times (twice), that is, each time the X3RDH flag is reset to "0". Since the shift-up action means a shifting of the transmission which causes the vehicle drive force to be reduced, the cancellation of the inhibition of the shift-up action should be determined depending on the vehicle drive force required when the vehicle is in an accelerating state. Thus, the transmission is allowed to be shifted to the 4th-speed position depending upon the vehicle drive force required during acceleration of the vehicle. Steps SE12–SE19 and SE6 correspond to a part of the cancelling means for cancelling the inhibition of the shift-up action to the 4th-speed position.

The second threshold value used to cancel the inhibition of the shift-up action is determined in step SE10 such that the second threshold value K3HOLD is equal to KFUKASM–β. The value KFUKASM used to determine the value K3HOLD is the value determined at one of the following two moments, whichever is later: the moment when the inhibition of the shift-up action is started (when the affirmative decision is obtained in step SE3 for the first time; and the moment when the change of the vehicle from the decelerating state to the accelerating state has been repeated the predetermined number of times (more precisely, when the affirmative decision is obtained in step SE3 after the affirmative decision is obtained in step SE19).

Figure 23:
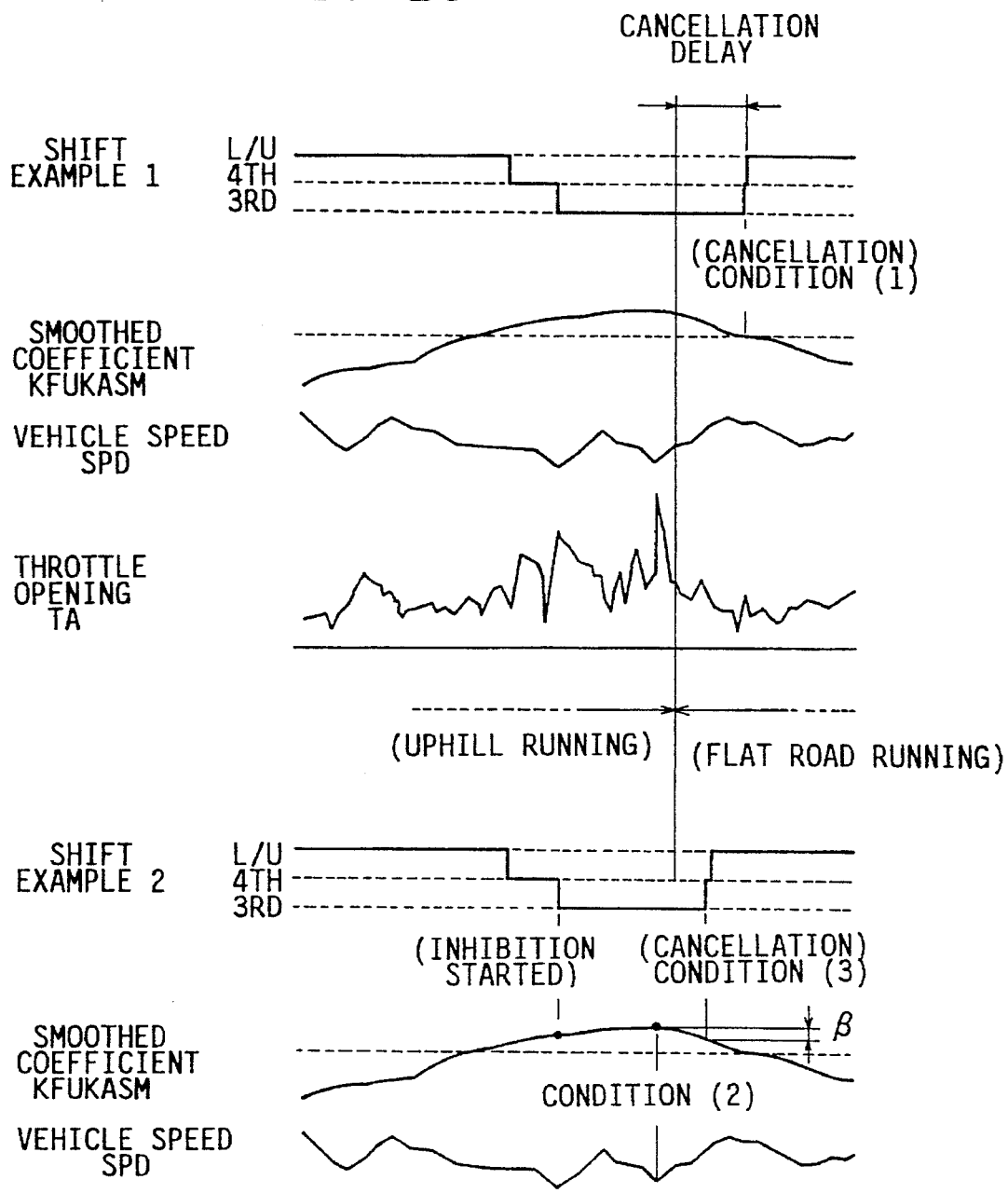
FIG. 23 is a timing chart for explaining an operation according to the routine of FIG. 16 to cancel the inhibition of the transmission shift-up to the 4th-speed position.

FIG. 23 shows two examples (SHIFT EXAMPLE 1 and SHIFT EXAMPLE 2) in which the inhibition of the shift-up action to the 4th-speed position is cancelled. In the SHIFT EXAMPLE 1 shown in the upper part of FIG. 23, the inhibition is cancelled when the smoothed vehicle load coefficient KFUKASM is lowered below a predetermined threshold value of about 1.15, for example, that is, when CONDITION (1) is satisfied as indicated in FIG. 23. This arrangement suffers from a delay in cancelling the inhibition, due to a delay in smoothing the non-smoothed coefficient KFUKA to obtain the smoothed coefficient KFUKASM. This drawback is overcome according to the above-indicated arrangement in which the threshold value for cancelling the inhibition is equal to (KFUKASM−β), wherein the value KFUKASM may be a value obtained at the moment when the change of the vehicle running condition from the decelerating state to the accelerating state has been repeated twice after the commencement of the inhibition, that is, when CONDITION (2) is satisfied as indicated in FIG. 23. The inhibition is cancelled when the present value KFUKASM is lowered below the threshold value (KFUKASM−β), that is, when CONDITION (3) also indicated in the same figure is satisfied. Step SE10 corresponds to means for determining the second threshold value for cancelling the inhibition of the shift-up action to the 4th-speed position.

In the illustrated embodiment, steps SA1 through SA4 and steps SA7 through SA16 are provided to shift down the transmission 68 from the 4th-speed position to the 3rd-speed or 2nd-speed position, or from the 3rd-speed position to the 2nd-speed position, under a given condition of the vehicle while the vehicle is coasting, that is, when the following conditions are satisfied: (1) the smoothed vehicle load coefficient KFUKASM is smaller than the reference value of 0.95; (2) the throttle valve 20 is in the idling position (i.e., the throttle opening angle TA is smaller than a reference value corresponding to the idling position of the throttle valve); and (3) the detected acceleration value α of the vehicle is larger than the appropriate reference value $\alpha_{4\text{-}2D}$, $\alpha_{4\text{-}3D}$ or $\alpha_{3\text{-}2D}$. This arrangement is effective to apply an engine brake to the vehicle during downhill running of the vehicle. Steps SA1–SA4 and SA7–SA16 correspond to shift-down means for shifting down the transmission, which means is a part of the drive force control means 84.

As described above in detail by reference to FIGS. 14 and 15, the reference values $\alpha_{4\text{-}2D}$, $\alpha_{4\text{-}3D}$ or $\alpha_{3\text{-}2D}$ are determined in steps SA8, SA10 and SA14, on the basis of the vehicle speed SPD during coasting of the vehicle. This arrangement makes it possible to apply an engine brake to the vehicle at an adequate opportunity when the engine braking is necessary. Steps SA8, SA10 and SA14 correspond to means for determining the reference values for automatic shift down actions of the transmission, which means is also a part of the drive force control means 84.

Referring next to FIGS. 24–31, there will be described a second embodiment of this invention. The second embodiment is different from the first embodiment, only in the control programs stored in the ROM of the transmission control unit 34 to execute routines as illustrated in the flow charts of FIGS. 24–27.

Figure 24:
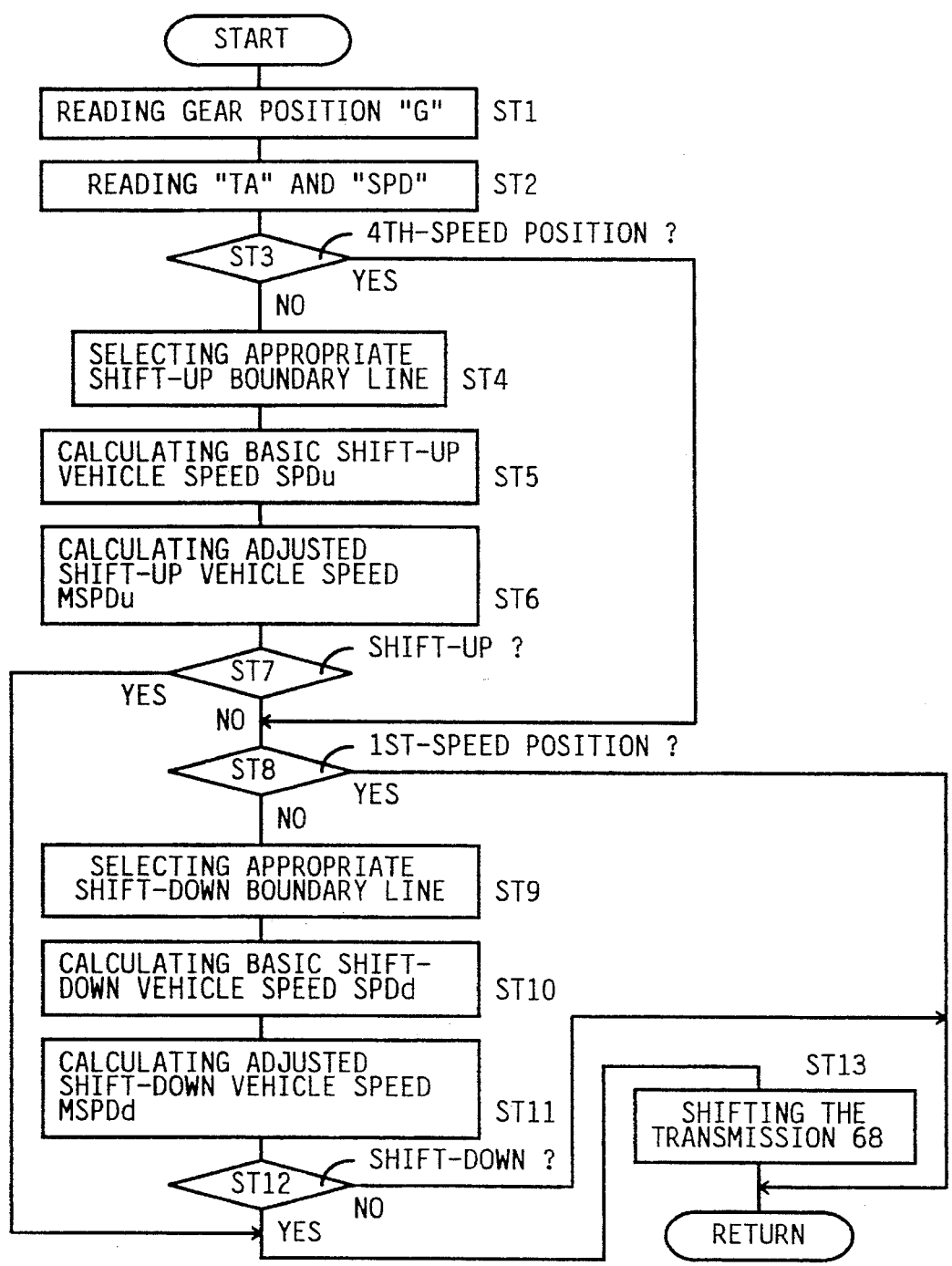
FIG. 24 is a flow chart illustrating a shift control routine executed by a drive force control apparatus constructed according to a second embodiment of this invention.

Reference is first made to the flow chart of FIG. 24 illustrating the shift control routine according to the second embodiment. This routine is initiated with step ST1 to read in the GEAR POSITION signal SG representative of the currently selected position G of the transmission 68. Step ST1 is followed by step ST2 to read in the THROTTLE OPENING signal STA representative of the throttle opening angle TA, and the VEHICLE SPEED signal SSPD representative of the running speed SPD of the vehicle. The control flow then goes to step ST3 to determine whether the currently selected position G of the transmission 68 is the 4th-speed position or not. If an affirmative decision (YES) is obtained in step ST3, it means that the transmission 68 can not be shifted up. In this case, the control flow goes to step ST8 and the subsequent steps associated with a shift-down action of the transmission 68, as explained below. If a negative decision (NO) is obtained in step ST3, the control flow goes to step ST4 and the subsequent steps associated with a shift-up action of the transmission 68.

In step ST4, the transmission control computer 34 selects one of three shift-up boundary lines as illustrated in FIGS. 19(a), 19(b) and 19(c), which one boundary line corresponds to the currently selected position G of the transmission 68. The shift-up boundary lines are represented by respective data maps stored in the ROM of the computer 34. If the transmission 68 is currently placed in the 3rd-speed position, for example, the shift-up boundary line shown in FIG. 19(c) is selected in step ST4. Step ST4 is followed by step ST5 in which a shift-up vehicle speed SPDu is calculated on the basis of the currently detected throttle opening angle TA and according to the shift-up boundary line selected in step ST4. Step ST5 is followed by step ST6 to calculate an adjusted shift-up vehicle speed MSPDu, by multiplying the shift-up vehicle speed SPDu by an adjusting coefficient (KFUKA+KSFTAi). In other words, the shift-up vehicle speed SPDu as calculated according to the selected shift-up boundary line is adjusted on the basis of a vehicle load coefficient KFUKA, and a shift-speed compensating value KSFTAi which will be described.

Then, the control flow goes to step ST7 to compare the currently detected vehicle speed SPD with the adjusted shift-up vehicle speed MSPDu calculated in step ST6. If the detected vehicle speed SPD is equal to or higher than the adjusted shift-up vehicle speed MSPDu, an affirmative decision (YES) is obtained in step ST7, and step ST13 is implemented to shift up the transmission 68. If a negative decision (NO) is obtained in step ST7, the control goes to step ST8.

Figures 21A, 21B, 21C:
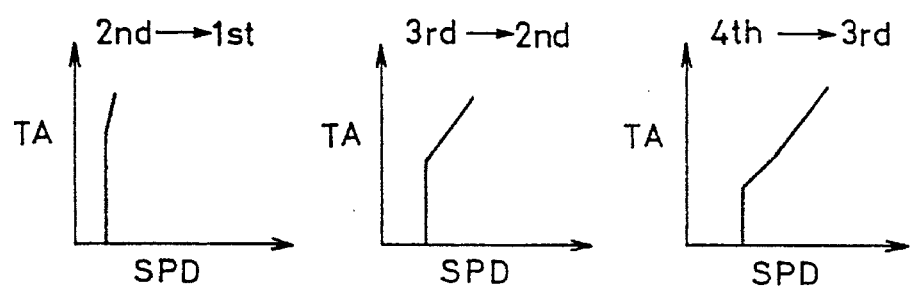
FIGS. 21(a), 21(b) and 21(c) are graphs indicating shift-down boundary lines for shifting down the transmission from the 2nd-speed position to the 1st-speed position, from the 3rd-speed position to the 2nd-speed position, and from the 4th-speed position to the 3rd-speed position, respectively.

Step ST8 is provided to determine whether the transmission 68 is currently placed in the 1st-speed position or not, that is, whether the currently selected position G represented by the signal SG is the 1st-speed position or not. If an affirmative decision (YES) is obtained in step ST8, it means that the transmission 68 cannot be shifted down. In this case, the control flow goes back to step ST1 for repeating the routine. If a negative decision (NO) is obtained in step ST8, the control flow goes to step ST9 to select one of three shift-down boundary lines as illustrated in FIGS. 21(a), 21(b) and 21(c), which one boundary line corresponds to the currently selected position G of the transmission 68. If the transmission 68 is currently placed in the 3rd-speed position, the shift-down boundary line as shown in FIG. 21(b) is selected in step ST9. Then, step ST10 is implemented to calculate a shift-down vehicle speed SPDd on the basis of the detected throttle opening angle TA and according to the selected shift-down boundary line selected in step ST9. Step ST10 is followed by step ST11 to calculate an adjusted shift-down vehicle speed MSPDd by multiplying the shift-down vehicle speed SPDd by the adjusting coefficient (KFUKA+KSFTAi) indicated above with respect to step ST6.

Then, step ST12 is implemented to compare the current vehicle speed SPD with the adjusted shift-down vehicle speed MSPDd, and determine whether the current vehicle speed SPD is equal to or lower than the adjusted shift-down vehicle speed MSPDd, or not. If an affirmative decision (YES) is obtained in step ST12, the control flow goes to step ST13 to shift down the transmission 68. If a negative decision (NO) is obtained in step ST12, the control flow goes back to step ST1.

If the adjusting coefficient (KFUKA+KSFTAi) is larger than 1.0, the adjusted shift-up and shift-down vehicle speeds MSPDu, MSPDd are accordingly increased, whereby the transmission 68 is more likely to be shifted down than where the non-adjusted shift-up and shift-down vehicle speeds SPDu, SPDd were used. If the adjusting coefficient (KFUKA+KSFTAi) is smaller than 1.0, on the other hand, the adjusted shift-up and shift-down vehicle speeds MSPDu, MSPDd are accordingly reduced, whereby the transmission 68 is more likely to be shifted up than where the non-adjusted values SPDu, SPDd were used.

Figure 25:
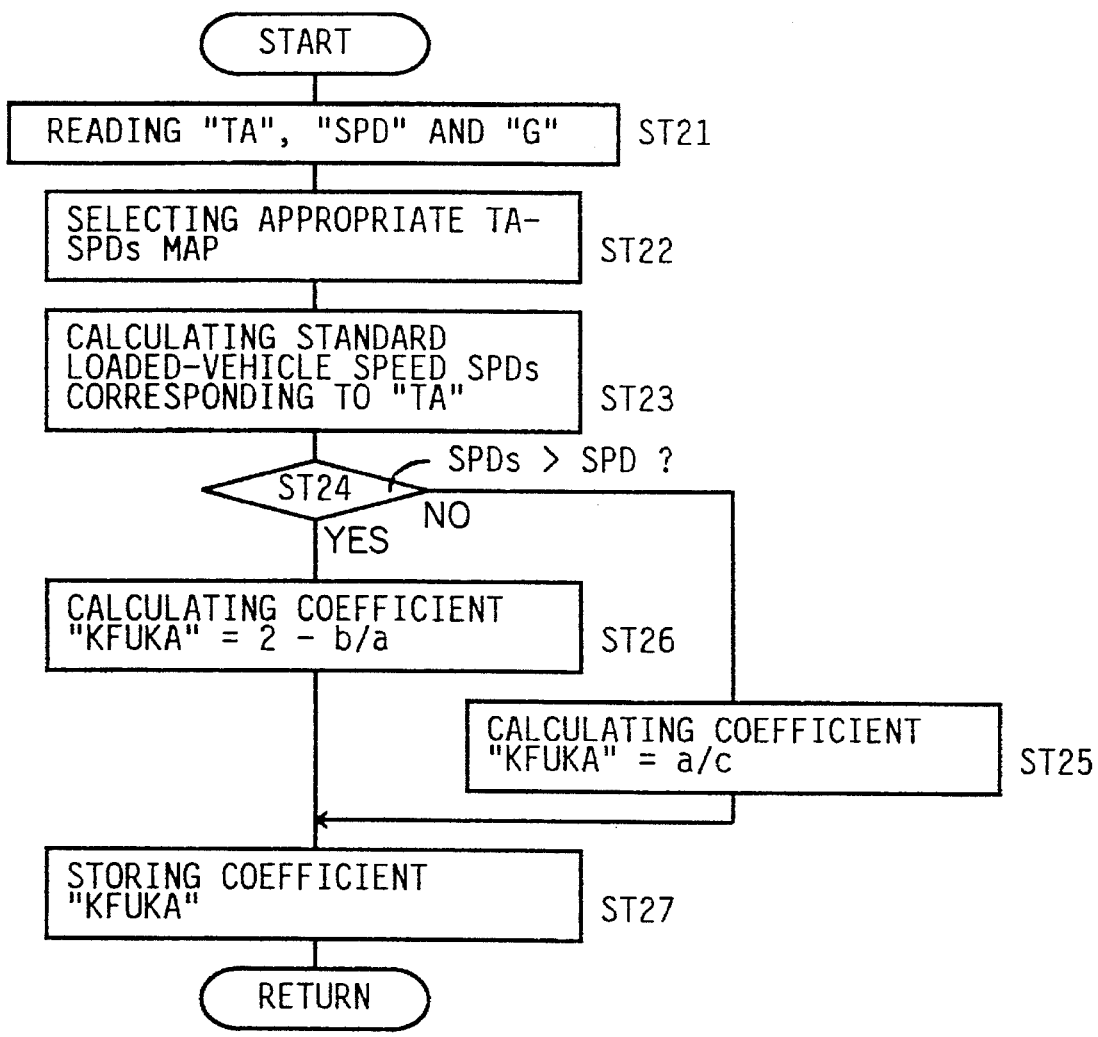
FIG. 25 is a a flow chart illustrating a routine for calculating a vehicle load coefficient KFUKA used in steps ST6 and ST11 of the routine of FIG. 24.

The vehicle load coefficient KFUKA of the adjusting coefficient (KFUKA+KSFTAi) is determined or calculated in a vehicle load detecting routine illustrated in the flow chart of FIG. 25.

The routine of FIG. 25 is initiated with step ST21 which correspond to steps SD1–SD3 of the routine of FIGS. 2A and 2B. Step ST21 is followed by step ST22 corresponding to step SD4, in which the TA-SPDs relationship (as illustrated in FIG. 3) corresponding to the currently selected position G. Then, step ST23 corresponding to step SD5 is implemented to calculate the standard loaded-vehicle speed SPDs, on the basis of the detected throttle opening angle TA and according to the selected TA-SPDs relationship. Step ST23 is followed by step ST24 corresponding to step SD6. Then, step ST25 or ST26 is implemented depending upon the decision obtained in step ST24. The steps ST25 and ST26 correspond to steps SD7 and SD9 of the routine of FIGS. 2A and 2B. That is, the vehicle load coefficient KFUKA is calculated according to the equation KFUKA= a/c if the detected vehicle speed "c" is higher than the standard loaded-vehicle speed "a", and according to the equation KFUKA=2−b/a if the detected vehicle speed "b" is lower than the standard loaded-vehicle speed "a". Steps ST25 and ST26 are followed by step ST27 in which the calculated coefficient KFUKA is stored in the RAM of the transmission control unit 34.

While the flow chart of FIG. 25 does not illustrate a step of smoothing the coefficient KFUKA to obtain the smoothed vehicle load coefficient KFUKASM, it is desirable to use the smoothed coefficient KFUKASM as in the first embodiment.

Figure 26:
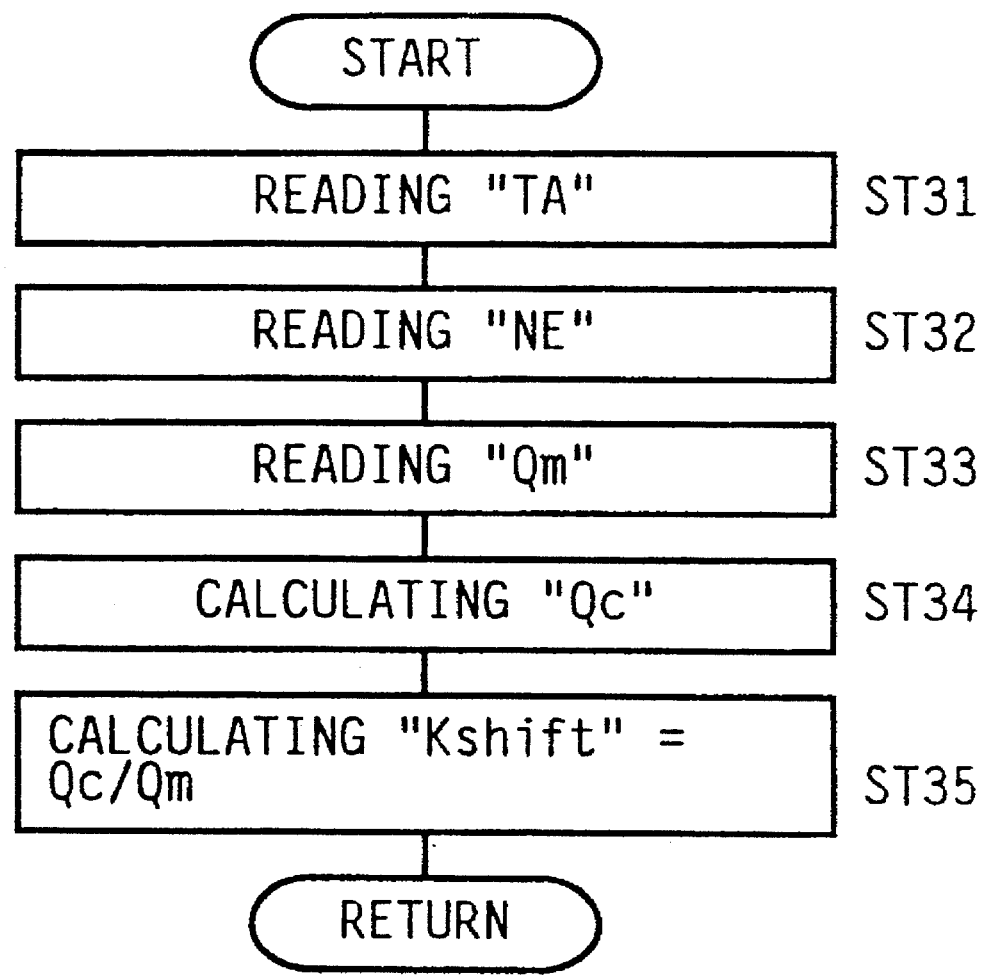
FIG. 26 is a flow chart illustrating-a routine for calculating an intake air coefficient Kshift.
Figure 27:
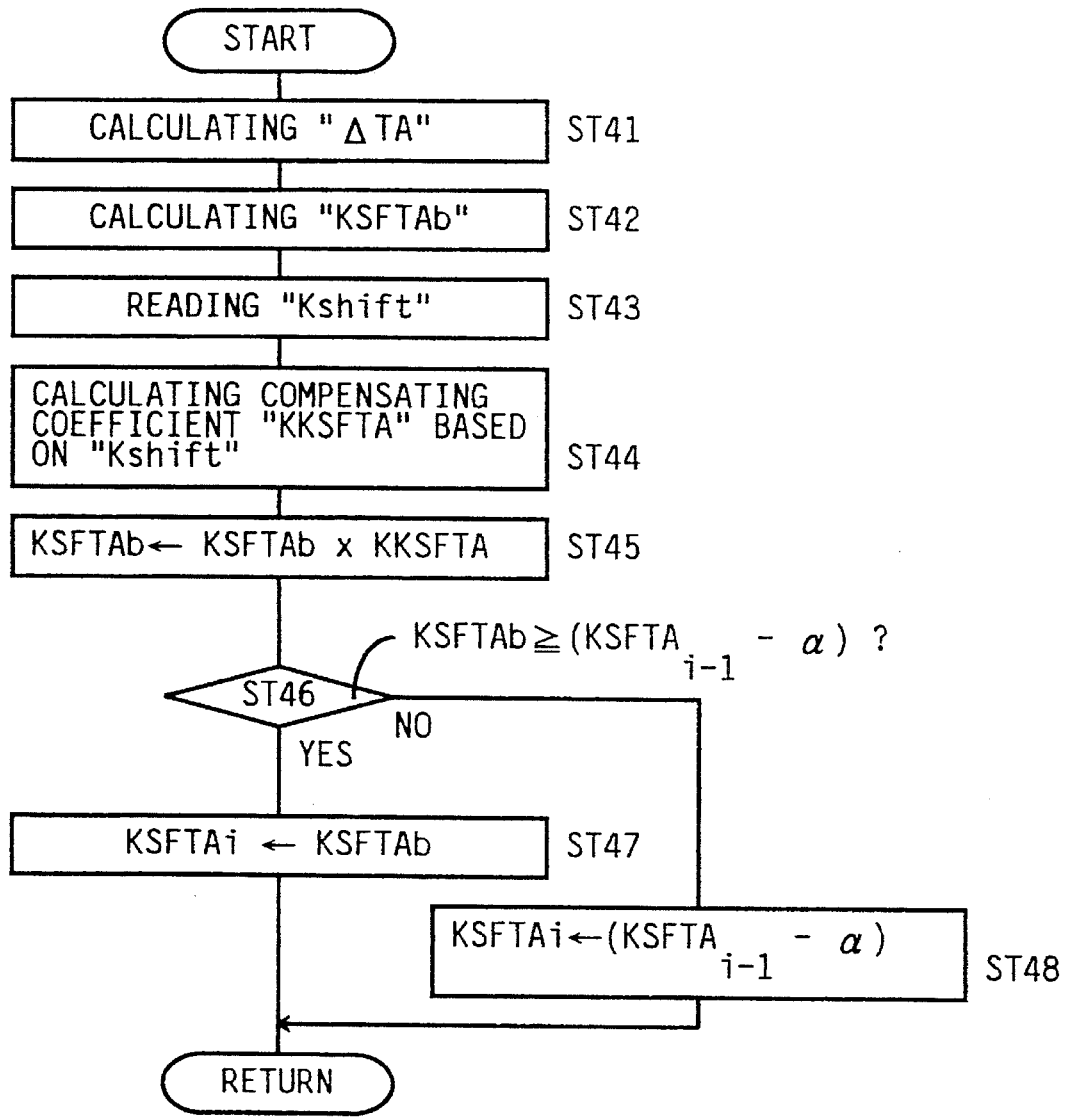
FIG. 27 is a flow chart illustrating a routine for determining a shift-speed compensating value KSFTAi used in steps ST6 and ST11 of the routine of FIG. 24.
Figure 28:
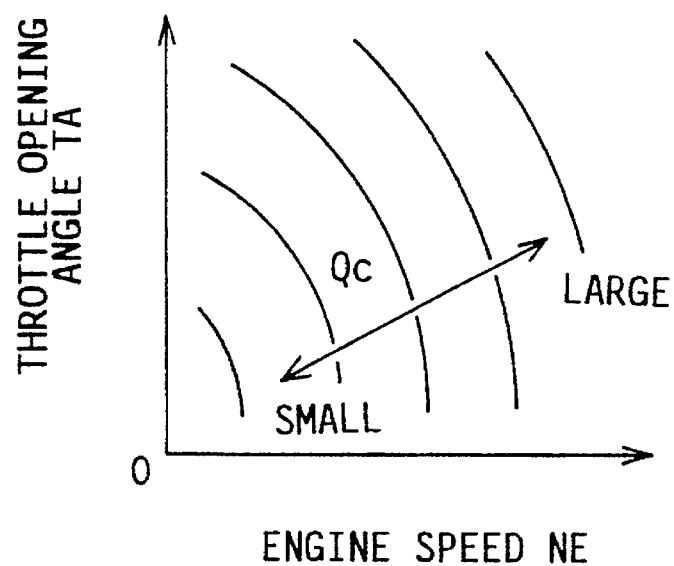
FIG. 28 is a view indicating a relationship used in step ST34 of the routine of FIG. 26 to obtain a required intake air quantity Qc from engine speed NE and throttle opening angle TA.

To obtain the shift-speed compensating value KSFTAi of the adjusting coefficient (KFUKA+KSFTAi), routines of FIGS. 26 and 27 are executed with a cycle time (e.g., about 32 msec) which is substantially the same as that of the routines of FIG. 24 and 25. The routine of FIG. 26 is initiated with steps ST31, ST32 and ST33 to read in the throttle opening angle TA, engine speed NE and intake air quantity Qm, respectively. Then, step ST34 is implemented to calculate a required intake air quantity Qc on the basis of the detected throttle opening angle TA and engine speed NE and according to a predetermined relationship as indicated in FIG. 25. This relationship is represented by a data map stored in the ROM of the control unit 34. Step ST34 is followed by step ST35 to calculate an intake air coefficient Kshift=Qc/Qm, which is a ratio of the required intake air quantity Qc with respect to the detected intake air quantity Qm. The calculated intake air coefficient Kshift=Qc/Qm is substantially 1.0 when the idling speed control valve 38 and the valve timing changing device 52 are placed in their normal positions and when the atmospheric pressure is almost equal to a predetermined nominal level. While the required intake air quantity Qc changes with a change in the throttle opening angle TA without a significant delay, the actual intake air quantity Qm (detected by the air flow meter 16) is less responsive to a change in the throttle opening angle TA (required intake air quantity Qc), whereby the calculated intake air coefficient Kshift will temporarily vary when the throttle opening angle TA changes.

The intake air coefficient Kshift thus calculated is used to obtain a shift-speed compensating coefficient KKSFTA, which in turn is used to adjust a basic adjusting value KSFTAb used for determining the shift-speed compensating value KSFTAi which is the second component of the adjusting coefficient (KFI/KA+KSFTAi).

The shift-speed compensating value KSFTAi is added to the vehicle load coefficient so as to increase the adjusting coefficient (KFUKA+KSFTAi) so that the transmission 68 is more likely to be shifted down in response to a desire of the vehicle driver to accelerate the vehicle. The compensating value KSFTAi also functions to increase the adjusting coefficient (KFUKA+KSFTAi) so that the transmission 68 is less likely to be shifted up when the vehicle is running under a condition or in an environment in which the output of the engine 10 tends to be lowered without a change in the operating amount of the accelerator pedal (a change in the throttle opening angle TA). The shift-speed compensating value KSFTAi is determined in the routine as illustrated in the flow chart of FIG. 27.

Figure 29:
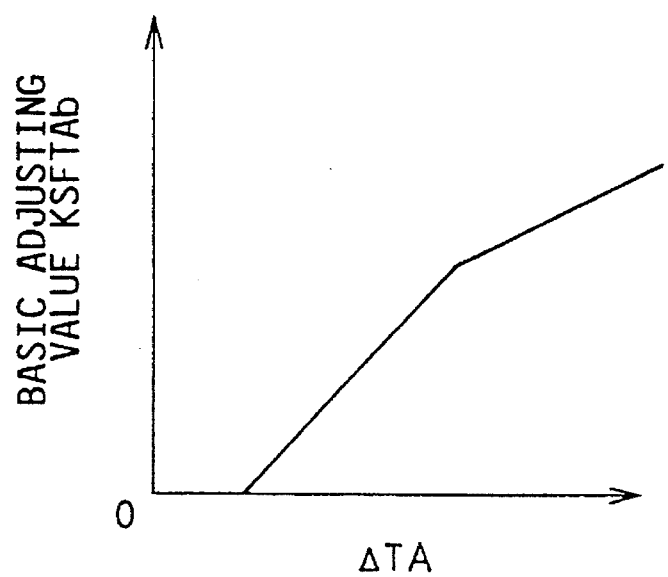
FIG. 29 is a view indicative of a relationship used in step ST42 of the routine of FIG. 27 to obtain a basic adjusting value KSFTAb from a rate of change $\Delta TA$ of the throttle opening angle TA.

The routine of FIG. 27 is initiated with step ST41 to calculate a difference ΔTA=TAp−TAb between a present value TAp of the throttle opening angle TA and a last value TAb of the angle TA which are detected in the present and preceding cycles of execution of the routine. Since the present routine is executed with the predetermined cycle time, the difference ΔTA represents a rate of change in the throttle opening angle TA, which means the operating speed of the accelerator pedal that reflects the amount of acceleration of the vehicle currently desired by the vehicle driver. Step ST42 is then implemented to calculate a basic adjusting value KSFTAb on the basis of the calculated rate of change ΔTA and according to a predetermined ΔTA-KSFTAb relationship represented by a data map stored in the ROM of the control unit 34. An example of the ΔTA-KSFTAb relationship is indicated in the graph of FIG. 29. The basic adjusting value KSFTAb is used as a base for determining the shift-speed compensating value KSFTAi. It will be understood from the graph that the ΔTA-KSFTAb relationship is determined such that the basic adjusting value KSFTAb is zero when the rate of change ΔTA is zero, and increases with an increase of the rate of change ΔTA so as to increase the adjusted shift-up and shift-down vehicle speeds MSPDu and MSPDd so that the transmission 68 is more likely to be shifted down and less likely to be shifted up.

Figure 30:
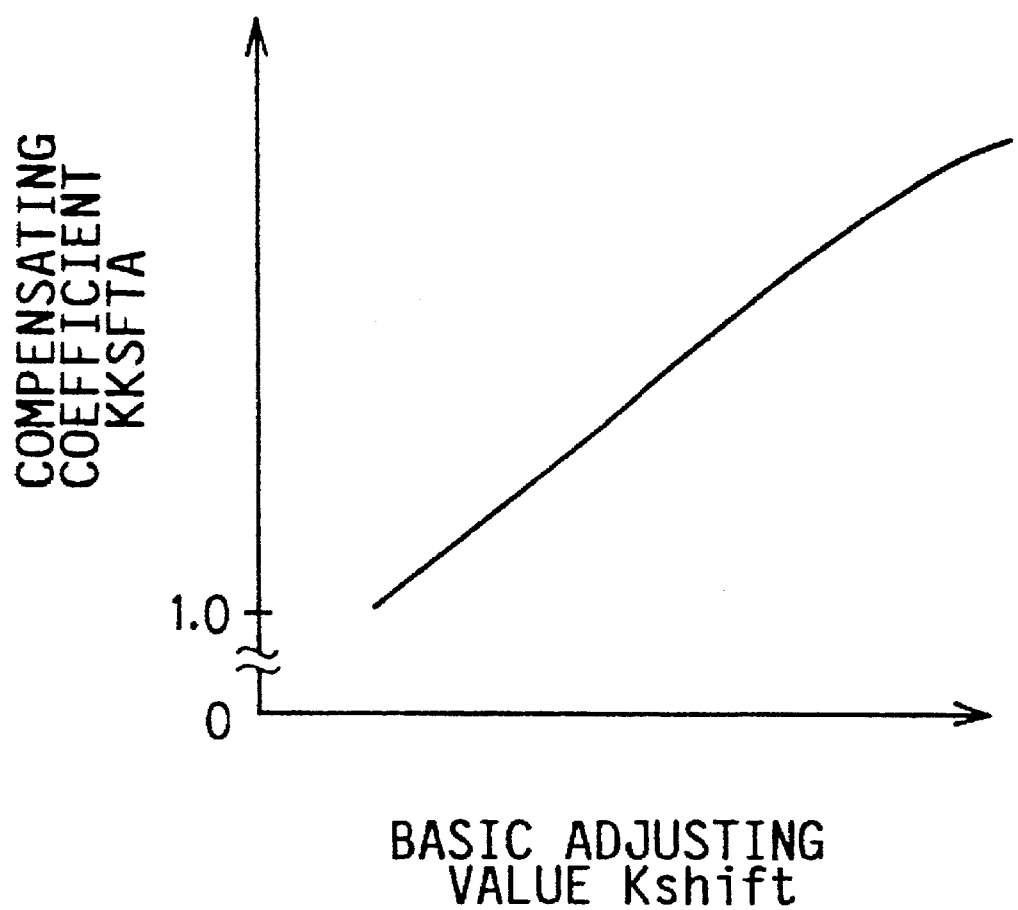
FIG. 30 is a view indicative of a relationship used in step ST44 of the routine of FIG. 27 to obtain a shift-speed compensating coefficient KKSFTA.

Then, the control flow goes to step ST43 to read in the intake air coefficient Kshift calculated in step ST35 of the routine of FIG. 26. Step ST43 is followed by step ST44 in which a compensating coefficient KKSFTA is calculated on the basis of the intake air coefficient Kshift and according to a predetermined KKSFTA-Kshift relationship represented by a data map also stored in the control unit 34. An example of the KKSFTA-Kshift relationship is indicated in the graph of FIG. 30. The compensating coefficient KKSFTA is used to adjust the basic adjusting value KSFTAb. The KKSFTA-Kshift relationship is determined such that the coefficient KKSFTA increases with the intake air coefficient Kshift. Since the intake air coefficient Kshift=Qc/Qm increases with a decrease in the intake air density, the calculated compensating coefficient KKSFTA increases with an increase in the altitude of the vehicle, so as to increase the adjusted shift-up vehicle speed MSPDu, so that the transmission 68 is less likely to be shifted up, and so as to increase the adjusted shift-down vehicle speed MSPDd, so that the transmission 68 is more likely to be shifted down.

Then, step ST45 is implemented to adjust the basic adjusting value KSFTAb calculated in step ST42, by multiplying the value KSFTAb by the compensating coefficient KKSFTA calculated in step ST44, so as to prevent frequent shift-down actions of the transmission 68 while the vehicle is running in an environment in which the output of the engine 10 with a given amount of operation of the accelerator pedal is likely to be lowered. Step ST45 is followed by step ST46 to determine whether the adjusted basic adjusting value KSFTAb is equal to or larger than a value (KSFTAi–1–α), where KSFTAi–1 represents the shift-speed compensating value KSFTAi obtained in the last cycle of execution of the routine of FIG. 27, and α represents a predetermined value. If the adjusted basic adjusting value KSFTAb is equal to or larger than the value (KSFTAi–1–α), step ST47 is implemented to determine the adjusted basic adjusting value KSFTAb as the shift-speed compensating value KSFTAi. If the adjusted basic adjusting value KSFTAb is smaller than the value (KSFTAi–1–α), step ST48 is implemented to determine the value (KSFTAi–1–α) as the shift-speed compensating value KSFTAi. The steps ST46, ST47 and ST48 are formulated in view of a fact that the basic adjusting value KSFTAb is zeroed when the rate of change ΔTA is substantially zeroed at the end of a certain stroke of depression of the accelerator pedal given by the vehicle driver, according to the KSFTAb-ΔTA relationship of FIG. 29, and are based on a concept that a desire of the vehicle driver to accelerate the vehicle continues to exist as long as the accelerator pedal is kept at a certain depressed position, that is, even after the rate of change ΔTA is zeroed. In other words, the steps ST46–ST48 are formulated to reduce the basic adjusting value KSFTAb at a predetermined rate corresponding to the value α, as the time passes after the rate of change ΔTA is zeroed, so that the adjusted basic adjusting value KSFTAb reflects the driver's desire to accelerate the vehicle with the accelerator pedal kept depressed at a given position.

As described above, the adjusted shift-up and shift-down vehicle speeds MSPDu, MSPDd are calculated in steps ST6 and ST11 of the shift control routine of FIG. 24, by multiplying the shift-up and shift-down vehicle speeds SPDu, SPDd (as calculated in steps ST5 and ST10) by the adjusting coefficient, which is a sum of the vehicle load coefficient KFUKA and the shift-speed compensating value KSFTAi which have been obtained as described above. Thus, the shift-up and shift-down vehicle speeds SPDu, SPDd are adjusted, or the adjusted shift-up and shift-down vehicle speeds MSPDu, MSPDd are obtained, on the basis of the rate of change ΔTA of the throttle opening angle TA and the intake air coefficient Kshift=Qc/Qm.

As described above by reference to FIG. 3, the TA-SPDs relationship for determining the vehicle load coefficient KFUKA is the standard relationship between the throttle opening angle TA (engine load) and the vehicle speed SPD when the vehicle is running in a stable mode at a relatively constant speed on a generally flat road surface. Therefore, the vehicle load coefficient KFUKA obtained in the routine of FIG. 25 is 1.0 or close to 1.0 when the vehicle is running in the stable mode, and varies as the load acting on the running vehicle changes, for example, as the gradient of the road surface changes. Accordingly, the vehicle load coefficient KFUKA is responsive to a change in the running load of the vehicle.

The shift-speed compensating value KSFTAi, which is the other component of the adjusting coefficient (KFUKA+KSFTAi), is basically determined by the basic adjusting value KSFTAb which is obtained from the rate of change ΔTA of the throttle opening angle TA, according to the predetermined KSFTAb-ΔTA relationship of FIG. 29, so that the adjusting coefficient (KFUKA+KSFTAi) is increased to increase the adjusted shift-down vehicle speed MSPDd with an increase in the operating speed of the accelerator pedal, whereby the transmission 68 is more likely to be shifted down when the accelerator pedal is depressed at a relatively high speed. Thus, the driver's desire to accelerate the vehicle is reflected on the shifting actions of the transmission 68, for improved running stability and drivability of the vehicle as desired by the vehicle driver.

In the present second embodiment, the throttle sensor 36 and a portion of the transmission control unit 34 assigned to implement step ST41 cooperate to provide detecting means for detecting a rate of change of the throttle opening angle TA, namely, a rate at which the accelerator pedal is depressed, which represents a vehicle driver's desire to accelerate the vehicle. Further, a portion of the control unit 34 assigned to implement step ST42 provides first compensating means for adjusting the shift-down vehicle speed SPDd so that the transmission 68 is more likely to be shifted down as the driver's desire to accelerate the vehicle is increased. A portion of the transmission control unit 34 assigned to implement steps ST5 and ST10 provides shift-speed determining means for determining the shift-up and shift-down vehicle speeds SPDu, SPDd according to the shift-up and shift-down boundary lines.

It is also noted that the basic adjusting value KSFTAb determining the shift-speed compensating value KSFTAi is adjusted in step ST45 by multiplication thereof by the compensating coefficient KKSFTA which is obtained from the intake air coefficient Kshift according to the predetermined KKSFTA-Kshift relationship of FIG. 30. According to this adjustment of the basic adjusting value KSFTAb, the shift-speed compensating value KSFTAi is increased to increase the shift-up vehicle speed SPDu when the vehicle is running in an environment (e.g., low intake air density, or high altitude of the vehicle) that reduces the engine output at a given position of the accelerator pedal. Although the basic adjusting value KSFTAb is determined according to the standard KSFTAb-ΔTA relationship applicable to stable-mode running of the vehicle on a flat road surface, the use of the intake air coefficient Kshift to adjust the shift-speed compensating value KSFTAi results in increasing the shift-up vehicle speed SPDu (adjusted value MSPDu) so that the transmission 68 is less likely to be shifted up when the engine output is lowered due to a special operating environment, for example, when the altitude of the vehicle is relatively high. This increase of the shift-up vehicle speed MSPDu has an effect of increasing a difference between the shift-down and shift-up vehicle speeds MSPDd and MSPDu, whereby frequent shift-down and shift-up actions of the transmission 68 in such special operating environment of the vehicle can be avoided. Such frequent shift-down and shift-up actions of the transmission would otherwise occur due to the behaviors of the vehicle driver and the known shift control apparatus during running of the vehicle at a high altitude, for example. That is, a shift-down action of the transmission causes an increase in the vehicle drive force and an increase in the vehicle speed, resulting in an automatic shift-up action of the transmission, which would motivate the vehicle driver to depress the accelerator pedal in an attempt to maintain the vehicle speed. Consequently, the transmission is shifted down again.

In the present embodiment, the air flow meter 16 and the portion of the transmission control unit 34 assigned to implement steps ST44 and ST45 cooperate to provide second compensating means for adjusting the shift-up vehicle speed SPDu (MSPDu) so that the transmission 68 is less likely to be shifted up when the vehicle is running in an environment in which the engine output is lowered with the accelerator pedal kept at a given position.

While the present invention has been described above in detail in its presently preferred embodiments, it is to be understood that the illustrated embodiment may be modified as needed.

In the illustrated embodiments, the shift-up and shift-down boundary lines are relationships between the vehicle speed SPD and the throttle opening angle TA. However, the throttle opening angle TA may be replaced by other parameters representative of a load acting on the engine 10, when the engine 10 is a diesel engine having no throttle valve. For instance, the throttle opening angle TA may be replaced by the operating amount of the accelerator pedal and the amount of fuel injection through the fuel injector valve 30. While the throttle opening angle TA and the engine speed NE are used to determine the required intake air quantity Qc in the second embodiment, those parameters TA and NE may be replaced by other parameters equivalent to TA and NE.

In the first embodiment, the shift-up and shift-down vehicle speeds SPDu and SPDd as obtained according to the shift-up and shift-down boundary lines are adjusted by multiplying the values SPDu, SPDd by the shift-speed compensating coefficient Ks. However, the adjustment of the shift-up and shift-down vehicle speeds SPDu, SPDd based on the vehicle running load (coefficient KFUKASM) may be made by adding the compensating coefficient Ks to the values SPDu, SPDd as obtained according to the shift-up and shift-down boundary lines, or by using a compensating coefficient or coefficients determined by other parameters such as a ratio Qm/Qm* of the detected value of the intake air quantity Qm to a predetermined desired value Qm* of the quantity Qm.

In the first embodiment, the vehicle load detecting routine of FIGS. 2A and 2B includes steps SD17 and SD18 which are provided to inhibit the smoothing operation to update the smoothed vehicle load coefficient KFUKASM during predetermined periods of time after the reversal of the XCOAST flag and after the starting of the vehicle. However, steps SD17 and SD18 may be used to effect a different smoothing operation in which the smoothing amount is larger than that determined in step SD19, during the above-indicated periods of time.

While the START timer used in the first embodiment for measuring the time lapse after the vehicle start is a decrement timer which is decremented from a predetermined initial value (in step SH7 of FIG. 5A), the START timer may be replaced by a XSTART flag and a timer. In this case, the XSTART flag is reset to "0" when the vehicle speed SPD increases to about 10 km/h, and is set to "1" when the speed SPD increases to about 40 km/h, and the smoothing operation in steps SD19 and SD20 is inhibited for a predetermined time of about six seconds (measured by the timer) while the XSTART flag is held at "0" and while the vehicle speed SPD is higher than about 10 km/h.

In the first embodiment, the routine of FIGS. 16A and 16B includes steps SE13 through SE19 to detect two times of change of the vehicle running condition from the decelerating state to the accelerating state, to reset the X3RDH flag to "0" for provisionally cancelling the inhibition of the shift-up action of the transmission 68 to the 4th-speed position. The routine may be modified to detect three times of change of the vehicle running condition.

Although step SA3 in the routine of FIGS. 13A and 13B is provided to detect the idling position of the throttle valve 20 (or to detect a depression of the accelerator pedal), the step may be modified to determine whether the throttle opening angle TA is smaller or larger than a predetermined value.

The threshold or reference values 1.2, 0.95, and 1.05 used in step SE3 of FIG. 16B and steps SA1 and SA2 in FIG. 13A may be changed as needed.

The first embodiment is adapted such that the shift-down and shift-up vehicle speeds SPDu and SPDd as obtained according to the shift-up and shift-down boundary lines are adjusted on the basis of the smoothed vehicle load coefficient KFUKASM so that the transmission 68 is more likely to be shifted down to increase the vehicle drive force as the value KFUKASM increases. However, the principle of the present invention is equally applicable to a motor vehicle of the type wherein the opening angle TA of the throttle valve 20 is controlled by a throttle actuator. In this case, the drive force control means 84 is modified to adjust the throttle opening angle TA as established by the throttle actuator such that the adjusted angle TA increases with an increase in the vehicle load coefficient KFUKASM.

In the illustrated embodiments, the shift-up and shift-down vehicle speeds SPDu, SPDd are adjusted by the shift-speed compensating coefficient Ks or the adjusting coefficient (KFUKA+KSFTAi) so that the transmission 68 is automatically shifted up and down according to the adjusted shift-up and shift-down vehicle speeds MSPDu, MSPDd. However, the transmission is shifted according to the shift-up and shift-down throttle opening angles TAu, TAd, or equivalent shifting points. In this case, too, the shifting points (e.g., TAu, TAd) are adjusted so that the vehicle drive force is adjusted depending upon the running load (KFUKASM) of the vehicle, or so that the transmission is more likely to be shifted down as the operating speed (ΔTA) of the accelerator pedal is increased, and less likely to be shifted up as the operating amount of the accelerator pedal is increased.

Although the illustrated embodiments are adapted such that the shift-up and shift-down vehicle speeds SPDu, SPDd as determined according to the predetermined shift-up and shift-down boundary lines are adjusted according to the shift-speed compensating coefficient Ks or the adjusting coefficient (KFI/KA+KSFTAi), it is to be understood that this adjustment is equivalent to the adjustment of the shift-up and shift-down boundary lines.

In the second embodiment, the adjusting coefficient (KFUKA+KSFTAi) is a sum of the vehicle load coefficient KFUKA and the shift-speed compensating value KSFTAi. However, the coefficient KFUKA and compensating value KSFTAi may be suitably determined so that a product of these values KFUKA and KSFTAi is used as the adjusting coefficient used to adjust the shift-up and shift-down vehicle speeds SPDu, SPDd. Further, the adjusting coefficient may include other operating parameters of the vehicle in addition to the values KFUKA and KSFTAi.

While the rate of change ΔTA of the throttle opening angle TA is used as a parameter representative of the vehicle driver's desire to accelerate the vehicle, a rate of change of the operating amount of the accelerator pedal may be used in place of the rate of change ΔTA.

Although the air flow meter 16 used as means for detecting the intake air quantity Qm is of a variable vane type, other types of air flow meter such as the Karman's vortex street type and hot-wire type may be used. Further, the intake air quantity may be determined by detecting the pressure within the intake pipe 18. In this case, a change in the atmospheric pressure is not reflected by the determined intake air quantity.

While the drive force control apparatus or transmission shift control apparatus according to the illustrated embodiments are used for the vehicle equipped with the idling speed control valve 38 and the valve timing changing device 52, the present invention is applicable to a vehicle equipped with other devices whose operating positions influence the actual intake air quantity Qm of the engine.

In the second embodiment, the vehicle load coefficient KFUKA is used as a component of the adjusting coefficient for adjusting the shift-up and shift-down vehicle speeds SPDu, SPDd. However, this parameter KFUKA may be eliminated so that the adjustment of the speeds SPDu, SPDd is made on the basis of only the shift-speed compensating value KSFTAi. In this case, a change in the load acting on the vehicle (e.g., a vehicle load change due to a change in the road surface gradient) is not taken into account when the shift points of the transmission are adjusted in steps ST6 and ST11.

The separate control units 32, 34 for controlling the engine 10 and the transmission 68 in the first and second embodiments may be replaced by a single electronic control device designed to control the engine 10 and the transmission 68.

While the drive force control apparatus according to the illustrated embodiments is used for controlling the automatic transmission 68 having four forward drive positions, the present invention is applicable to a continuously variable transmission whose speed ratio is continuously variable, such as a belt-and-pulley type in which a pair of variable-diameter pulleys whose effective diameters are variable are connected by a power transmission belt.

It is further to be understood that the present invention may be embodied with various other changes, modifications and improvements, which may occur to those skilled in the art, without departing from the spirit and scope of the invention defined in the following claims.

What is claimed is:

1. An apparatus for controlling an automatic transmission of a motor vehicle having an engine and a drive wheel driven by a drive force based on an output of the engine, said apparatus comprising a transmission controller for shifting said automatic transmission so as to change a speed ratio of said transmission, on the basis of a load acting on the engine and a running speed of the vehicle and according to a predetermined shift boundary line, said transmission controller comprising:

relationship setting means for setting a standard relationship between said load acting on said engine and said running speed of the vehicle when the vehicle is running in a stable mode at a relatively constant speed on a generally flat road surface;

vehicle-load determining means for determining a running load acting on the vehicle as represented by said load acting on said engine and said running speed, on the basis of said standard relationship set by said relationship setting means;

said vehicle-load determining means including means for determining a standard loaded-vehicle speed on the basis of the load acting on the engine and according to said standard relationship, and means for calculating a vehicle load coefficient as said running load, on the basis of said standard loaded-vehicle speed and the detected running speed of the vehicle; and drive force control means for adjusting said predetermined shift boundary line on the basis of said vehicle load coefficient, to chance said speed ratio of said automatic transmission for controlling said drive force of said drive wheel.

2. An apparatus according to claim 1, wherein said transmission controller further comprises shift-up inhibiting means for inhibiting a shift-up action of said automatic transmission when said running load acting on the vehicle determined by said vehicle-load determining means exceeds a first threshold value.

3. An apparatus according to claim 2, wherein said transmission controller further comprises cancelling means for cancelling inhibition of said shift-up action by said shift-up inhibiting means, when said running load is reduced below a second threshold value smaller than said first threshold value.

4. An apparatus according to claim 3, wherein said cancelling means determines whether a shift-up action of said automatic transmission to a highest-speed position thereof should be effected or not, each time a change of a running state of the vehicle from a decelerating state to an accelerating state has been repeated a predetermined number of times while the shift-up action to said highest-speed position is inhibited by said shift-up inhibiting means, said cancelling means cancelling the inhibition of said shift-up action to said highest-speed position if said cancelling means determines that said shift-up action to said highest-speed position should be effected.

5. An apparatus according to claim 3, wherein said cancelling means comprises determining means for determining said second threshold value such that said second threshold value is smaller by a predetermined value than a value of said running load which is determined at one of a first moment and a second moment whichever is later, said first moment being a moment when the inhibition of said shift-up action is started by said shift-up inhibiting means, and said second moment being a moment when said change of the running state of the vehicle from the decelerating state to the accelerating state has been repeated said predetermined number of times.

6. An apparatus according to claim 1, wherein said drive force control means operates to shift down said automatic transmission to a position for applying an engine brake to the vehicle, if said running load acting on the vehicle and said load acting on said engine are smaller than respective predetermined reference values, and if an acceleration value of the vehicle is larger than a predetermined reference value.

7. An apparatus according to claim 1 wherein said drive force control means comprises shift control means for selecting one of operating positions of said transmission, on the basis of said load acting on the engine and said running speed of the vehicle, and according to predetermined shift-up and shift-down boundary lines as said predetermined shift boundary line, said shift control means comprising adjusting means for adjusting said shift-up and shift-down boundary lines on the basis of said said vehicle load coefficient.

8. An apparatus according to claim 7, wherein said shift control means further comprises:

detecting means for detecting a rate of change of a desired amount of acceleration of the vehicle currently desired by a driver of the vehicle;

first compensating means for adjusting said shift-down boundary line on the basis of the detected rate of change of said desired amount of acceleration of the vehicle, so that said automatic transmission is more likely to be shifted down as said detected rate of change of said desired amount of acceleration of the vehicle is increased; and second compensating means for adjusting said shift-up boundary line so that the transmission is less likely to be shifted up when the vehicle is running in an environment in which an output of said engine is lowered without a change of said desired amount of acceleration of the vehicle.

9. An apparatus according to claim 8, wherein said detecting means detects a rate of change of an opening angle of a throttle valve of said engine, as said rate of change of said desired amount of acceleration of the vehicle currently desired by the driver of the vehicle.

10. An apparatus according to claim 8, wherein each of said shift-up and shift-down boundary line represents a relationship between said desired amount of acceleration of the vehicle desired by the driver of the vehicle and said running speed of the vehicle, and wherein said shift control means comprises shift-speed determining means for determining a shift-up vehicle speed and a shift-down vehicle speed on the basis of the detected desired amount of acceleration of the vehicle and according to said shift-up and shift-down boundary lines, so that said transmission is shifted up and down at said shift-up and shift-down vehicle speeds, respectively, and wherein said first compensating means increases said shift-down vehicle speed as determined by said shift-speed determining means, with an increase in said rate of change of said desired amount of acceleration of the vehicle, and said second compensating means increases said shift-up vehicle speed as determined by said shift-speed determining means, with an increase of a degree in which said output of the engine is lowered in said environment.

11. An apparatus according to claim 10, wherein said vehicle-load determining means comprises:

means for determining a standard loaded-vehicle speed on the basis of the load acting on the engine and according to said standard relationship; and means for calculating a vehicle load coefficient as said running load acting on the vehicle, on the basis of said standard loaded-vehicle speed and the detected running speed of the vehicle, and wherein said means for adjusting said shift-up and shift-down boundary lines on the basis of said running load acting on the vehicle adjusts said shift-up and shift-down vehicle speeds as determined by said shift-speed determining means, on the basis of said vehicle load coefficient, and said first and second compensating means adjust said shift-up and shift-down vehicle speeds as determined by said shift-speed determining means, on the basis of a shift-speed compensating value which increases with an increase in said rate of change of said desired amount of acceleration of the vehicle and with a decrease in a density of an intake air of the engine.

12. An apparatus according to claim 11, wherein said shift control means adjusts said shift-up and shift-down vehicle speeds on the basis of an adjusting coefficient which is a sum of said vehicle load coefficient and said shift-speed compensating value.

* * * * *